(12) United States Patent
Rakib

(10) Patent No.: US 9,887,855 B2
(45) Date of Patent: *Feb. 6, 2018

(54) VIRTUAL CONVERGED CABLE ACCESS PLATFORMS FOR HFC CABLE NETWORKS

(71) Applicant: Gainspeed, Inc., Sunnyvale, CA (US)

(72) Inventor: Shlomo Selim Rakib, Saratoga, CA (US)

(73) Assignee: Alcatel-Lucent USA, Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,707

(22) Filed: Dec. 22, 2014

(65) Prior Publication Data

US 2015/0172072 A1    Jun. 18, 2015

Related U.S. Application Data

(63) Continuation of application No. 14/098,656, filed on Dec. 6, 2013, now Pat. No. 8,938,769, which is a
(Continued)

(51) Int. Cl.
*H04N 7/173* (2011.01)
*H04L 12/28* (2006.01)
(Continued)

(52) U.S. Cl.
CPC ... *H04L 12/2885* (2013.01); *H04B 10/25751* (2013.01); *H04L 12/2801* (2013.01);
(Continued)

(58) Field of Classification Search
CPC ... H04N 7/17309; H04N 7/22; H04N 21/6118
(Continued)

(56) References Cited

U.S. PATENT DOCUMENTS 5,793,958 A    8/1998  Clement et al.
5,991,308 A *  11/1999  Fuhrmann ........... H03M 13/256
                                                   348/E7.07
(Continued)

FOREIGN PATENT DOCUMENTS

EP    1117214    7/2001
EP    1241566    9/2002
(Continued)

OTHER PUBLICATIONS

Portions of prosecution history of U.S. Appl. No. 12/692,582, Jul. 17, 2012, Rakib, Selim Shlomo.
(Continued)

*Primary Examiner* — Annan Shang
(74) *Attorney, Agent, or Firm* — Loza & Loza, LLP

(57) ABSTRACT

A virtual converged cable access platform (CCAP) system and method for hybrid fiber CATV (HFC) cable networks. The system uses a new type of digital optical fiber node configured to receive optical fiber data packets, and reconstitute the optical data packets into RF waveforms suitable for injection into the system's CATV cable. The system replaces the legacy HFC head end with a simplified "virtual head end". The system's virtual head end operates using a new type of virtual CCAP controller and virtual CCAP software that in turn controls high performance edge routers. Much of the intelligence of running the HFC cable system is managed by the controller software, while the edge router manages the interface between the CATV portion of the system and outside networks. The system can handle even legacy CATV RF signals by appropriate conversion operations, while reducing power and space needs, and improving operational flexibility.

18 Claims, 19 Drawing Sheets

Related U.S. Application Data continuation of application No. PCT/US2013/069760, filed on Nov. 12, 2013, and a continuation-in-part of application No. 13/674,936, filed on Nov. 12, 2012, now Pat. No. 8,782,729, and a continuation-in-part of application No. 13/756,302, filed on Jan. 31, 2013, now Pat. No. 8,910,230, and a continuation-in-part of application No. 13/964,394, filed on Aug. 12, 2013, which is a continuation-in-part of application No. 13/346,709, filed on Jan. 9, 2012, now Pat. No. 8,510,786, application No. 14/098,656, which is a continuation-in-part of application No. 13/555,170, filed on Jul. 22, 2012, now Pat. No. 8,644,706, which is a continuation-in-part of application No. 13/035,993, filed on Feb. 27, 2011, now Pat. No. 8,365,237, application No. 14/098,656, which is a continuation-in-part of application No. 13/400,415, filed on Feb. 20, 2012, now Pat. No. 8,863,213, and a continuation-in-part of application No. 12/907,970, filed on Oct. 19, 2010, now Pat. No. 8,826,359, which is a continuation-in-part of application No. 12/692,582, filed on Jan. 22, 2010, now Pat. No. 8,311,412, application No. 14/098,656, which is a continuation-in-part of application No. 13/478,461, filed on May 23, 2012, now Pat. No. 8,773,965.

(60) Provisional application No. 61/870,226, filed on Aug. 26, 2013, provisional application No. 61/511,395, filed on Jul. 25, 2011, provisional application No. 61/385,125, filed on Sep. 21, 2010, provisional application No. 61/622,132, filed on Apr. 10, 2012.

(51) Int. Cl.
  *H04N 21/61* (2011.01)
  *H04N 7/22* (2006.01)
  *H04B 10/2575* (2013.01)
  *H04N 21/236* (2011.01)
  *H04N 21/2383* (2011.01)
  *H04N 21/239* (2011.01)

(52) U.S. Cl.
  CPC ............ *H04N 7/22* (2013.01); *H04N 21/239* (2013.01); *H04N 21/2383* (2013.01); *H04N 21/23605* (2013.01); *H04N 21/6118* (2013.01); *H04N 21/6125* (2013.01)

(58) Field of Classification Search
  USPC .................................................. 725/111–129
  See application file for complete search history.

(56) References Cited

U.S. PATENT DOCUMENTS

| | | | |
|---|---|---|---|
| 6,028,860 A * | 2/2000 | Laubach | H04Q 11/0478 370/395.64 |
| 6,118,498 A * | 9/2000 | Reitmeier | 348/725 |
| 6,278,716 B1 * | 8/2001 | Rubenstein et al. | 370/432 |
| 6,490,727 B1 * | 12/2002 | Nazarathy | H04J 14/0226 348/E7.071 |
| 6,693,878 B1 | 2/2004 | Daruwalla et al. | |
| 6,993,016 B1 | 1/2006 | Liva et al. | |
| 7,066,881 B2 * | 6/2006 | Dietzel | A61B 1/267 600/190 |
| 7,072,337 B1 | 7/2006 | Arutyunov et al. | |
| 7,089,577 B1 | 8/2006 | Rakib et al. | |
| 7,120,139 B1 * | 10/2006 | Kung | H04L 12/2801 370/352 |
| 7,146,630 B2 | 12/2006 | Dravida et al. | |
| 7,149,223 B2 | 12/2006 | Liva et al. | |
| 7,197,045 B2 | 3/2007 | Amit | |
| 7,536,705 B1 * | 5/2009 | Boucher | H04L 12/1836 725/112 |
| 7,539,208 B2 | 5/2009 | Chapman et al. | |
| 7,583,704 B1 | 9/2009 | Walker et al. | |
| 7,697,568 B1 * | 4/2010 | Zhang | H04L 12/2859 370/468 |
| 7,742,407 B2 | 6/2010 | Versteeg et al. | |
| 8,085,802 B1 * | 12/2011 | Monk | H04L 5/0046 370/419 |
| 8,311,412 B2 | 11/2012 | Rakib | |
| 8,578,437 B2 | 11/2013 | Nielsen et al. | |
| 8,588,198 B2 | 11/2013 | Salinger | |
| 8,631,450 B1 * | 1/2014 | Bernath | H04L 12/2801 725/119 |
| 8,644,706 B2 | 2/2014 | Rakib | |
| 8,782,729 B2 | 7/2014 | Rakib | |
| 8,887,214 B1 * | 11/2014 | Black | H04N 21/4227 725/105 |
| 8,910,230 B2 | 12/2014 | Rakib | |
| 8,935,739 B1 | 1/2015 | Rakib | |
| 8,938,769 B2 | 1/2015 | Rakib | |
| 8,949,919 B2 * | 2/2015 | Cholas | H04N 21/4147 725/112 |
| 9,191,113 B1 | 11/2015 | Rakib | |
| 9,497,450 B2 * | 11/2016 | Yu | H04L 43/0829 |
| 2002/0199203 A1 * | 12/2002 | Duffy | H04N 7/17309 725/105 |
| 2003/0033379 A1 | 2/2003 | Civanlar et al. | |
| 2003/0066087 A1 | 4/2003 | Sawyer et al. | |
| 2003/0200336 A1 | 10/2003 | Pal et al. | |
| 2004/0141747 A1 | 7/2004 | Kenny et al. | |
| 2004/0177133 A1 | 9/2004 | Harrison et al. | |
| 2004/0181800 A1 | 9/2004 | Rakib et al. | |
| 2004/0244043 A1 | 12/2004 | Lind et al. | |
| 2005/0246756 A1 | 11/2005 | Leddy et al. | |
| 2005/0283816 A1 | 12/2005 | Weinstein et al. | |
| 2006/0056323 A1 | 3/2006 | Currivan | |
| 2006/0067698 A1 | 3/2006 | Chan et al. | |
| 2006/0126660 A1 * | 6/2006 | Denney | H04J 3/1694 370/468 |
| 2007/0032256 A1 | 2/2007 | Kolze | |
| 2007/0140195 A1 | 6/2007 | Kaftan | |
| 2007/0153820 A1 | 7/2007 | Gould | |
| 2007/0189770 A1 | 8/2007 | Sucharczuk et al. | |
| 2007/0223512 A1 | 9/2007 | Cooper et al. | |
| 2008/0092181 A1 | 4/2008 | Britt | |
| 2008/0138071 A1 | 6/2008 | Lee et al. | |
| 2008/0209491 A1 * | 8/2008 | Hasek | H04N 7/17318 725/114 |
| 2008/0216144 A1 | 9/2008 | Weinstein et al. | |
| 2009/0074095 A1 | 3/2009 | Geile et al. | |
| 2009/0205007 A1 | 8/2009 | Woodward | |
| 2010/0031305 A1 | 2/2010 | Liva et al. | |
| 2010/0061234 A1 | 3/2010 | Pai et al. | |
| 2011/0043640 A1 * | 2/2011 | Zinevich | G01S 5/06 348/192 |
| 2011/0053623 A1 | 3/2011 | Rovira et al. | |
| 2011/0078755 A1 | 3/2011 | Dai | |
| 2012/0093150 A1 | 4/2012 | Kini | |
| 2012/0216225 A1 | 8/2012 | Britt | |
| 2013/0070640 A1 | 3/2013 | Chapman | |
| 2013/0070765 A1 | 3/2013 | Chapman et al. | |
| 2013/0070825 A1 | 3/2013 | Chapman | |
| 2013/0074138 A1 | 3/2013 | Chapman | |
| 2013/0125194 A1 | 5/2013 | Finkelstein et al. | |
| 2013/0318560 A1 * | 11/2013 | Cholas | H04N 21/4147 725/82 |
| 2014/0150041 A1 | 5/2014 | Rakib | |
| 2014/0150047 A1 | 5/2014 | Rakib | |
| 2015/0172072 A1 | 6/2015 | Rakib | |
| 2016/0380781 A1 * | 12/2016 | Rakib | H04N 21/615 725/111 |

FOREIGN PATENT DOCUMENTS

| | | |
|---|---|---|
| EP | 2526694 | 11/2012 |
| EP | 2918075 | 9/2015 |

(56) References Cited

FOREIGN PATENT DOCUMENTS

| EP | 13853111.6 | 7/2016 |
|---|---|---|
| WO | WO 03/009527 | 1/2003 |
| WO | WO 2010/027534 | 3/2010 |
| WO | WO 2011/091447 | 7/2011 |
| WO | WO 2013/126310 | 8/2013 |
| WO | WO 2014/075106 | 5/2014 |

OTHER PUBLICATIONS

Portions of prosecution history of U.S. Appl. No. 13/555,170, Dec. 30, 2013, Rakib, Shlomo Selim.
Portions of prosecution history of U.S. Appl. No. 14/170,579, Jan. 20, 2015, Rakib, Shlomo Selim.
Portions of prosecution history of U.S. Appl. No. 14/098,656, Dec. 2, 2014, Rakib, Shlomo Selim.
Portions of prosecution history of U.S. Appl. No. 14/461,114, Dec. 4, 2014, Rakib, Shlomo Selim.
International Search Report and Written Opinion for PCT/US2011/029113, Jun. 9, 2011, Rakib, Selim Shlomo.
Portions of prosecution history of EP11735370.6, Nov. 28, 2014, Rakib, Selim Shlomo.
International Search Report and Written Opinion for PCT/US2013/026608, Apr. 24, 2013, Rakib, Shlomo.
International Search Report for PCT/US2013/069760, Mar. 28, 2014 (mailing date), Gainspeed, Inc.
Author Unknown, "Data-Over-Cable Service Interface Specifications, CMAP Architecture Technical Report CM-TR-CMAP-V01-101222," Dec. 22, 2010, 48 pages, Cable Television Laboratories.
Author Unknown, "Data-Over-Cable Service Interface Specifications, Converged Cable Access Platform Architecture Technical Report, CM-TR-CCAP-V02-110614," Jun. 14, 2011, 46 pages, Cable Television Laboratories.
Harris, Fred, et al., "Digital Receivers and Transmitters Using Polyphase Filter Banks for Wireless Communications," IEEE Transactions on Microwave Theory and Techniques, 51(4), Apr. 2003, pp. 1395-1412.
U.S. Appl. No. 14/328,494, filed Jul. 10, 2014, Rakib, Shlomo Selim.
U.S. Appl. No. 14/834,346, filed Aug. 24, 2015, Rakib, Shlomo Selim.
Updated portions of prosecution history U.S. Appl. No. 14/170,579, Oct. 16, 2015, Rakib, Shlomo Remin.
Portions of prosecution history of U.S. Appl. No. 14/328,494, Nov. 23, 2015, Rakib, Shlomo Selim.
Portions of prosecution history of U.S. Appl. No. 14/546,991, Aug. 31, 2015, Rakib, Shlomo Selim.
Updated portions of prosecution history of EP11735370.6, Apr. 8, 2015 (mailing date), Gainspeed, Inc.

\* cited by examiner

Simplified CATV spectrum diagram

Digitizing data and sending it as variously addressed digital data steams at same λ

Prior Art (downstream)

VIRTUAL CONVERGED CABLE ACCESS PLATFORMS FOR HFC CABLE NETWORKS

CLAIM OF BENEFIT TO PRIOR APPLICATIONS

This application is a continuation of U.S. patent application Ser. No. 14/098,656, filed Dec. 6, 2013, now published as US publication 2014/0101711. U.S. patent application Ser. No. 14/098,656 is a continuation of PCT application PCT/US13/69760, "VIRTUAL CONVERGED CABLE ACCESS PLATFORMS FOR HFC CABLE NETWORKS", filed Nov. 12, 2013, inventor Shlomo Selim Rakib; U.S. patent application Ser. No. 14/098,656 also claims the priority benefit of U.S. provisional patent application 61/870,226 "VIRTUAL HFC CONVERGED CABLE ACCESS PLATFORM", inventor Shlomo Selim Rakib, filed Aug. 26, 2013; U.S. patent application Ser. No. 14/098,656 is also a continuation in part of U.S. patent application Ser. No. 13/674,936 "HYBRID ALL DIGITAL FIBER TO CATV CABLE SYSTEM AND METHOD", filed Nov. 12, 2012, now U.S. Pat. No. 8,782,729; U.S. patent application Ser. No. 14/098,656 is also a continuation in part of U.S. patent application Ser. No. 13/756,302 "METHOD OF TRANSFORMING HFC CATV ANALOG FIBER TRANSMISSION TO DIGITAL FIBER TRANSMISSION", inventor Shlomo Selim Rakib, filed Jan. 31, 2013, now U.S. Pat. No. 8,910,230; U.S. patent application Ser. No. 14/098,656 is also a continuation in part of U.S. patent application Ser. No. 13/964,394 "HFC CABLE SYSTEM WITH ALTERNATIVE WIDEBAND COMMUNICATIONS PATHWAYS AND COAX DOMAIN AMPLIFIER-REPEATERS", inventor Shlomo Selim Rakib, filed Aug. 12, 2013; application Ser. No. 13/964,394 is also a continuation in part of U.S. patent application Ser. No. 13/346,709 "HFC CABLE SYSTEM WITH WIDEBAND COMMUNICATIONS PATHWAYS AND COAX DOMAIN NODES, filed Jan. 9, 2012, now U.S. Pat. No. 8,510,786; U.S. patent application Ser. No. 14/098,656 is also a continuation in part of U.S. patent application Ser. No. 13/555,170 "DISTRIBUTED CABLE MODEM TERMINATION SYSTEM WITH SOFTWARE RECONFIGUABLE MAC AND PHY CAPABILITY", inventor Shlomo Selim Rakib, filed Jul. 22, 2012, now U.S. Pat. No. 8,644,706; and application Ser. No. 13/555,170 is also a continuation in part of U.S. patent application Ser. No. 13/035,993 "METHOD OF CATV CABLE SAME-FREQUENCY TIME DIVISION DUPLEX DATA TRANSMISSION", inventor Shlomo Selim Rakib, filed Feb. 27, 2011, now U.S. Pat. No. 8,365,237; application Ser. No. 13/555,170 also claimed the priority benefit of U.S. provisional application 61/511,395 "IMPROVED HYBRID FIBER CABLE SYSTEM AND METHOD", inventor Shlomo Selim Rakib, filed Jul. 25, 2011; U.S. patent application Ser. No. 14/098,656 is also a continuation in part of U.S. patent application Ser. No. 13/400,415 "METHODS OF ADAPTIVE CANCELLING AND SECONDARY COMMUNICATIONS CHANNELS FOR EXTENDED CAPABILITY HFC CABLE SYSTEMS", inventor Shlomo Selim Rakib, filed Feb. 20, 2012, now U.S. Pat. No. 8,863,213; U.S. patent application Ser. No. 14/098,656 is also a continuation in part of U.S. patent application Ser. No. 12/907,970 "HFC CABLE SYSTEM WITH SHADOW FIBER AND COAX FIBER TERMINALS", inventor Shlomo Selim Rakib, filed Oct. 19, 2010, now U.S. Pat. No. 8,826,359; application Ser. No. 12/907,970 was a continuation in part of application Ser. No. 12/692,582 "Distributed Cable Modem Termination System", inventor Shlomo Selim Rakib, filed Jan. 22, 2010, now U.S. Pat. No. 8,311,412; application Ser. No. 12/907,970 also claimed the priority benefit of U.S. provisional application 61/385,125 "IMPROVED HYBRID FIBER CABLE SYSTEM AND METHOD", inventor Shlomo Selim Rakib, filed Sep. 21, 2010; U.S. patent application Ser. No. 14/098,656 is also a continuation in part of U.S. patent application Ser. No. 13/478,461 "EFFICIENT BANDWIDTH UTILIZATION METHODS FOR CATV DOCSIS CHANNELS AND OTHER APPLICATIONS", inventor Shlomo Selim Rakib, filed May 23, 2012, now U.S. Pat. No. 8,773,965; U.S. patent application Ser. No. 13/478,461 claimed the priority benefit of U.S. provisional application 61/622,132 "EFFICIENT BANDWIDTH UTILIZATION METHODS FOR CATV DOCSIS CHANNELS AND OTHER APPLICATIONS", inventor Shlomo Selim Rakib, filed Apr. 10, 2012; the contents of all of these applications are incorporated in their entirety by reference.

BACKGROUND OF THE INVENTION

Field of the Invention

This invention is in the field of hybrid optical fiber and CATV cable communications systems and methods.

Description of the Related Art

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

Over the years, this 1940's and 1950's era system has been extended to provide more and more functionality. In recent years, the CATV system has been extended by the use of optical fibers to handle much of the load of transmitting data from the many different CATV cables handling local neighborhoods, and the cable head or operator of the system. Here the data will often be transmitted for long distances using optical fiber, and the optical (usually infrared light) signals then transformed to the radiofrequency (RF) signals used to communicate over CATV cable (usually in the 5 MHz to 1-GHz frequencies) by many local optical fiber nodes. Such systems are often referred to as hybrid fiber cable systems, or HFC systems. The complex electronics that are used by the cable operator to inject signals (e.g. data) into the system, as well as extract signals (e.g. data) from the system are often referred to as Cable Modem Termination Systems or CMTS systems.

A more detailed discussion of prior art in this field can be found in U.S. Pat. No. 8,311,412, the contents of which are incorporated herein by reference.

Prior art work with various types of CMTS systems and fiber nodes includes Liva et. al., U.S. Pat. No. 7,149,223; Sucharczuk et. al. US patent application 2007/0189770; Sawyer et. al., US patent application 2003/0066087; and Amit, U.S. Pat. No. 7,197,045.

U.S. patent application Ser. No. 12/692,582, now (U.S. Pat. No. 8,311,412) taught the advantages of producing a new type of optical fiber node, there called a Cable Modem Remote Termination System (CMRTS) device, which essentially pushed much of the functionality (such as generating QAM signals) of the prior art Cable Modem Termination Systems (CMTS) from the central cable head down to many distributed optical fiber nodes servicing neighborhood CATV cables Motorola, in February 2012, proposed a non-virtual "Converged Cable Access Platform" (CCAP). This is exemplified in their February 2012 publication CCAP 101: Guide to Understanding the Converged Cable Access Platform. As they discussed, "With consumers demanding more content on more screens, cable operators are seeking a cost-effective strategy for migrating from conventional MPEG-based video delivery to IP video transport. The Converged Cable Access Platform (CCAP) was designed with this goal in mind, and proposes to combine data and video delivery as a first step on the migration path. While cable operators today implement data and video QAMs on separately managed and controlled platforms, CCAP provides a blueprint for combining CMTS and edge QAM functionality in one hardware solution. CCAP promises significant improvements in QAM channel density, and the flexibility for cable operators to expand data and video services while also planning for a future world of all-IP delivery."

Other recent work on Converged Cable Access Platforms includes the Cable labs Specification for Data-Over-Cable Service Interface Specifications Converged Cable Access Platform Converged Cable Access Platform Architecture Technical Report CM-TR-CCAP-V03-120511, released May 11, 2012.

Juniper Networks MX 3D Universal Edge routers were described in Juniper Networks datasheet 1000208-006-EN April 2010, "MX Series 3D Universal Edge Routers".

BRIEF SUMMARY OF THE INVENTION

The present disclosure teaches a virtual converged cable access platform (virtual CCAP) system and method for hybrid fiber CATV (HFC) cable networks. The system uses a new type of digital optical fiber node (DOFN) configured to receive optical fiber data packets, and reconstitute the optical data packets into RF waveforms suitable for injection into the system's CATV cable. The system uses the virtual CCAP to essentially replace legacy HFC head ends with a simplified "virtual head ends". The invention's virtual CCAP (often spoken of in the alternative as a "virtual head end") operates using a new type of virtual CCAP controller (often abbreviated as "controller) and virtual CCAP software (often abbreviated as "software") that in turn controls high performance edge routers. Much of the intelligence of running the HFC cable system is managed by the controller software, while the edge router manages the interface between the CATV portion of the system and outside networks. The system can handle even legacy CATV RF signals by appropriate conversion operations, while reducing power and space needs, and improving operational flexibility.

The present invention's virtual CCAP system and method is based upon a substantial amount of recent work by the inventor, much of which was recently disclosed in the various priority documents referenced by this disclosure (in particular U.S. patent applications 61/870,226, U.S. Ser. No. 13/674,936 and U.S. Ser. No. 13/756,302). To thus adequately explain the present invention, it will be necessary to explain the context in which the present form of the invention was derived. Thus a substantial portion of the present disclosure will focus first on a review of the inventor's recent work on systems and methods to provide HFC networks where the optical fiber portion of the network transmits information in a pure digital format, while the CATV RF cable portion of the network may continue to transmit legacy CATV RF waveforms. Once this portion of the invention is disclosed, which in turn is heavily utilized in this disclosure's virtual CCAP/virtual head end art, it can in turn be used as a foundation upon which to better explain the it will be easier to explain the invention's virtual CCAP/virtual head end art.

Thus the present application, which focuses on concepts to provide virtualized converged cable access platform technology (virtual CCAP architecture), can be viewed, in part, as a further refinement of the concepts previously discussed in applicant's U.S. patent application Ser. No. 13/756,302, the contents of which are directly incorporated in the present disclosure. Thus in this specification, the teachings of applicant's recent U.S. patent application Ser. No. 13/756,302 are first and reviewed. Following this review, the present further refinements and variants of the present application, which focus more specifically on certain virtual CCAP architecture concepts, will then be discussed.

As previously discussed in applicant's previous U.S. Ser. No. 13/756,302 disclosure, as user demand for ever increasing amounts of downstream and upstream bandwidth increases, further improvement and advances in HFC technology are needed.

The U.S. Ser. No. 13/756,302 and U.S. Ser. No. 13/674,936 art was based, in part, upon the insight that in order to make further advances in HFC technology, deviations from both the prior art schemes to allocate upstream and downstream data on the CATV portion of the HFC network, and deviations from the prior art schemes to allocate upstream and downstream data on the fiber portion of the HFC system, would be useful.

The optical waveforms presently used on the fiber portion of optical fiber wavelengths of present HFC systems are often just frequency shifted versions of the same waveforms used to transmit RF signals on the CATV cable. Although these direct RF to optical and back to RF waveform reproduction methods have the advantage of simplicity, due to various optical fiber signal propagation effects, such as Raman scattering, such RF to optical shifted CATV waveforms make inefficient use of available optical fiber spectrum. This is because due to these various optical fiber effects, the various waveforms become smeared or distorted, resulting in crosstalk between neighboring optical fiber wavelengths, and the optical versions of the basic RF CATV waveforms are not at all optimized to cope with these effects.

The U.S. Ser. No. 13/756,302 art and U.S. Ser. No. 13/674,936 art was also based, in part, on the insight that by shifting to alternative types of waveforms, such as the waveforms used to transmit Gigabyte Ethernet (GigE) signals (which often use more distortion resistant waveforms such as binary phase shift keyed (BPSK) or quadraphase-shift keying (QPSK) modulation), a much higher amount of data may be sent over the optical fiber. The rate of data transmission per wavelength can be much higher, and different wavelengths may be spaced much closer together. Other benefits, such as lower noise level, and less power utilization, may also be realized.

The burdens of shifting from legacy HFC systems, which operate by essentially sending the optical counterparts of standard CATV RF waveforms, such as optical versions of QAM waveforms, over optical fiber, to a more advanced system that operates with alternative types of waveforms, should be appreciated. Over the years, there has been an expenditure of tens of billions of dollars or more in legacy HFC system infrastructure, along with a huge investment in various software systems to manage this legacy infrastructure. It is simply not practical to scrap this massive investment overnight.

The U.S. Ser. No. 13/756,302 and U.S. Ser. No. 13/674,936 art was also based, in part, on the insight that to minimize the cost of transitioning to a next-generation digital optical fiber based HFC system, those solutions that at least initially preserve large portions of legacy HFC systems, while also providing the benefits of digital optical fiber transmission, will often be preferable. In particular, "plug-in" head-end solutions, which enable legacy HFC head end systems to continue to operate by generating various RF waveforms at the head end, but which then efficiently demodulate or digitize these RF waveforms for optical fiber transmission have benefits in this regard. These "plug-in" head end solutions will work in conjunction with "plug-in" optical fiber node solutions that can then also efficiently remodulate, or digital to analog convert, the digital optical fiber data back into various RF waveforms suitable for injection into neighborhood CATV cable. Such "plug-in" solutions can, for example, minimize the burden of writing new management software because the process of demodulating or digitizing RF waveforms, although of course requiring some hardware for this purpose, is from a software perspective relatively simple. Even the process of compressing and decompressing this data before and after digital optical fiber transmission is also relatively simple. Similarly the process of taking the optically transmitted demodulated data or digitized data and in turn using it to modulate various CATV RF transmitters (or digital to analog converters) at the optical fiber node, although again requiring some new optical fiber node hardware, is also not complex from the software perspective. To the operator of the HFC system, the transition to digital optical fiber transmission can be, at least at first, almost totally transparent. The operator can continue to operate the head end using legacy software and systems, yet reap the benefits of digital optical fiber data transmission.

An additional advantage was that once suitable next generation digital fiber optic nodes (DOFN) are in place, the HFC system operator then gains the freedom to make additional head end improvements. In particular, legacy equipment that generates head end RF waveforms can gradually be phased out, and the head end equipment eventually be replaced with equipment that simply transmits digital data to the various CATV digital optical fiber nodes, according to a schedule that makes sense to the HFC system operator. The invention thus provides a gentle path that allows a legacy HFC system to be upgraded to a more efficient and more flexible all-digital (at least prior to the actual neighborhood CATV cable, which may still rely on RF waveforms as desired) system as a gradual series of steps.

According to applicant's more recent insights virtual CCAP architecture concepts, previously disclosed in U.S. provisional application 61/870,226, also used as a priority document for the present disclosure, further improvements are still desirable. In particular, improved methods of reducing the space and power requirements for providing head end cable access functionality is desirable. This can be done, in part, by combining edge QAM functions with various cable modem termination system (CTMS) functions, as described herein.

Much of other prior art to increase the data carrying capability of CATV systems has focused on various iterations of the Data-Over-Cable Service Interface Specifications (DOCSIS) standards. Recent developments in these standards are exemplified by the Data-Over-Cable Service Interface Specifications Converged Cable Access Platform Converged Cable Access Platform Architecture Technical Report CM-TR-CCAP-V03-120511, released May 11, 2012, the contents of which are incorporated herein by reference.

Other recent versions of this system are exemplified by the Data-Over-Cable Service Interface Specifications Converged Cable Access Platform (CCAP™) Operations Support System Interface Specification CM-SP-CCAP-OSSI-I05-130808, the contents of which are incorporated herein by reference.

As previously disclosed in priority application U.S. Ser. No. 13/756,302 and U.S. Ser. No. 13/674,936, and as reiterated herein, art was disclosed that was relevant to various methods of converting legacy HFC CATV cable systems, which transmit data over the optical fiber portion of the system using the optical counterpart of analog RF waveforms, such as RF QAM waveforms transduced to corresponding optical QAM waveforms, to improved HFC CATV systems that transmit data over the optical fiber using optical fiber optimized protocols, such as Ethernet frames and other optical fiber optimized digital transport protocols. Thus most aspects of the legacy HFC CATV system may be retained, however at the CATV head end, the optical fiber transmitter system may be replaced by an improved system that extracts the underlying symbols from legacy waveforms, packages these symbols into optical fiber optimized packets, and transmits downstream. The legacy optical fiber nodes may be replaced with improved nodes capable of receiving the packets and remodulating the symbols into RF waveforms suitable for injection into the system's CATV cable.

The present application and invention is based, in part, on the further insight that once only digital signals are transmitted over the optical fiber, then this creates an opportunity to further streamline and improve the HFC cable head end. In particular, although recent work in this field has taught various attempts to provide Converged Cable Access Platforms (CCAP), once only digital signals are being transmitted over the optical fiber, CCAP systems can be simplified and virtualized to a much greater extent than was previously contemplated or previously believed to be possible.

In particular, the invention is based, in part, on the concept that further virtualization of the Converged Cable Access Platform (CCAP) as a type of improved cable head end, combined with use of digital optical fiber nodes (DOFN) previously taught in applicant's recent parent application Ser. Nos. 13/756,302 and 13/674,936 (and also discussed herein), is both possible and desirable. Such an improved virtual cable converged access platforms enable a comparatively simple and low cost to implement, yet extremely capable and high capacity improved HFC CATV system with a new type of virtual head end.

The invention is also based, in part, on the insight that it would be useful to map DOCSIS functionality onto edge router functionality. The invention in particular explores how legacy head end HFC cable systems can be almost entirely replaced with the invention's controllers, edge routers, and invention's digital optical fiber nodes, also called "Gainspeed Ethernodes". Of course new (non-legacy) HFC cable systems can also be constructed according to this art as well.

DETAILED DESCRIPTION OF THE INVENTION

Figure 1:
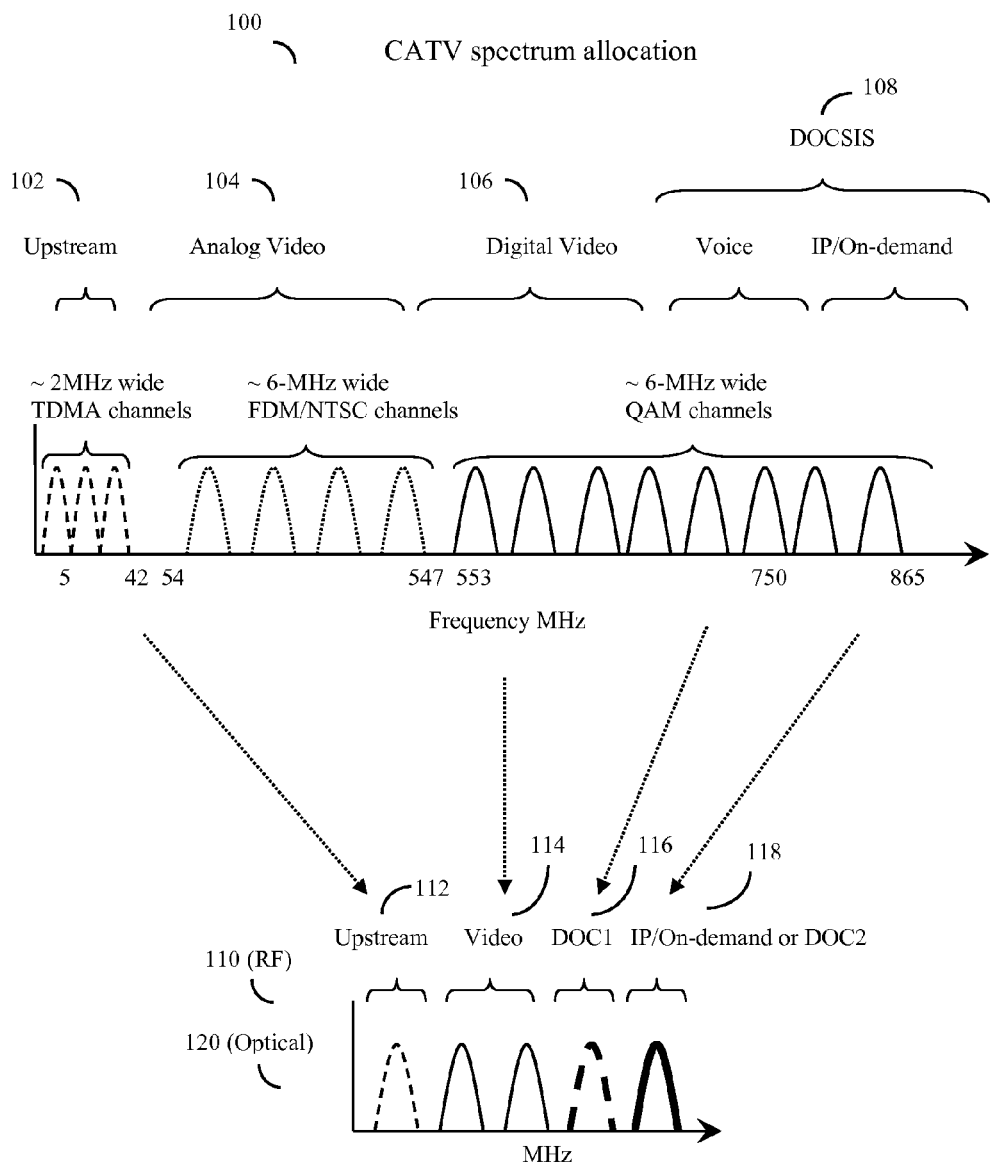
FIG. 1 shows an overall view of the various frequencies and data channels that are presently allocated for a typical CATV cable carrying legacy analog television FDM channels, QAM digital television channels, and various types of DOCSIS data.

Nomenclature: In this specification, the term "legacy signals" when pertaining to RF waveforms, will often be used to describe various older standard CATV RF signals such as NTSC (television) signals, FM radio signals, set top box signals and the like. It should be understood, however, that the invention's methods will in fact operate with any type of RF signal. Thus the term legacy signals, although intended to improve readability by reminding the reader that the invention's methods are particularly useful for coping with various CATV legacy RF waveforms, is not otherwise intended to be limiting.

Legacy signals, when pertaining to optical fiber transmission methods, will generally refer to prior art methods which simply transformed the RF waveforms, such as QAM RF waveforms, into optical waveforms while retaining the essential characteristics (e.g. shape) of the RF waveforms. Continued Discussion:

Although this particular specification is more focused on the head end of the HFC system, note this is head end improvement is in turn based on a number of previously discussed HFC system improvements. For the sake of completeness, and to provide an overall picture of how many of these improvements can be combined to incrementally produce a very advanced HFC system with both improved cable heads and improved optical fiber nodes, these various CATV cable system upgrades will also be described.

Prior art CATV systems use the radio-frequency (RF) CATV cable spectrum inefficiently. Much of the available 5 MHz to approximately 1 GHz CATV frequency is presently filled up with QAM channels that, most of the time, are carrying downstream data that is not actually being used (at that time) by the various households that are connected to the cable. Another problem with prior art approaches is that only a tiny region of CATV spectrum (usually 5-42 MHz), is allocated for upstream data. This relatively narrow region of frequencies must carry the upstream data for the entire CATV neighborhood. This results in great limitations on the bandwidth or amount of data that can be uploaded from the various households. Thus typical CATV systems are asymmetric, with the downstream data rates being much higher than the upstream data rates.

Thus one aspect of the present disclosure teaches new HFC systems and methods to carry much higher amounts of upstream and downstream data. On the fiber portion of the HFC system, the disclosure teaches use of non-CATV compatible waveforms (e.g. GigE rather than QAM waveforms) which can carry much higher amounts of data over long distances. On the cable portion of the HFC system, art relevant to improved systems and methods that utilize the limited 5 MHz to 1-GHz bandwidth of CATV cable more efficiently is also taught.

The improved head end concepts of the present invention rely, in part, on the use of intelligent optical fiber nodes, such as those previously taught in the various priority documents.

In some embodiments, the invention may be a system or a method based on digital optical fiber nodes operating in a Hybrid-Fiber CATV-Cable (HFC) network. Such systems generally comprise a cable head end (here an improved cable head end is also taught), which is often in IP communication with an IP backbone such as the Internet or other high speed digital network. These HFC networks also generally also comprise one or more optical fibers in communication with the head end, as well as at least one and often many digital optical fiber nodes (DOFN).

These digital optical fiber nodes have some elements in common with the Cable Modem Remote Termination Systems (CMRTS) and Digital Cable Modem Remote Termination systems (D-CMRTS) previously described by inventor in applications such as Ser. No. 13/674,936 the contents of which are incorporated herein by reference. As a result, these digital optical fiber nodes (DOFN) will frequently be discussed in the alternative in this disclosure as D-CMRTS units, or as Gainspeed EtherNodes.

To form an HFC system (using either a legacy head end or the presently disclosed improved head end), these various DOFN or D-CMRTS units will be connected to (i.e. in RF communication with) various CATV cables (e.g. coax cable, capable of RF transmissions), and at least one CATV cable device which will be various cable modems, set top boxes, digital televisions, computers, and the like.

Although, as discussed in the earlier disclosures, the inventor's earlier D-CMRTS/DOFN units were designed from the beginning with a high capability to provide additional data handing capability to CATV systems (e.g. above and beyond the present DOCSIS 3.0 standard), one challenging problem is how to provide even more functionality while still providing the ability to gracefully operate in an environment with varying amounts of legacy equipment. As will be discussed, the DOFN can operate with either legacy head ends, or with the improved virtual CCAP head ends disclosed herein.

A unique aspect of the present disclosure is that the improved DOFN or D-CMRTS units disclosed herein, while providing advanced functionality, and often totally abandoning use of optical versions of the standard QAM, NTSC, FM waveforms on optical fiber, can still be highly capable of operating with legacy equipment.

Here, systems are disclosed that are designed with a high capability to operate in the digital optical fiber domain (e.g. using optical fiber digital transport protocols such as GigE) while still providing CATV RF signals carrying various types of legacy analog CATV RF waveforms, such as analog NTSC television channels, FM audio channels, QPSK channels, QAM channels and the like. The present methods have the additional advantage that because digital data transport protocols can easily carry data packets to and from many alternative addresses, the invention's methods can operate without requiring the use of, for example, large numbers of alternative optical fiber wavelengths. By contrast, under prior art methods, use of large numbers of alternative optical fiber wavelengths was required in order to accommodate the many different types of analog legacy CATV waveforms that can originate from many different types of legacy optical fiber nodes.

According to this disclosure, such improvements can be made by, for example, converting legacy CATV analog waveforms to a digital form by high speed analog to digital converters and or QAM waveform demodulation into the underlying QAM symbols. This approach has the advantage that these waveforms can then be transformed to digital data packets (IP data packets) without the system otherwise needing to understand what the underlying data content of the waveforms is.

Such QAM symbol methods were previously disclosed by inventor in inventor's copending U.S. patent application Ser. No. 13/478,461 "EFFICIENT BANDWIDTH UTILIZATION METHODS FOR CATV DOCSIS CHANNELS AND OTHER APPLICATIONS", the contents of which are incorporated herein by reference.

The digitized waveform data can then be transported as IP packets over the HFC optical fibers using digital optical fiber data transmission format such as GigE.

More specifically, CATV legacy downstream RF waveforms of any type (e.g. NTSC, FM, QPSK) and/or more standard CATV downstream RF waveforms such as various QAM waveforms can be digitized by using a high speed analog to digital converter or other method to sample and digitize these legacy downstream RF waveforms, thus producing digital samples of the legacy downstream RF waveforms. This digital data which can then be converted to IP packets and sent over the optical fiber. Alternatively, and more efficiently in the case where more standard RF QAM waveforms are being transmitted downstream, these RF QAM waveforms, which are complex waveforms constructed using various underlying QAM symbols, may be demodulated and the underlying QAM symbols determined. These demodulated QAM symbols can then also be converted to various data packets and optically transmitted downstream over the HFC optical fiber or fibers.

Once in the form of IP data packets, low cost equipment such as inexpensive switches can then be used to easily sort and transport these IP data packets to and from various devices. Indeed, as will be discussed, entire legacy head ends can be replaced with improved head ends based upon relatively inexpensive high capacity switches such as edge routers, and appropriate control software and systems.

To reconstruct these various legacy CATV RF waveforms, at the digital optical fiber node(s) or D-CMRTS/DOFN unit(s), various RF digital reconstitution devices may be configured to accept the digital samples of downstream RF waveforms (which were digitally transmitted downstream over the optical fiber), and reconstitute these digital waveform samples into one or more downstream digitally reconstituted RF waveforms channels that essentially reproduce the original RF waveforms.

Alternatively or additionally, at the digital optical fiber node(s) or D-CMRTS/DOFN unit(s) there can also be one or more remodulator devices configured to accept the downstream digital QAM symbols that were transmitted over the optical fiber, and remodulate these QAM symbols into one or more downstream QAM symbol, again producing remodulated RF QAM waveforms and channels that essentially reproduce the original RF QAM channels.

To provide still higher levels of service (e.g. to provide higher CATV data carrying capability, and provide functionality beyond the present DOCSIS 3.0 standard), the digital optical fiber nodes or D-CMRTS/DOFN units will often also contain one or more IP to QAM conversion devices such as QAM modulators. These QAM modulators may be configured to accept downstream digital IP data packets transmitted over the optical fiber, and to modulate these digital IP data packets into one or more downstream IP based RF QAM channels. These can be broadcast QAM channels, narrowcast QAM channels, on-demand QAM channels, and so on.

Often, according to applicant's art, the digital optical fiber nodes or D-CMRTS/DOFN units will employ two or more of the above options, and will thus use a RF combiner device configured to combine any of these digitally reconstituted RF channels, QAM symbol remodulated RF QAM channels and these IP based RF QAM channels, and then transmit these various RF channels downstream over the CATV cable to the various CATV cable devices.

In one embodiment, applicant further teaches a method of converting legacy HFC CATV cable systems, which transmit data over the optical fiber portion of the system using the optical counterpart of analog RF waveforms, such as RF QAM waveforms transduced to corresponding optical QAM waveforms, to improved HFC CATV systems that transmit data over the optical fiber using optical fiber optimized protocols, such as Ethernet frames and other optical fiber optimized digital transport protocols. According to this embodiment, many aspects of the legacy HFC CATV system may be retained.

Here, at the CATV head end, if the user wishes to retain the legacy head end, the optical fiber transmitter system may be replaced by an improved system that extracts the underlying symbols from legacy waveforms, packages these symbols into optical fiber optimized packets, and transmits downstream. The legacy optical fiber nodes are replaced with improved optical fiber nodes capable of receiving the packets and remodulating the symbols into RF waveforms suitable for injection into the system's CATV cable. Alternative methods based upon using an improved virtual CCAP/virtual head end will be discussed shortly.

Optical Fiber Data Transmission Methods:

As previously discussed, prior art schemes of transmitting HFC data in the form of one or more CATV analog modulated wavelengths of light, along optical fiber, tended to be inefficient. That is, the prior art methods limited the amount of data that could be sent. This is because the analog waveforms used to transmit RF signals on CATV cable work inefficiently when transposed to optical wavelengths. Due to various effects including Raman scattering, and other non-linear optical fiber effects, when too many analog modulated light wavelengths are placed onto an optical fiber too close together (in terms of wavelength differences), cross-talk between the different wavelengths tends to degrade the complex CATV RF analog signals (usually composed of many QAM modulated waveforms) to the point where crosstalk may render the signals useless.

As a result, to prevent the CATV modulated analog signal from degradation when carried over optical fiber, the wavelengths must be rather widely spread out. Thus due to cross talk effects, an optical fiber may only be capable of transmitting a few (e.g. 8) inefficiently modulated CATV signals, each transmitting about 6 Gigabits of data per second.

By contrast, if more efficiently digitally modulated signals (e.g. GigE data formats) were used, the same stretch of optical fiber might be capable of transmitting many more wavelengths (e.g. 80) of signals, and each wavelength in turn may transmit far more data, such as between 10-100 Gigabits of data per second.

Application Ser. No. 12/692,582, now (U.S. Pat. No. 8,311,412) taught the advantages of producing a new type of optical fiber node, there called a Cable Modem Remote Termination System (CMRTS) device, which essentially pushed much of the functionality (such as generating QAM signals) of the prior art Cable Modem Termination Systems (CMTS) from the central cable head down to many distributed optical fiber nodes servicing neighborhood CATV cables. Thus according to application Ser. No. 12/692,582, non-CATV compliant signals may be sent to and from the central cable head to various remote CMRTS optical fiber nodes by optical fibers carrying light modulated by more efficient digital Ethernet protocols (e.g. GigE signals). The CMRTS optical fiber nodes then converts these non-CATV compliant signals into CATV compliant RF signals, such as a plurality of different RF QAM modulated signals, and/or other types of signals.

Parent and copending application U.S. Ser. No. 13/674, 936, which was a CIP of Ser. No. 12/692,582, further built upon this concept, and further taught the advantages that can be obtained by reducing or dropping additional backward compatibility requirements, such as the requirement that legacy RF waveforms (e.g. QAM waveforms) be transmitted along the HFC optical fiber(s) while preserving the essential waveform characteristics (e.g. requiring that the optical QAM waveforms be the same as the RF QAM waveforms).

Other departures from pure backward compatibility may also be reduced. For example, according to the invention, the prior art CATV upstream requirements that upstream data must be carried as a number of 2 MHz wide QAM channels in the 5-42 MHz region, may be dropped in favor of alternate upstream schemes that provide for greater amounts of upstream data to be transmitted. That is the 5-42 MHz region may be extended into the higher frequency ranges—for example extended to the 5-547 MHz region, which will allow for a higher rate of upstream data to be transmitted, but of course will cut into the rate of transmission of downstream data.

In some aspects, the present invention can be viewed as dropping still one more requirement for head end backward compatibility, in favor of the present virtual CCAP/virtual head end concepts.

However even if the upstream bandwidth problem is solved at the CATV cable side of the HFC system, the optical fiber itself, if used according to prior art schemes (e.g. shove the analog signal over the optical fiber in an essentially unchanged form) will now be rate limiting. That is, if a large number of different neighborhoods, each with their own stretch of CATV cable, are now enabled to start transmitting much more upstream data, unless the method of sending data over the fiber portion of the HFC network is changed, there will soon be a bottleneck at the fiber stage. This is because the prior art HFC methods of handing upstream data would, in general, simply convert the analog RF modulated CATV upstream waveforms into equivalently modulated optical fiber infrared light waveforms, and then transmit this data back over the optical fiber. Although such conversion processes can be easily done with inexpensive converters, this scheme has the drawback, as previously discussed, that they are not optimized for optical fiber. Consider the problem of pooling upstream data from multiple neighborhoods. Although the data CATV RF data from each neighborhood might be converted to a slightly different infrared frequency, put on optical fibers, the fibers combined and a composite multiple wavelength signals sent upstream, the inefficient CATV RF modulation schemes mean that each wavelength will carry only a relatively small amount of data. Further, due to crosstalk effects, the number of different neighborhoods worth of data that can be pooled is also limited. So due to prior-art inefficiencies, the potentially very large ability of the optical fiber to carry upstream data rapidly becomes limiting.

However, again by reducing the requirements that the HFC system be fully backward compatible in terms of inefficiently carrying legacy analog RF waveforms over optical fiber; the much higher amount of upstream bandwidth that would be generated under the invention can now be handled by repackaging the upstream data into more efficient modulation formats, such as the digital (GigE) modulation format, before transmitting the data on the optical fiber. Thus, according to the present invention, a smaller number of higher data density and more efficiently modulated optical fiber optimized signals, such as GigE data packets may now sent. This overcomes the inefficiencies of prior-art optical fiber modulation schemes, and helps remove the optical fiber upstream transmission bottleneck.

As per inventor's previously disclosed U.S. patent application Ser. Nos. 12/692,582 and 13/674,936, the present disclosure relies, in part, upon a radically different CMTS design in which the QAM modulators in the CMTS PHY section (used to ultimately provide the waveforms used to send RF data signals to a given individual cable) are often not located at the central cable head, but rather are divided and pushed out to the distant optical fiber nodes of the HFC network. That is, in contrast to prior art designs, were the QAM modulators were are located in the PHY units of main (centralized, e.g.—cable head) CMTS line cards on the central CMTS units; in the present invention, some or all of the QAM modulators are located in the PHY sections of remote or distributed CMRTS optical fiber nodes.

Inventor's recently disclosed parent U.S. application Ser. No. 13/674,936 taught that, as a less favored embodiment, and when greater compatibility with legacy equipment is desired, at least some of the QAM modulators or other RF signal generators such as NTSC television, FM radio, set top box QPSK signals and the like can still remain at the head end.

By contrast, the present specification now requires that all legacy RF waveforms previously output by the legacy head end equipment, and now output by the invention's improved virtual CCAP head end, must be digitized before optical transmission. This digitization can be done by various means, including high frequency analog to digital sampling, or by for example demodulating various QAM or OFDM waveforms, determining the underlying QAM or OFDM symbols used to generate the QAM or OFDM waveforms, and digitally sending the results. At the optical fiber node, these RF waveforms can then be regenerated, for example by digital to analog conversion and RF modulation, or using the digitally sent QAM or OFDM symbols to control one or more RF QAM or OFDM modulators.

Thus, according to the present invention, essentially all data will be transmitted downstream and upstream over the optical fiber to the various DOFN optical fiber nodes in a digital format. This digital format may be in the form of standard IP packet type digital data. Upstream data will also be transmitted in a digital form as well. The DOFN optical fiber nodes can examine the data packets, determine which packets correspond to what signals, and for example then use the appropriate data packets to drive various optical fiber located RF QAM modulators (e.g. for broadcast QAM signals, narrowcast QAM signals, DOCSIS QAM signals, etc.) as desired.

When the present disclosure merely speaks to more incremental upgrades in the head end of the HFC system, which can be a useful intermediate step to understanding how the invention's virtual CCAP methods operate, the higher capacity cable modem termination system (CMTS) at the head end will often be referred to as D-CMTS units, where the D again is used to symbolize the digital encoding capability of the D-CMTS units. The outputs from these units are generally used to drive one or more head-end optical fiber lasers (e.g. optical transmitters). These optical fiber laser transmitters, and their associated electronic equipment, are often referred to as legacy optical fiber transmitter systems.

As per the CMRTS units that were previously disclosed in Ser. No. 12/692,582, the D-CMRTS/DOFN units disclosed herein will often also be located at the final network fiber nodes (FN) between the fiber portions of the HFC system, and the cable portions of the HFC system.

In the CMTS systems previously disclosed in U.S. application Ser. No. 12/692,582, some QAM modulators were located in the centralized CMTS PHY sections at an upgraded legacy version of the cable head, while some QAM modulators were located at the remote CMRTS units. The upgraded legacy cable head CMTS QAM modulators were used for sending data, such as a standardized package of cable TV channels and perhaps a basic level of DOCSIS service, which might be generally requested by many neighborhoods; over optical fiber using RF CATV (e.g. QAM) modulated infrared light signals. This helped maintain backward compatibility with prior art HFC systems. The present application abandons this, and instead sends out only digital data from the virtual CCAP head end.

In this present disclosure, and as previously anticipated by applicant's priority documents, U.S. Ser. No. 13/674,936 and U.S. Ser. No. 13/756,302, in order to focus on aspects of the invention that can provide higher amounts of upstream and downstream data to subscribers, this type of backward compatibility now abandoned. In the present embodiment, all data traveling over the optical fiber will be digitally encoded according to optical fiber optimized formats, rather than simply optical versions of legacy RF waveforms.

When used in a less preferred embodiment with legacy head ends, or even as needed with the invention's all digital virtual CCAP head end, to maintain backward compatibility, the various legacy head end waveforms, such as QAM waveforms, NTSC television waveforms, QPSK waveforms and the like (during transmission over optical fiber both downstream from the head end to the optical fiber nodes, and upstream from the optical fiber nodes to the head end) can be digitized prior to transmission by various methods, and then reconstituted after optical fiber transmission as needed. As previously discussed, these digitization methods can range from brute force (i.e. simple high speed analog to digital sampling at around the Nyquist frequency (e.g. 2× the highest frequency of the underlying waveform), as well as more sophisticated methods such as demodulating the various QAM or OFDM waveforms to extract the underlying QAM or OFDM symbols used to produce the RF waveforms in the first place.

Often the brute force, high frequency analog to digital sampling methods may be more suitable for legacy NTSC, FM, or QPSK waveforms (channels). By contrast, QAM or OFDM demodulation methods may be more suitable for QAM channels transmitting various SD or HD digital television, DOCSIS QAM or OFDM channels, and the like.

Thus the preferred embodiment of the present invention may have no QAM modulators at the virtual CCAP cable head whatsoever, and send pure non-CATV compatible waveforms (e.g. digital IP data packets) through the optical fibers. These systems may rely on the remote D-CMRTS/DOFN units to generate all of the downstream QAM signals in the system.

Thus in one embodiment, the invention may be a method for enhancing the data carrying capacity of a hybrid fiber cable (HFC) network with either a legacy cable head or an improved cable head, an optical fiber network, a plurality of optical fiber nodes, a plurality of individual CATV cables connected to the plurality of optical fiber nodes (D-CMRTS/DOFN units), and a plurality of individual cable modems, each with differing data requirements, connected to each of the individual CATV cables.

This method may work by using at least one optical fiber, operating at one or more wavelengths, to transport a first set of downstream data from the either legacy or improved cable head to the optical fiber nodes. This first set of downstream data will generally be transmitted in a digital format that is not capable of being directly injected into individual CATV cables by simple optical to RF converters.

Here, generally so much data may be transmitted that if all of the first set of downstream data was converted into RF QAM waveforms, the bandwidth of this data would exceed the available bandwidth of any of the individual CATV cables in the system. To avoid this problem, generally only a selected portion of this first set of downstream data will be converted into downstream RF QAM waveforms at these optical fiber nodes.

What portions of the optical fiber downstream data are selected for any given CATV cable neighborhood (with its own optical fiber node and CATV cable) may differ. At the optical fiber nodes, data packets will be selected, and these selected data packets will be converted into downstream RF QAM waveforms that in turn will be injected into the individual CATV cables.

Here, the main constraint is that for each individual CATV cable the downstream RF QAM waveforms should be selected so that the sum total of the selected downstream RF QAM waveforms does not exceed the available bandwidth of the individual CATV cables.

In a preferred embodiment, the invention's D-CMRTS/DOFN units will often be designed to be highly software configurable, so that the ability of the D-CMRTS/DOFN units to operate their remote or distributed QAM modulators to send downstream data, as well as the ability of the D-CMRTS/DOFN units to operate various RF packet processors that receive multiple RF bursts of modulated upstream data from various cable modems, demodulate the bursts, digitize and reassemble this upstream data into packets, and retransmit this data back upstream, can be reconfigured by remote software. Such methods can greatly simplify the management and configuration of the distributed D-CMRTS/DOFN network. As will be discussed, this management and configuration process will often be managed by the virtual CCAP controller and software (1102).

Figure 7:
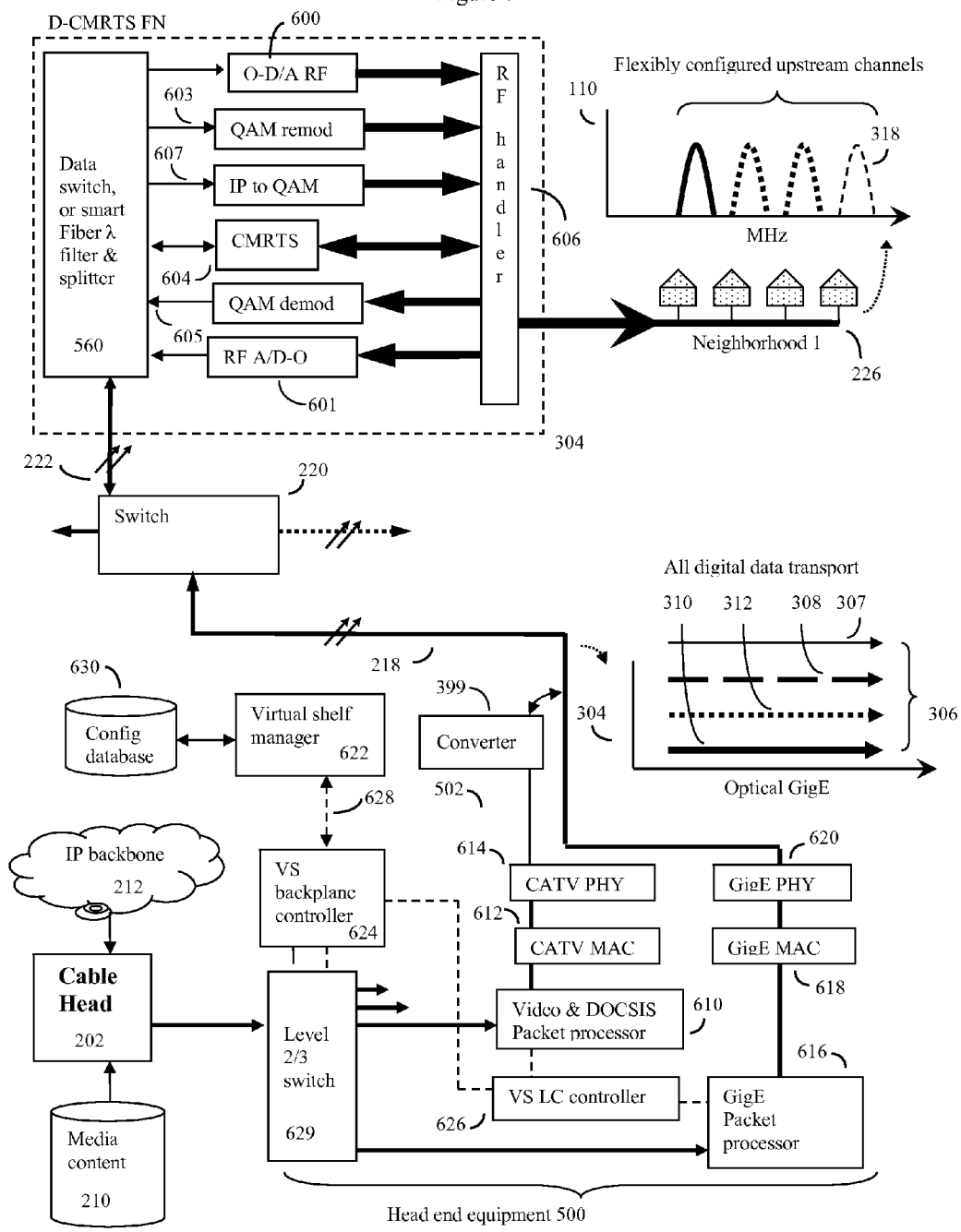
FIG. 7 shows a more detailed view showing one embodiment of how the D-CMRTS or DOFN fiber nodes may operate.

As one simplified example, in order to supply a standardized set of TV channels and other services to three cables in three neighborhoods, legacy head end equipment may have QAM modulators in their PHY units (See FIG. 7, 614) set to drive an optical fiber with multiple QAM signals at optical wavelengths. By contrast, as will be discussed, the invention's improved virtual head end (virtual CCAP head end) will generally entirely lack any QAM modulators, and will generally not operate in this mode. However FIG. 7 is still useful because the invention's improved virtual head end has to in essence cope with the lack of head end QAM modulators by instead sending out digitized QAM symbol data packets instead.

To convert to a legacy head end to digital optical fiber transmission, while maintaining high levels of backward compatibility, as an initial first step (later to be abandoned in the virtual CCAP approach), the legacy head end may have digital converter units (399) (occasionally referred to in the alternative as a digital optical fiber transmitter system), that can intercept output from the legacy head end QAM, FM, QPSK modulators and other RF modulators (614), and digitize this output by relatively unintelligent methods (high speed analog to digital converters, QAM or OFDM waveform demodulation into QAM or OFDM symbols). The digital output from these converters can then be packaged into appropriate digital data packets, such as GigE data packets, and transmitted along optical fiber (218) along with other digital traffic (e.g. from GigE PHY modulators 620) to the optical fiber nodes.

Figure 11:
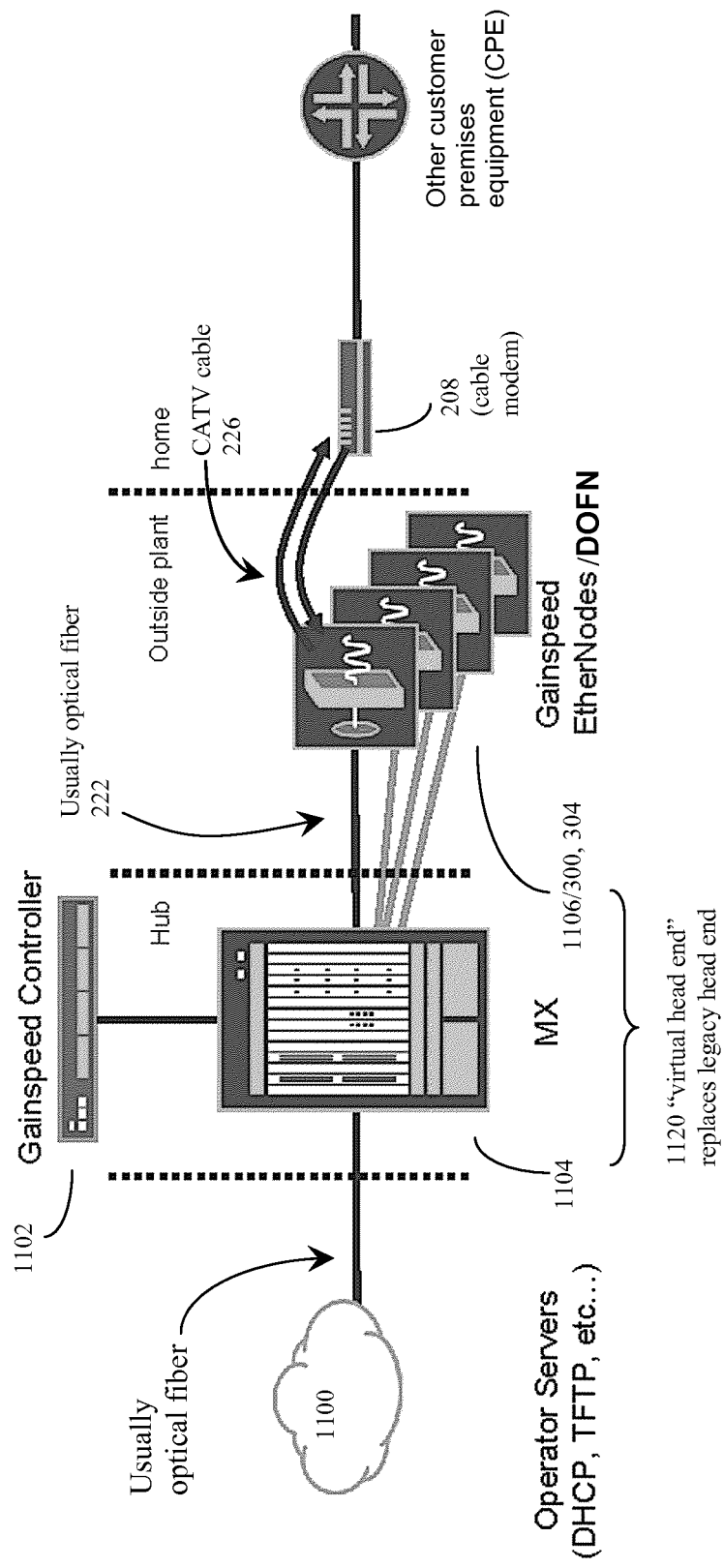
FIG. 11 shows one embodiment of the virtual converged cable access platform (e.g. virtual CCAP, virtual cable head).

Jumping momentarily to FIG. 11, the invention's virtual CCAP approach generally assumes that the virtual head end is being fed previously digitally converted signals from the various operator servers (1100), although if this is not available, a digital converter unit (300,304) can also be placed in between the operator server (1100) and the virtual head end (1120) as needed.

In a process where a legacy HFC system is being gradually converted over to the invention's improved system, in some neighborhoods, simple "dumb" converters and "dumb" optical fiber nodes can take this digital data from the legacy head end equipment (614), and convert it back to legacy QAM, FM and QPSK signals by various simple methods such as digital to analog conversion (600), QAM remodulation using the QAM symbols (603), and the like. These "dumb" converters and optical fiber nodes can then inject these reconstituted RF signals into those neighborhood CATV cables (226) that are equipped with "dumb" converters and optical fiber nodes.

In the preferred embodiment, as previously discussed, the cable head end may have no QAM modulators (or other modulators such as FM and QPSK modulators in their CATV PHY units 614), and all signals going out to the various D-CMTRS/DOFN optical fiber nodes along the fiber portion of the network (218) may be digitally modulated in GigE or other format.

Some of the examples in this specification, such as FIG. 7, show a mixed mode of operation, where a slightly upgraded legacy head end is being used, and some legacy "dumb" converters and optical fiber nodes in some neighborhoods work in conjunction with more advanced D-CMRTS/DOFN optical fiber nodes in other neighborhoods. Other examples show a pure GigE mode where backward compatibility with dumb optical fiber nodes is no longer required.

Since the D-CMRTS/DOFN units will often use optical fibers and various Digital Ethernet (GigE) protocols as their primary means of communication, this GigE fiber data will require conversion, reformatting, and QAM modulation by the components (e.g. 600, 603) in the remote D-CMRTS units (304). The QAM modulators in the D-CMRTS units will then provide a radiofrequency (RF) QAM signal that can be injected into the cable, and recognized by cable modems attached to the various cables.

As previously discussed, one of the biggest advantages of generating some or all of the CATV RF data at the local D-CMRTS/DOFN optical fiber node is that vast amounts of data can be carried by the optical fiber using modulation schemes, such as the various digital GigE data transmission schemes, that may be optimized for the signal transmission characteristics of the optical fiber media. That is, by eliminating the need for direct and simple conversion to and from the signal waveforms (often QAM waveforms) used to send RF data on CATV cables, the optical fiber signals can both carry more data per wavelength, and also allow for a greater number of signals at nearby optical fiber wavelengths to be sent with minimal interference.

The present disclosure also relies, in part, upon the observation that at the present level of rather coarse granularity (where multiple neighborhoods are served by the same CATV QAM signals) the aggregate demands for IP-on demand data from multiple cables serving multiple neighborhoods may easily saturate the limited CATV bandwidth. That is, absent some sort of customization, it is not possible to send all data to everybody because it won't fit on the CATV cable. However at a finer level of granularity (where each neighborhood might get its own customized CATV signal), the IP-on demand data for an individual neighborhood is more likely to fit within the limited bandwidth of each neighborhood's CATV cable.

The trick is thus to avoid overloading each neighborhood's particular CATV cable bandwidth by picking and choosing the mix of standard QAM and QAM IP/on-demand signals are delivered to each neighborhood.

Software Control Methods:

Although when the DOFN are used with legacy or slightly upgraded legacy head ends, the DOFN approach allows cable operators to largely preserve use of legacy HFC control software, to the point where at least initially, an upgrade to an all digital optical fiber data transmission scheme can be largely software transparent to both the cable operator as well as the various CATV user households as well. However as will be discussed, the virtual CCAP software needed to implement the present invention's improved virtual head ends will generally require a more substantial software revision. Nonetheless, much of the basic structure and functionality of the legacy HFC control software will be reflected in the virtual CCAP software used to run the virtual CCAP controller (FIG. 1102), and thus unless otherwise stated, the upgraded software will generally have a similar type basic functionality, but now ported into the all-digital edge router control realm.

In particular, however, because the invention also uses all digital optical fiber data transmission schemes, for still more advanced functionality to be implemented as desired, these more advanced (non-transparent) software control methods will also be described.

Certain aspects of the virtual CCAP control software can be adapted from the methods previously discussed in applicant's U.S. application Ser. No. 12/692,582, incorporated herein by reference.

The invention's improved virtual CCAP head end may, for example, manage the available bandwidth on the various cables that serve the various neighborhoods. When used in a less backward compatible, higher performance mode, such as a phase 3 upgrade step to be discussed later on in this specification, the computerized system may vary both the "standard" QAM channels (if any) being transmitted by any given D-CMRT/DOFN, as well as the user-customized or "premium" IP/on-demand QAM or edge QAM channels being transmitted by the various D-CMRTS/DOFN units.

To contrast with legacy head ends, in CATV jargon, the various CMTS systems at a legacy cable head are often referred to as a "shelf" or "CMTS shelf" (500). In the present embodiment, the system has completely distributed the functionality of the CMTS unit from the cable head to D-CMRTS/DOFN units that are distributed to the far-flung optical fiber nodes throughout the entire network.

In some situations, it may be useful from a network management perspective to continue to communicate with the various network distributed D-CMRTS/DOFN units as if they were still a single legacy cable head CMTS (500). Thus, in one embodiment, this virtual CCAP software that can be used to manage the network distributed CMTS can be considered to be "virtual shelf" hardware and software. This is because the virtual CCAP controller (1102) and edge router (1104) may both manage the complex configuration issues involved in running a distributed CMTS system, and then shield this complexity from the rest of the system when needed.

Thus, in some embodiments, the invention's virtual CCAP software, also called the virtual shelf hardware/software system may, for example, take as inputs, user demand over multiple neighborhoods for basic TV channels and basic DOCSIS services, user demand in individual neighborhoods for advanced or premium on-demand TV or premium DOCSIS IP service (IP-on demand), and the limited number of total QAM channels that can be carried over cable.

In some embodiments, the invention's virtual CCAP software, used to control controller (1102) may instruct the D-CMRTS/DOFN units to reallocate their neighborhood CATV spectrum or modulation scheme to allow for more upstream data to be transmitted. For example, the D-CM-RTS units may work with various CATV cable connected residential gateways (See FIG. 10) to allocate a greater amount of CATV bandwidth to upstream data.

The invention's virtual CCAP software (virtual shelf system) may also, through controller (1102) and edge server (1104) then instruct the remote D-CMRTS/DOFN units on the fiber node serving the target neighborhood to take the IP/on-demand data, decode and QAM modulate the data using local CMRTS devices (604), and inject this now RF modulated QAM data on the cable for that particular neighborhood.

The virtual CCAP control system software (virtual shelf system) can also instruct another remote D-CMRTS/DOFN unit on a different fiber node serving a different neighborhood to take the IP/on-demand data for this neighborhood from the massive amount of downstream GigE data, decode and QAM modulate this data and inject this now RF modulated QAM data on the cable for this neighborhood as well.

Note that by this method, the overall CATV QAM channels may not be the same for each neighborhood. Rather, at least for the IP/On-demand data, the same QAM channel (frequency) may now carry different data for different neighborhoods.

Using these systems and methods, the effective data carrying capacity of the various cables and QAM channels has been increased. Yet, at the same time, if the virtual CCAP software and controller (1102) (virtual shelf) are properly configured, most of the complexity of this more advanced switching arrangement can still be selectively hidden from both the upstream (cable head) and downstream (cable modem) systems, thus enabling good backward compatibility with existing HFC equipment and systems as desired.

Equipment Needed to Demodulate/Digitize Legacy Signals:

In the legacy head end embodiments previously taught by applicant, such as Ser. No. 13/675,936 and other discussions, incorporated herein by reference, in some embodiments, the system could work essentially independently of the legacy CMTS or D-CMTS units at the cable head, and merely acted to supplement the functionality of prior art legacy equipment by adding a minimal amount of new equipment at the cable head. Although the present application abandons the concept of legacy head ends in favor of the present improved head end approach, it is still useful to review how legacy head ends may be used, in order to better understand the basic challenges faced in controlling the present invention's improved virtual head ends.

One comparatively simple method to upgrade legacy head ends to provide all digital over optical fiber signals is to use various digital converters (399) that convert the legacy QAM, FM, QPSK waveforms for digital output. Unit (399) in this embodiment should also be considered to have enough onboard computing functionality to extract this data, subsequently package the data into the appropriate digital optical fiber data transport format, such as various Ethernet packets, and also to provide the fiber optic light source (e.g. one or more optical fiber laser transmitters) to transmit the digital optical fiber signals.

For more advanced functionality (e.g. Phase 3 functionality) other optional equipment used to upgrade legacy head ends may consist of a media Level 2/3 switch (629), a virtual shelf management system (622, 630), and appropriate MAC and PHY devices to send and receive data along optical fibers.

In some embodiments, in order to facilitate the process of upgrading the DOFN from legacy head ends to the present invention's improved virtual head end, it may be useful to implement the DOFN using software configurable components (e.g. using FPGA and DSP components), as per the teaching of parent patent application Ser. No. 13/555,170, the contents of which are incorporated herein by reference. In these embodiments, the HFC system operator need merely send appropriate configuration software over the optical fiber to, for example, a phase 1 DOFN to upgrade its capability, without the need for sending crews out into the field to perform manual DOFN upgrades.

In applicant's earlier disclosures, applicant taught somewhat upgraded legacy head ends with an advanced D-CMTS/DOFN (Digital Cable Modem Termination System) head (500) with at least a first packet switch, a first MAC (Media Access Control), and a first PHY (Physical Layer) that optionally may be capable of sending and receiving data from a layer 2-3 switch to a first end of a first optical fiber as at least a plurality of first digitally encoded analog QAM waveforms (first optical signals).

Applicant also taught that in other embodiments, this first PHY (614) and MAC (612) may be omitted, and instead the upgraded legacy D-CMTS head may instead use only a second MAC (618) and a second PHY (620) capable of sending and receiving data from the layer 2-3 switch to the optical fiber.

According to the present invention, essentially the entire cable head (202) and head end (500) equipment is now replaced with the virtual head end (500).

Note however that even under the present invention, some sort of legacy head end that sends analog signals can still exist, at least on a different optical fiber wavelength. That is, as previously discussed, although in the preferred embodiment, all HFC optical fiber signals will be sent in a digital format, the system can still operate in a still higher backward compatible mode. Here a backward compatible wavelength, such as the standard HFC 1310 nm wavelength, may be reserved for prior art analog modulated optical fiber signals (e.g. QAM waveforms) (which may then be digitized for optical fiber transmission by a converter unit). The invention's digital signals will then operate on a different wavelength and a second head end PHY may send and receive data from the IP backbone using this alternate optical wavelength.

In some embodiments, if any legacy signals continue to exist, it may be convenient to send both any legacy (digitized analog modulated optical fiber signals) data and the advanced data using similar digital protocols (e.g. various IP digital protocols such as GigE). This because then the same switches may be used to handle both the legacy signals and the advanced functionality signals. This is because when all data flows using the same type of digital protocol, as then simple switches can be used to send relevant data packets to the relevant destinations, and handle these data packets using the appropriate equipment once the data packets reach their intended destination.

As previously discussed, although in some embodiments, data may be sent and received using as many optical fiber wavelengths as desired, the invention's digital optical fiber transmission techniques can reduce the necessity for using multiple optical fiber wavelengths, and in turn reduce costs.

In the case where some legacy HFC backward compatibility (at least at a different optical fiber wavelength) is still desired, the D-CMRTS/DOFN fiber node(s) may optionally incorporate one or more external "dumb" digital optical to RF (radio frequency) conversion devices (see FIG. 6, 401) that directly any and all signals sent on the legacy optical fiber wavelength. These are typically designated as O-D/A-E or A-E/O-D (i.e. optical-digital to analog electronic, or analog electronic to optical digital) converters, depending upon the direction of the electrical RF to digital fiber optic conversion. Thus in some embodiments, at least as a backup, this functionality may be incorporated into the D-CMRTS/DOFN nodes as well (e.g. 600, 601, 603, and 605).

In alternate and often more expensive (but higher performance) embodiments where the D-CMRTS/DOFN (300), (304) unit is designed to operate at a plurality of different optical wavelengths, the units may incorporate one or more wavelength splitting devices, such as Brag filters, prisms, gratings, and the like as part of the unit's internal switch (560), to separate and combine the various optical fiber wavelengths as desired. In some embodiments, these wavelength splitters may be tunable wavelengths splitters that may operate under software control. Although within the scope of the invention, such embodiments tend to be somewhat more expensive due to the costs of the extra equipment. Thus such multiple wavelength embodiments will typically be used more in very high (e.g. demanding) data transport situations.

The D-CMRTS/DOFN may have at least one (and often a plurality of, e.g. as many as 160 or more) CATV RF signal generators, such as QAM or OFDM modulator devices. These devices will be capable of detecting and encoding selected portions of the digitally encoded optical fiber data (such as the underlying QAM or OFDM symbol data) into various types of RF CATV waveforms. The device's switch (560) may, for example, be used to sort out digitally sampled legacy RF signals, and send these to a digital-optical to analog-electrical (RF) converter (600), thus producing copies of the original legacy RF signals. The switch may also be used to sort out demodulated legacy QAM signals (waveforms) which contain the underlying QAM symbols, and send these QAM symbols to QAM modulators (603), thus producing copies of the original legacy RF QAM symbols by another method. The switch may also be used to handle IP data packets from the IP backbone connected to the head end, and send these to appropriate QAM modulators (e.g. edge-QAM modulators 607 or 604). This later is particularly useful for various video on demand and DOCSIS applications.

The QAM or OFDM modulator(s) may be part of a D-CMRTS/DOFN PHY unit, and at least more advanced embodiments of the D-CMRTS/DOFN may often have the corresponding MAC and packet switching capability, as well as an optional controller (e.g. microprocessor and associated software) to select the appropriate portions of the digitally modulated optical signals (and wavelengths if necessary) and also control the packet switching, MAC and PHY (including the D-CMRTS QAM modulators) units as needed.

More advanced embodiments of the D-CMRTS/DOFN will also usually contain at least one software controllable switch that can be remotely directed (usually by the controller (1102)) to select at least some of the digitally encoded optical signals and direct the at least one D-CMRTS QAM modulator devices to encode the selected optically transmitted digital data into various of RF QAM waveforms at a selected set of frequencies (remotely generated QAM signals). Often this software controllable switch will be part of, or be controlled by, an optional processor or controller.

The D-CMRTS/DOFN may also contain at least one remotely software controllable RF packet processor capable of detecting upstream data carried by CATV RF upstream signals generated by at least one cable modem, and digitally repackaging and this upstream data and digitally retransmitting this upstream data along the optical fiber.

The software controllable switch(s) and/or software controllable RF packet processor(s) may optionally be capable of being remotely configured by software (e.g. controller software (1102)) to implement at least a subset of the standard DOCSIS upstream and downstream functions. For example, on the upstream side, one or more of the DOCSIS upstream Time Division Multiple Access (TDMA) and DOCSIS Synchronous Code Division Multiple Access (SCDMA) functions may be implemented. On the downstream side, one or more of the various DOCSIS QAM modulation modes, such as 16-level, 32-level, 64-level, 128-level, and 256-level QAM modulation modes may be implemented. Depending upon the level of functionality of the D-CMRTS that is desired, the D-CMRTS may, at the fiber node, generate QAM channels carrying digital broadcast video, digital video on demand, digital High Definition (HD) video, Voice data, and DOCSIS (data) channels.

As previously discussed in Ser. No. 13/674,936, and elsewhere, at least some embodiments of the CMRTS/DOFN units were disclosed as being capable of implementing additional functions that are not yet officially part of the DOCSIS specification (i.e. non-DOCSIS functionality), such as upstream data from various new models of non-DOCSIS standard set-top box gateways, may also be implemented by the D-CMRTS/DOFN. Here addition of additional or non-standard functionality is facilitated by the fact that the present invention's virtual head end (1120) is highly configurable. Thus by merely implementing a software upgrade to the virtual CCAP controller software (1120), and by sending a software upgrade to reconfigurable DOFN (e.g. FPGA/DSP configurable DOFN), major upgrades in HFC system capability become quite feasible.

Here some of this optional non-standard functionality is discussed in more detail. More advanced versions of the D-CMRTS/DOFN unit may be configured to implement additional functions that are not yet officially part of the DOCSIS specification (i.e. non-DOCSIS functionality). This additional functionality can include ability to handle an increased amount of upstream data from various new models of non-DOCSIS standard set-top box gateways. As another example, more advanced D-CMRTS/DOFN units may be capable of more intelligently allocating the downstream QAM channels depending upon data content need messages generated by more advanced set top boxes in various households. That is, if a household needs access to a particular video channel, for example, the household's set top box may send a command to the local D-CMRTS/DOFN unit requesting this channel. This channel may already be available to the D-CMRTS/DOFN unit because it has access to a vast stream of data from the optical fiber connection, but in order to preserve scarce CATV bandwidth, the local D-CMRTS/DOFN unit will only allocate a CATV QAM channel for this data upon request. Other embodiments of the D-CMRTS/DOFN unit may also be capable of many other functions as well.

As another example, one persistent problem with CATV cable is that the signal attenuation properties of the RF signals vary as a function of frequency, as well as the particular characteristics of that stretch of cable. Lower frequency channels will degrade differently from higher frequency channels. It is difficult, with the present "one size fits all" scheme where all QAM channels at all frequencies are generated at the cable head, to put out a standard CATV signal where all QAM channels are modulated the same regardless of frequency. By contrast, since a D-CMRTS/DOFN unit may generate some or all RF channels (e.g. QAM RF channels) locally, it is possible to use various software adjustable parameters to spectrally shape the various RF QAM waveforms to adjust for the attenuation over frequency properties of the that neighborhood's CATV cable. Thus in contrast to prior art methods, where often some of the lower or higher frequency channels have more noise, it will now be possible to ensure that all channels have low noise, regardless of the frequency of the channel.

Thus the present disclosure teaches methods that enable a cable provider, over a series of gradual system upgrades as desired, to increasingly be able to distinguish itself by being able to provide cutting edge services that are ahead of its competitors. Various levels of D-CMRTS/DOFN can be provided, from simple units designed for near transparent upgrades of legacy HFC systems, to more advanced D-CMRTS/DOFN units that can handle either a superset of the DOCSIS functions or a completely different set of functions, because it can be used to extend the functionality of the HFC system far beyond that of the standard DOCSIS functions. Additionally, as per the main focus of the present application, the legacy head end may be replaced by a more efficient virtual head end.

Here the term "superset" is being used to denote the additional (non-standard DOCSIS) functionality. Thus, for example, a D-CMRTS/DOFN that has enough backward compatibility to do either a full set of DOCSIS functions or a subset of DOCSIS functions would be described as implementing a DOCSIS "superset" if it also implements additional non-standard DOCSIS functions. Other examples of additional non-standard DOCSIS functionality (non-DOCSIS functionality) includes functionality to transmit various forms of digital video such as standard digital video, high definition HD digital video, and various forms of digital video upon demand.

The various D-CMRTS/DOFN devices will usually have software controllable switch(s) and software controllable RF packet processor(s), and will often also incorporate their own microprocessors or microcontrollers, as well as memory (such as flash memory, ROM, RAM, or other memory storage device) to incorporate software needed to operate the switches and processors, interpret command packets sent from the virtual shelf manager, and transmit data packets to the virtual shelf manager.

For greater flexibility, the various D-CMRTS/DOFN devices may be constructed using various software reconfigurable Field-programmable gate arrays (FPGA) and Digital signal processor (DSP) devices for their various MAC and PHY units, as described in more detail in copending application Ser. No. 13/555,170, "DISTRIBUTED CABLE MODEM TERMINATION SYSTEM WITH SOFTWARE RECONFIGURABLE MAC AND PHY CAPABILITY", the contents of which are incorporated herein by reference. These FPGA and DSP units may be software reconfigured to enable various types of QAM and other modulation scheme transmitters and receivers, such as filter bank transmitters and filter bank receivers. These may be constructed following the methods of Harris et. al., ("*Digital Receivers and Transmitters Using Polyphase Filter Banks for Wireless Communications*", IEEE Transactions on Microwave Theory and Techniques, 51(4), pages 1395-1412, 2003). Other alternative methods may also be used.

The D-CMRTS/DOFN units will also often have an RF combiner device, or at least be attached to a combiner device (such as a Diplex or Multiplex device), that combines all of the various RF QAM and other CATV signals to produce a combined RF signal suitable for injection into a CATV cable connected to at least one cable modem. The diplex or multiplex device may also serve as a frequency splitter, or an adjustable frequency splitter, directing some frequency ranges (e.g. 5-42 MHz for upstream functions, and other frequency ranges (e.g. 54-870 MHz) for downstream functions. These frequency ranges may be adjusted under software control as desired.

Alternatively, this multiplex device may be external to the actual D-CMRTS/DOFN unit; however the D-CMRTS unit will normally depend upon either an internal or external combiner (e.g. a diplex or multiplex device) for functionality.

As previously discussed, one particular advantage of the present disclosure's virtual CCAP or virtual head end is that when more advanced functionality is desired, it can often be implemented by upgrading the virtual CCAP controller software (1102).

To do this, as previously discussed, because the prior art (non-dispersed functionally) CMTS units were often referred to as a "shelf", the virtual CCAP controller software that controls the functionality of the virtual head end and the more advanced dispersed D-CMRTS/DOFN units of this invention will be referred to in the alternative as a "virtual shelf". This "virtual shelf" software will ideally manage the virtual head end (1120) as well as the dispersed D-CMRTS/DOFN system in a way that will be easy to manage, and ideally sometimes almost transparent, to the cable head operator, so that the more complex data distribution properties of the invention's dispersed D-CMTS-D-CMRTS system can be handled as if the system behaved more like a simpler, prior art, CMTS system.

For more advanced functionality, one important function of the controller computer processor and "virtual shelf" software (1120) will be to select and control at least the digital optical signals and the remotely generated QAM signals or OFDM signals. These can be managed in a way that, as will be discussed, greatly increases the amount of IP-on-demand data available for cable system users.

FIG. 1 shows an overall view of the various frequencies and data channels allocated for prior art CATV systems (100). Typically the lower frequencies, such as 5-42 MHz, were allocated for use in transmitting data "upstream" from the individual cable modems back to the Cable Head (102). Typically upstream data was transmitted using a time-share TDMA (Time Division Multiple Access) manner in which individual cable modems are allocated certain times on roughly 2 MHz wide QAM channels to transmit data. Starting at around 54 MHz on up to roughly 547 MHz, space was allocated for legacy analog video channels (104), which transmit on roughly 6 MHz wide FDM channels. At frequencies above that, frequencies (space, bandwidth) was allocated for digital television transmitting on roughly 6 MHz wide QAM channels (106), and above that, space was allocated for DOCSIS services (108) that may transmit voice, on-demand video, IP, and other information, again generally as a series of 6 MHz wide QAM channels. Above about 1 GHz, cable bandwidth is and was seldom used, although future services may extend further into this region.

The invention is indifferent as to the use of higher frequency cable bandwidth and channels. If available, the invention may use them. If not available, the invention will cope with existing cable frequencies and bandwidth.

Prior art CATV cable thus had a finite bandwidth of at most about 100-200 downstream QAM channels, and a very limited upstream bandwidth. When this bandwidth is used to serve a large amount of different customized types of data to a large amount of different subscribers, this bandwidth quickly becomes exhausted. Due to the extreme constraints on upstream bandwidth, upstream bandwidth quickly became limiting.

A drawing showing how the prior art CATV spectrum allocation can be described in a more simplified diagram is shown below (110), (120). This diagram will be used in various figures to more clearly show some of the CATV spectrum allocation aspects of the invention, as well as to show how the invention may deviate from the prior art CATV spectrum allocation on occasion.

The "upstream" segment (112) is an abstraction of all prior art CATV upstream channels, including both presently used upstream channels in the 5-42 MHz region. The "video" segment (114) is an abstraction of both the almost obsolete prior art analog TV FDM channels, as well as the standard "digital video" channels, as well as the projected digital video channels that will occupy the soon to be reclaimed analog bandwidths once the analog channels are phased out. Segment (114) also represents other standard digital radio and FM channels, and in general may represent any standardized set of downstream channels that will usually not be customized between different sets of users and neighborhoods.

The "DOC1" channel (116) may be (depending upon mode of use) either a full set or subset of present or future DOCSIS channels. As commonly used in this specification, DOC1 often represents a basic set of DOCSIS services that would be made available for fallback use by neighborhoods in the event of a failure of the higher performance IP/on demand or DOC2 channels (118). The DOC1 QAM channels are normally chosen so as to not exhaust the full bandwidth of the CATV cable, so that at least some remaining QAM channels are available for the neighborhood customized DOC2 channels. The "IP/On-demand or DOC2" channel (118) is essentially (depending upon mode of use) the remaining available downstream bandwidth on the CATV cable, and is usually reserved for transmitting neighborhood specific data (IP/On-demand data), often transported by a different communications media (such as a second fiber or second wavelength, and often by a non-QAM protocol) from the cable head to individual neighborhoods.

Note that when discussing prior art usage, the sum of the DOC1 (116) and IP/On demand (118) channels sent by optical fiber to a group of neighborhoods can never (or at least should not ever to avoid interference) exceed the effective bandwidth (i.e. the carrying ability of the CATV cable and the ability of cable modems to detect the cable RF signal) of the CATV cable.

By contrast, when discussing the invention, the sum of the DOC1 (116) and IP/On-demand (118) channels sent by optical fiber to a group of neighborhoods will often exceed the effective bandwidth of the CATV cable on a group of neighborhoods basis, although the sum of DOC1 (116) and IP/On-demand (118) RF waveforms or signals will never exceed the effective bandwidth of the CATV cable on a per-neighborhood basis.

If the same CATV spectrum is transmitted by optical methods (i.e. optical fiber), so that the same waveforms are transmitted at the same frequency spacing, but simply transposed to optical wavelengths, then this spectrum will be designated as (120), but the various waveforms will otherwise keep the same nomenclature to minimize confusion.

Some embodiments, the invention may also intentionally deviate from this prior art CATV spectrum allocation scheme. In particular, as will be discussed, the amount of bandwidth reserved for upstream data may be substantially increased. This may be done by, for example, deviating from the traditional 4-42 MHz region reserved for upstream data, and allocating a larger number of CATV RF frequencies for upstream data.

Figure 2:
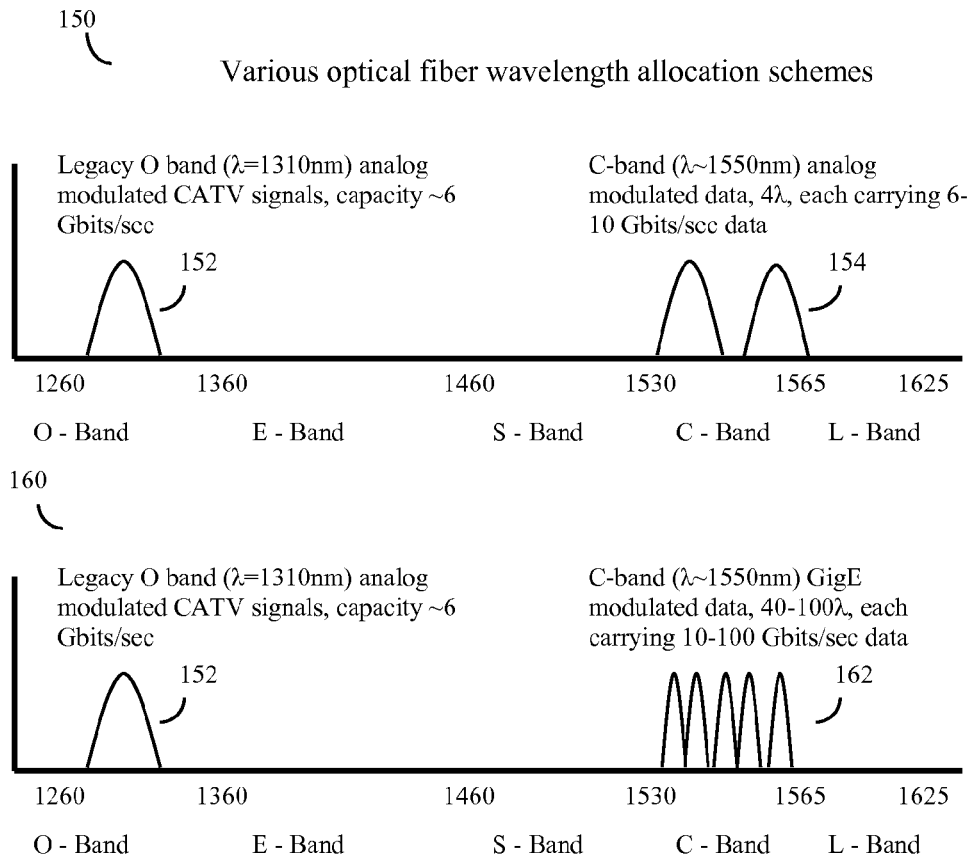
FIG. 2 shows an overall view of the various wavelengths allocated for prior art optical fiber wavelength division multiplexing schemes (150) and dense wavelength division multiplexing (DWDM) schemes (160). Although the present invention may use DWDM methods, it does not require them, and to some extent reduces the need for DWDM methods because it can fit more types of digital data onto a single wavelength using, for example, GigE optical data packets (170).
Figure 2:
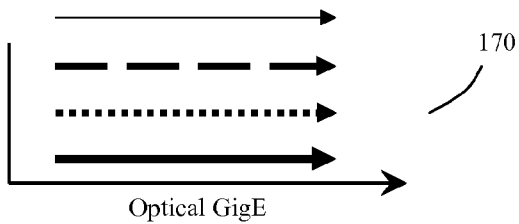

FIG. 2 shows an overall view of the various wavelengths allocated for both prior art optical fiber wavelength division multiplexing schemes, as compared to the dense wavelength division multiplexing (DWDM) methods which may optionally be used in some embodiments of the present invention. Here the optical fiber wavelengths being used at present (150) include a 1310 nm O-band wavelength (152) often used to transmit the various CATV RF channels, such as the various QAM channels, modulated essentially according to the same CATV RF waveforms, but at optical wavelengths according to scheme (120). Supplemental data is often transmitted in the C-band around 1550 nm (154), often on optical wavelengths and waveforms that, because the waveforms are modulated according to non-optimal CATV waveforms, must be separated from each other by a relatively large wavelength separation, and which carry sub-optimal amounts of data per wavelength.

By contrast, when, as in the present embodiment of the invention, all data is transmitted according to the same digital format, such as an IP based GigE format, then it becomes relatively simple to label any type of data as to data type and data destination, dump it in the optical fiber digital stream at the same optical wavelength (170), and then extract the digital data at the other end of the optical fiber, sort by data type and destination, and send it to the proper recipient. This all digital approach thus can have substantial advantages over DWDM methods because the DWDM costs of producing optical modulators (e.g. optical fiber lasers) as well as demodulators, wavelength splitters, and the like, thus can be reduced.

Although the present invention, by virtue of the fact that all data will usually be transmitted digital form over the optical fiber, thus does not require use of dense wavelength division multiplexing (DWDM) methods, it is useful to briefly examine such DWDM methods because they make the advantages of the present invention's all digital approach more apparent.

The Dense Wavelength Division Multiplexing (DWDM) concept is shown in (160), and is discussed in more detail by way of copending application Ser. No. 13/555,170 and provisional applications 61/385,125 and 61/511,395, the contents of which are incorporated herein by reference. These applications taught that backward compatible downstream legacy signals might be transmitted in analog form using, for example, a legacy O-band analog signal, and additional channels and services might be transmitted at multiple wavelengths using more efficiently modulated data signals (such as one of the various optical fiber GigE protocols), for example as a series of closely spaced wavelengths (162). These provisional applications also taught that due to the fact that because use of prior art QAM, NTSC, FM waveforms and the like, when used on optical fiber, is relatively inefficient, on a bits of data per unit bandwidth basis, compared to more modern digital methods of transmitting data, use of digital signal transmission methods offered compelling differences in data transmission rates.

Specifically, whereas prior QAM, NTSC, FM waveform methods might, for example, be used to transmit 4 C-band wavelengths, each carrying about 6 gigabits per second of data, using CATV compatible QAM, NTSC, FM waveforms (154), by switching to digital methods, much higher data rates, such as up to 80 wavelengths of C-band data (162), each carrying 10-100 gigabits of data per second, are possible using more efficient optical fiber signal modulation methods.

The present invention thus builds on this earlier insight, and is based on the further insight that by completely digitizing all optical fiber traffic (e.g. removing the legacy analog waveform optical fiber traffic), intelligently compressing as possible (e.g. using QAM symbol demodulation methods) and going all digital, then on a bits per second basis, much more data may be transmitted using fewer optical wavelengths, thus saving the costs of the extra equipment needed to handle the extra optical wavelengths.

Note however that the present invention still may make use of DWDM methods when, for example, extremely high data transmission rates (bits per second) are desired. However in the present invention, use of all digital optical fiber transmission is now the preferred embodiment, and use of DWDM methods is an optional element that is not required to practice the invention, although it may be.

To help visualize how switching to an all digital optical fiber transport format can help transmit more data over even a single optical fiber wavelength, the simplified digital transmission diagram (170) or (306) is frequently used. Note that a legacy O band analog modulated optical signals (152) or C band optical signals (154) can carry only at most about 6 Gigabits per second (Gbit/s), with an effective bit rate much less than this due to the inefficiencies of the analog format. By contrast, the more efficient digital format can transmit 10, 40, 100, 1000 or more Gbits/second or more at the same wavelength, and here the effective bit rate is very close to the theoretical bit rate. The net effect is that by switching to an all digital mode, the same wavelength on the optical fiber can now transmit much more data than it could earlier.

Figure 3:
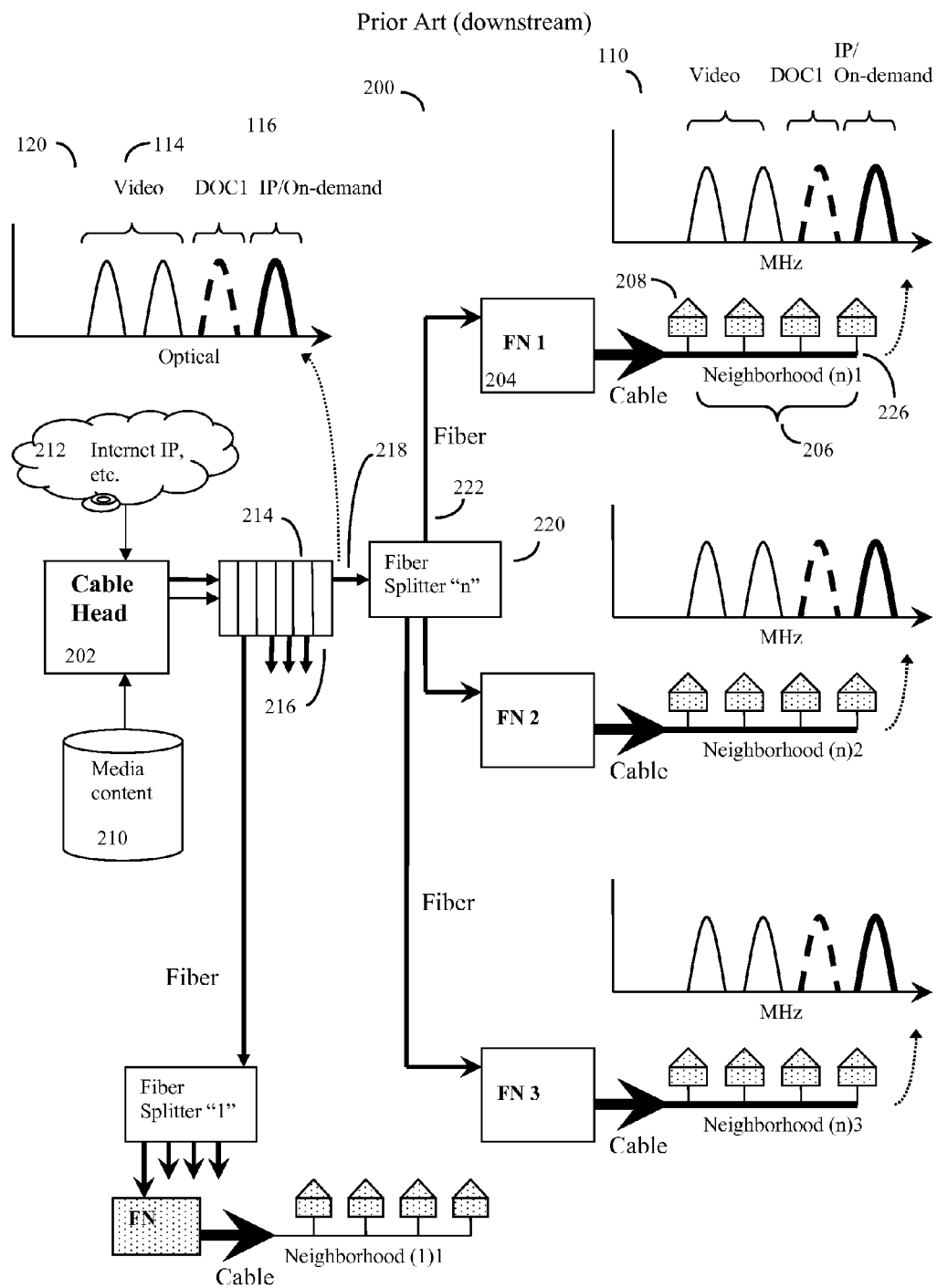
FIG. 3 shows a simplified version of how prior art HFC systems transmit data from the cable head to different optical fiber nodes serving different neighborhoods.

FIG. 3 shows a simplified version of how prior art HFC systems (200) transmit data from the legacy cable head (202) to different optical fiber nodes (204) serving different neighborhoods (206). Each neighborhood will typically consist of up to several hundred different houses, apartments, offices or stores (208) (here referred to generically as "houses"), each equipped with their own cable modems (not shown). Here, for simplicity, only the downstream portion of the HFC system is shown.

The legacy cable head will generally be connected to an IP backbone (212) and/or will obtain standardized media content (210) (such as a standard assortment of analog and digital video channels) from one set of sources, and also obtain more individualized data (212), such as video on demand, IP from the IP backbone which may include both the internet, and other individualized data from other sources. This data is compiled into a large number of different QAM (and at present also FDM) modulated CATV broadcast channels at (214). The CMTS shelf, shown here also (214) will often have a number of different blade-like line cards (216) The various QAM channels and IP data are combined and are transmitted by optical fibers (218) to different areas (groups of neighborhoods).

Note that the FDM modulated CATV broadcast signal is an NTSC analog signal (for older style analog televisions), and even the QAM signal, although it carries digitally encoded information, is itself an analog signal as well. For historical reasons, in the downstream direction, both FDM/NTSC and QAM waveforms (signals) usually have a bandwidth of about 6 MHz in the US.

To show this, as previously discussed in FIG. 1, the FDM/NTSC and QAM signals are shown as having a center wavelength and bandwidth in order to emphasize the essentially analog nature of this signal, even when carrying digital information. These analog signals can be carried by optical fibers, and converted into RF signals for the CATV cable part of the network, using very simple and inexpensive equipment.

As previously discussed, typical HFC networks actually have a rather complex topology. Rather than sending one optical fiber from the CTMS to each different neighborhood, typically optical fibers will serve multiple neighborhoods. To do this, the signal from the CTMS side optical fiber will at least usually be split (by an optical fiber splitter (220)) into several different optical sub-fibers (222), and each sub-fiber in turn will in turn carry the signal to a different fiber optic node (fiber node, FN) (204). Here the rather complex ring topology of HFC networks will be simplified and instead represented by these fiber splitters.

At the fiber node (FN) (204), the optical signal is converted into a CATV radio frequency (RF) signal and sent via CATV cables (226) to individual cable modems at individual houses (208) in each neighborhood. Typically each neighborhood will consist of 25 to several hundred houses, served by a CATV cable (226) that connects to the local fiber node (204).

Since the CATV cable (226) is connected to all of the houses (208) in the neighborhood (206), if the cable modem in one house in a neighborhood wants to request customized on-demand video or IP, then all of the houses in the neighborhood that are attached to that particular CATV cable will actually receive the customized signal. Although only the cable modem associated with the requesting house (not shown) will actually tune into and decode the requested signal, it should be appreciated that if each individual house in the neighborhood were to simultaneously request its own customized set of video on demand or IP at the same time, the limited bandwidth of the CATV cable would be rapidly saturated. As a result, there is an upper end to the amount of customized data that can be transmitted to each house, beyond which bandwidth must be limited and/or requests for additional customized data will have to be denied.

Although the different blades or line cards (216) of the CMTS shelf (214) at the legacy cable head (202) can send different customized IP/on-demand channels to different groups of neighborhoods, the granularity of this process is sub-optimal, because all individual neighborhoods connected to the same fiber splitter will get the same customized IP/on-demand signal. Given the limited bandwidth of the CATV cable, if all neighborhoods get the same signal, then the amount of data that can be sent to each individual neighborhood must, by necessity, be limited so as not to exceed the total available bandwidth.

Figure 4A:
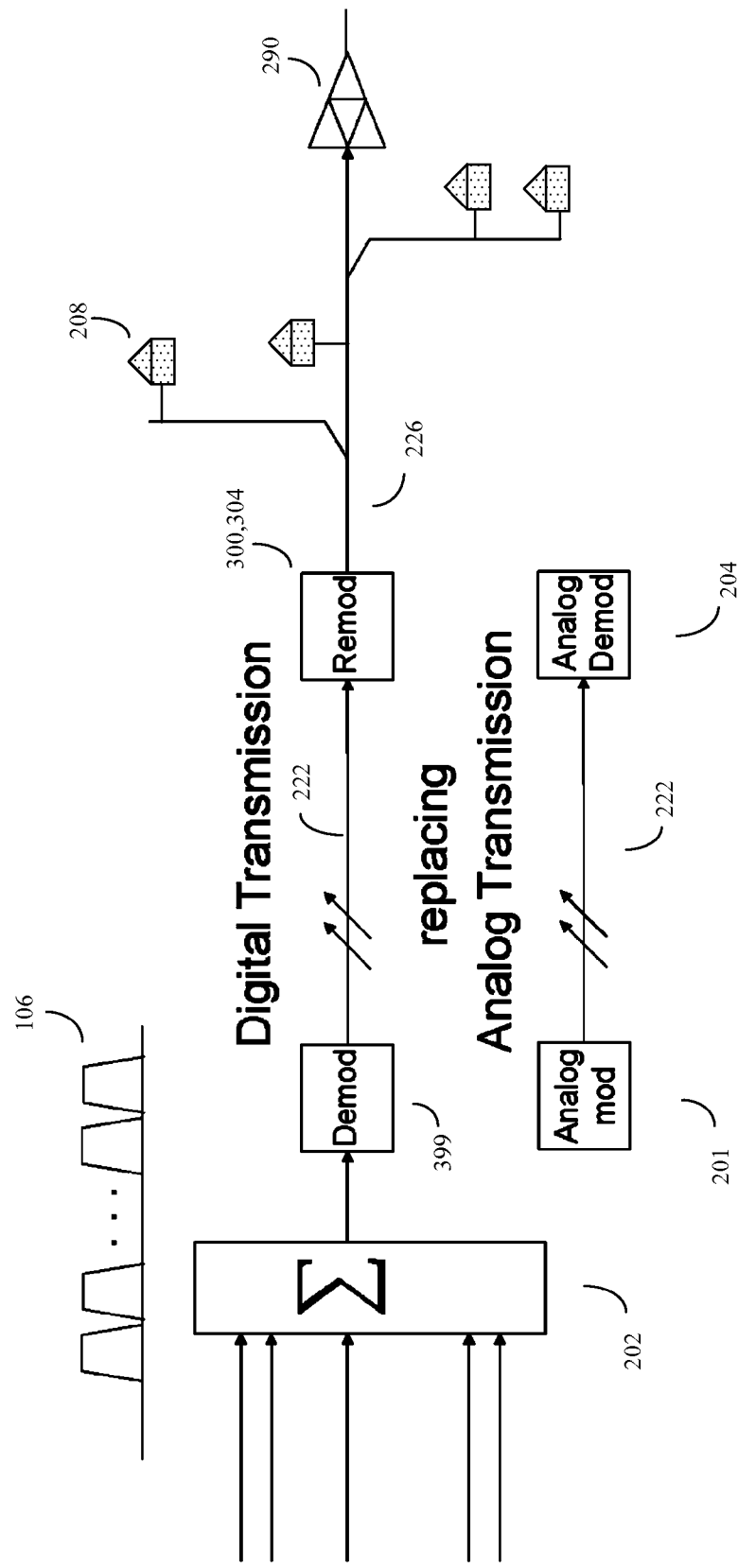
FIG. 4A shows an overview of how certain aspects of the invention may be used to upgrade a portion of a legacy analog optical fiber based HFC CATV cable system by replacing the analog modulators and demodulators on either end of the system with digital demodulators and remodulators. As will be discussed, the legacy head end may also be upgraded as well.

FIG. 4A shows an overview of how one aspect of inventor's art may be used to upgrade a legacy analog optical fiber (222) based HFC CATV cable system (still using a legacy head end) by replacing the analog modulators (201) and demodulators (300,304) on either end of the system with digital demodulators (399) and remodulators (300,304), where here the remodulators are generally embedded into the DOFN (300,304) as the various QAM modulators (712) and the like. The DOFN are connected to the optical fiber (222) on one side, and the neighborhood CATV cable system (226) on the other side. The neighborhood CATV system in turn connects to various households (208) as before, and also may contain various active devices (290) such as amplifiers to boost the RF signals, and the like. The legacy head end of the CATV system (202) is here abstracted as a device that generates a plurality of downstream RF waveforms/signals, such as QAM signals (106).

Figure 4B:
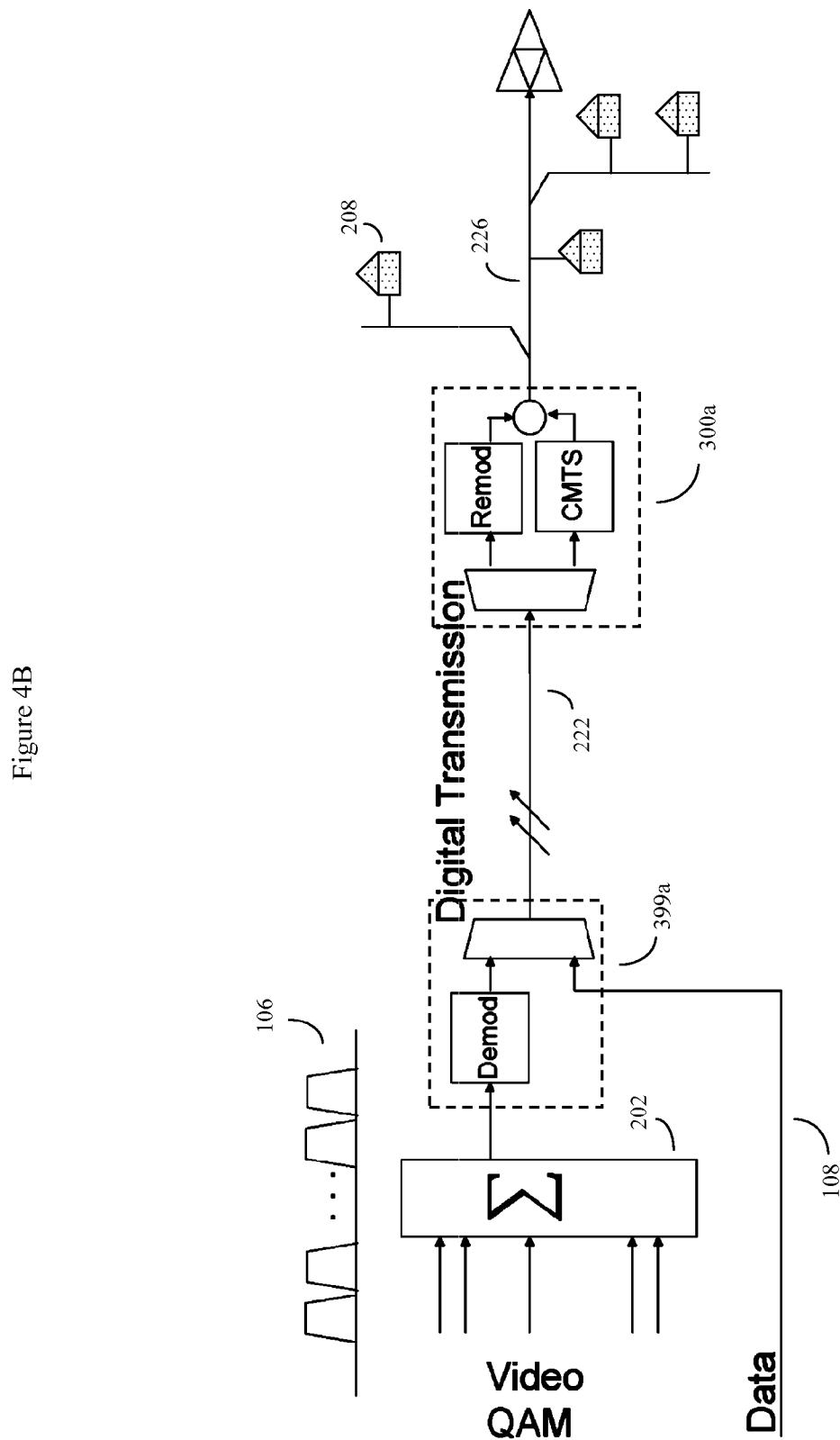
FIG. 4B shows a more detailed overview of how certain aspects of the invention may be used to upgrade a portion of a legacy analog optical fiber based HFC CATV cable system that is was transmitting a mixture of consisting of a plurality of video QAM channels and IP data, such as DOCSIS IP data. Here the legacy QAM channels may be demodulated into their underlying QAM constellation symbols. This QAM symbol data, along with the legacy IP data, can be encapsulated into various digital optical data packets, and transmitted over the optical fiber in this more efficient form. At the optical fiber node, the data packets can be parsed, and the QAM channels regenerated by remodulated by using the QAM constellation symbols to drive various optical fiber node QAM RF transmitters. The data may also be suitably compressed and decompressed, as desired, to further improve the efficiency and speed of data transmission. The IP data can also be extracted from the optical data packets, and used to feed an optical fiber node based CMTS system. Upgrading the head end will be discussed in subsequent figures.

FIG. 4B shows a more detailed overview of how the invention may be used to upgrade a legacy analog optical fiber based HFC CATV cable system, still using a legacy head end, that is was transmitting a mixture of consisting of a plurality of video QAM channels (106) and IP data (108), such as DOCSIS IP data. Here the legacy QAM channels (106) may be demodulated into their underlying QAM constellation symbols by converter device (399). This QAM symbol data, along with the legacy IP data (108), can be encapsulated by the converter device (399) into various digital optical data packets, and transmitted over the optical fiber (222) in this more efficient digital form. At the optical fiber node (300a), the data packets can be parsed, and the QAM or other RF channels regenerated by remodulated by using the QAM constellation symbols or OFDM symbols to drive various optical fiber node QAM RF modulators/transmitters, such as (712). The IP data can also be extracted from the optical data packets, and used to feed an optical fiber node based CMTS system.

In this context, "encapsulate" means to package the data bits, bytes, or other bit oriented format from the relevant input into data packets, such as Ethernet data packets or frames, along with appropriate headers, checksums, source information, destination information, and other appropriate control information. Thus using QAM waveforms as an example, the data will be QAM constellation symbols, usually as part of the Ethernet frame/packet payload. In addition to standard Ethernet frame structure data, this payload data may additionally contain information about the relative position or timing that the QAM symbols have in the QAM waveform, the source of the QAM waveform (e.g. what channel), the destination channel, and even information as to intensity of the QAM waveform, QAM waveform pre-distortion, echo cancellation, and the like as needed to help correct for distortions in the CATV cable, as per copending patent application Ser. Nos. 13/400,415 and 13/478,461, the contents of which are incorporated herein by reference. Once the data packets are received, the QAM symbol data or other data can be extracted, and the source information, destination information, and other appropriate control information then used by the system to then properly use the QAM symbol data to accurately reconstruct the proper QAM waveforms or other type waveforms as is best suited for the use at hand.

Thus one aspect of inventor's art provides a method of upgrading a legacy Hybrid Fiber Cable (legacy HFC) system, previously configured to transmit data downstream over an optical fiber using analog optical QAM waveforms, to a digital HFC system configured to transmit data downstream over the optical fiber using digital optical transmission methods. Here, as previously discussed, the legacy HFC system will generally comprise a legacy head end configured to produce downstream RF QAM waveforms, and a legacy fiber optic transmitter system configured to transduce the RF QAM waveforms into downstream analog optical QAM waveforms to be transmitted downstream to at least one legacy optical fiber node. The legacy HFC system will also generally comprise at least one legacy optical fiber node is configured to receive the downstream analog optical QAM waveforms, transduce the analog optical QAM waveforms into RF QAM waveforms, and transmit these RF QAM waveforms downstream over the at least one set of neighborhood CATV cables.

To upgrade this system, the legacy fiber optic transmitter system (201), which is generally attached in between the CATV PHY (614) and the optical fiber cable (218), can be replaced with a digital fiber optic transmitter system (399) configured to transmit at least one downstream QAM channel over the optical fiber as a plurality of QAM constellation symbols by demodulating the QAM waveforms, extracting the QAM constellation symbols encapsulating the QAM constellation symbols into a plurality of Ethernet frames or other digital transmission format frames, and digitally transmitting this plurality of Ethernet frames or other digital transmission format frames over the optical fiber.

The conversion will also generally require that at least one legacy fiber optic node (204) be replaced with a digital optical fiber node (DOFN) (300,304) configured to receive this plurality of Ethernet frames or other digital transmission format claims, extract these downstream QAM constellation symbols, and use these downstream video QAM constellation symbols to modulate at least one DOFN QAM modulator, thus producing downstream QAM RF signals.

Here the downstream QAM channels will generally comprise either video QAM channels, video Edge-QAM channels, or IP-QAM channels.

In some cases, as described in more detail elsewhere, the downstream data may further comprise either legacy RF waveforms, such as National Television System Committee (NTSC) or more advanced DOCSIS 3.1 waveforms, such as Orthogonal Frequency Division Multiplexing (OFDM) RF channels. In these situations, the system may further handle these non-QAM signals by, for example:

1: digitally sampling the NTSC or OFDM RF channels at the head end, producing a plurality of digitized waveform data, encapsulating this digitized waveform data into a plurality of digitized waveform data containing Ethernet frames or other digital transmission frames, and digitally transmitting this plurality of digitized waveform data containing Ethernet frames or other digital transmission frames downstream over the optical fiber (222). There, at the DOFN (300,304), the system may receive this plurality of digitized waveform data containing Ethernet frames or other digital transmission frames, extract this plurality of digitized waveform data, and use this plurality of digitized waveform data to drive at least one digital to analog converter, thus producing downstream NTSC or OFDM RF channels which in turn can be injected into the neighborhood CATV cables (226).

In the case where the downstream data may be composed of more advanced (e.g. DOCSIS 3.1) Orthogonal Frequency Division Multiplexing (OFDM) RF channels, these OFDM RF channels may be digitally transmitted by demodulating the OFDM RF channels at the head end (399), producing a plurality of OFDM symbols, encapsulating this plurality of OFDM symbols into a plurality of OFDM symbol carrying Ethernet frames or other digital transmission frames, and digitally transmitting these OFDM symbol carrying Ethernet frames or other digital transmission frames downstream over the optical fiber (222).

In this case, the DOFN (300,304) can be configured to receive this plurality of OFDM symbol carrying Ethernet frames or other digital transmission frames, extract this plurality of OFDM symbols, and use this plurality of OFDM symbols to drive at least one OFDM RF modulator, thus producing downstream OFDM RF channels, and also inject these OFDM RF channels into the local neighborhood CATV cable system (226) as well.

In this approach, the upstream transmission methods generally are consistent with the above discussed downstream methods. Here, for example, when upstream transmission of RF QAM channel data waveforms or any upstream RF channel data waveforms or desired, the DOFN (300,304) or (300a) may be configured to, for the case of upstream RF QAM data carrying waveforms, receive the upstream RF QAM channel waveforms, demodulate these upstream RF QAM channel waveforms into a plurality of upstream QAM constellation symbols, and encapsulate this plurality of upstream QAM constellation symbols into a plurality of Ethernet frames or other digital transmission format frames. The DOFN (300,304), (300a) can then use the optical fiber (222) to digitally transmit this plurality of Ethernet frames or other digital transmission format frames upstream to the legacy head end (202) as assisted by converter (399) and additional legacy head end extender equipment (500). Similarly for upstream RF OFDM channel data, the DOFN (300), (300a) can be configured to receive the upstream RF OFDM channel data waveforms, and demodulate the RF OFDM channel waveforms into a plurality of upstream OFDM symbols. The DOFN can then encapsulate this plurality of upstream OFDM symbols into a plurality of Ethernet frames or other digital transmission format frames and transmit upstream on optical fiber (222) as described previously.

In the case where the upstream data are other types of RF waveforms (or where desired for QAM and OFDM upstream waveforms as well), as another alternative, the DOFN can be configured to receive the upstream RF channel data waveforms, and digitally sample these RF channel data waveforms producing a plurality of digitized waveform data. Then as before, the DOFN can encapsulate this digitized waveform data into a plurality of Ethernet frames or other digital transmission frames, and transmit upstream on fiber (222) to the legacy head end (or for that matter the invention's improved virtual head end) as before.

The process of migrating from a legacy analog-signal over optical fiber HFC CATV system to an improved digital signal over optical fiber HFC CATV system can take place in various phases or increments. At the simplest upgrade phase or increment, here called phase 1, the legacy head end (202) is left in place, any prior art DOCSIS and CMTS functionality can be left intact, and only the video QAM waveforms sent downstream over the optical fiber from the head end to the various optical fiber nodes needs to be demodulated into QAM constellation symbols, encapsulated or packaged into suitable digital optical packets such as various Ethernet packets, and sent downstream to improved DOFN optical fiber nodes that in turn can extract the various QAM constellation symbols from the digital optical fiber data packets. These DOFN fiber nodes can then use these QAM constellation symbols, together with various DOFN QAM modulators, to reconstruct the original head end QAM waveforms as RF QAM waveforms, and then send these downstream over the local neighborhood CATV cable.

In an alternative upgrade phase or increment, here called phase 2, the legacy head end is again kept in place, and both the demodulated QAM constellation symbols from the various video QAM channels and the various IP data (e.g. DOCSIS IP data, originating from head end CMTS units) can be encapsulated or packaged into suitable digital optical packets, and be sent downstream over the optical fiber. The DOFN will also preferably be configured to return any upstream data over the optical fiber using digital protocols as well.

In a still a still later upgrade phase or increment, here called phase 3, the cable head end need no longer be configured to generate QAM RF waveforms. In other words, the legacy head end is no longer required.

In a first implementation of a non-legacy head end, the cable head end can be still further simplified, and can for example translate video data directly into digital data, such as QAM symbol data, but head end QAM modulators are no longer needed. Instead the cable head end can be essentially "all IP" or all digital. One advantages of the methods described herein is that the DOFN needed to implement phase 1 or phase 2 of the upgrade can still be used for the phase 3 upgrades as well, thus enabling the upgrade process to proceed in various incremental steps as budgets and user needs dictate.

In a second implementation of a non-legacy head end, the invention's virtual head end or virtual CCAP methods may be used. These methods will be discussed in more detail shortly.

Upgrading from an analog optical fiber system to a digital optical fiber system has numerous advantages. In addition to the advantages discussed elsewhere in the specification, there are other advantages as well.

In contrast to analog transmission, which requires high linearity components and signal transmission methods, and where at every signal combining step, (which generally also requires an amplification step as well) the noise floor level of the analog signal will generally rise, digital methods are generally superior:

1: Digital signal transmission methods can generally avoid non-linearity artifacts, such as cross-talk, that can corrupt signals.

2: Digital methods generally operate with a lower noise floor.

3: Digital methods generally produce higher level signals with improved signal to noise rations.

Particularly for optical fiber methods, where lasers used to transmit or to drive the optical fiber signals have limitations, such a requirement that the laser not be overdriven. Thus to avoid this, the various analog waveforms are driven at a lower intensity, and thus at various subsequent steps such as upon being the optical signal being received and demodulated, further amplification is needed, which in turn increases the noise floor still further. By contrast, various digital signal protocols optimized for optical fiber can avoid these effects.

As a result, by switching to using digital signal transmission protocols over optical fiber, the overall power requirements of the system can also be reduced. The optical fiber lasers don't need to be operated in as high a linearity mode, and thus can be biased with a smaller amount of current, reducing transmitter power utilization. Further the need for power amplifiers, which often add about 10-12 watts of power utilization per amplifier, is also reduced. Thus in addition to the advantages of higher data throughput and more flexibility discussed elsewhere in this specification, there are also advantages of lower power utilization, and lower noise levels (i.e. less digital signal corruption due to noise).

Various optical fiber digital transport protocols may be used for such digital over optical fiber transmission purposes. In some embodiments, it may be useful to select a protocol from the set of various IEEE 802.3 high speed Ethernet protocols, such as IEEE 802.3ba, IEEE 802.3bm, IEEE 802.3bg, IEEE 803.3z and the like. Here, depending on the legacy optical fiber in use, longer distance capable single-mode optical fiber (SMF) methods, such as 40 GBase-LR4, 100 GBase-LR4, or 100 Gbase-ER4, 1000 Base-X, 1000 Base-SX, 1000 Base-LX, 1000 Base-LX10, 1000 Base-EX, 1000 Base-ZX, 1000 Base-BX10 and other methods may also be used. If the legacy analog optical fiber is going to be used without substantial upgrades, then use of digital protocols that are compatible with the wavelengths used by the analog optical fiber, such as commonly used 1310 nanometer legacy O band wavelengths (e.g. 1000 Base-LX, 1000 Base-LX10 or 1000 Base-EX) may be preferable. If use of alternative wavelengths, such as the C band wavelengths (e.g. 1550 nanometer wavelength) is preferred, then use of alternative protocols such as 1000 Base-ZX may be preferable. Many other protocols, such as 1000 Base-BX10 may also be used.

Figure 4C:
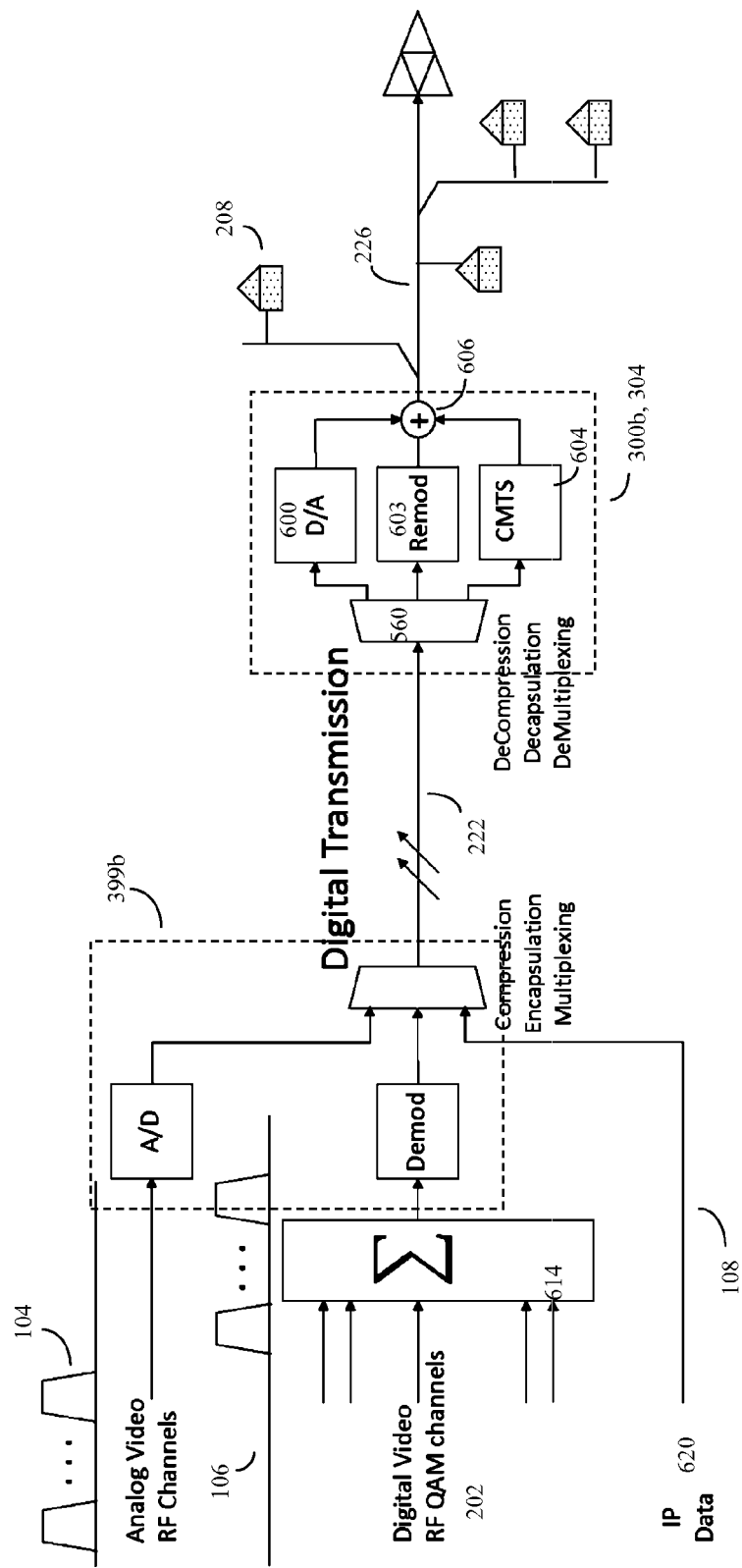
FIG. 4C shows still more detailed of how certain aspects of the invention may be used to upgrade at least a portion of a legacy analog optical fiber based HFC CATV cable system that is was transmitting a mixture of consisting of a plurality of legacy video QAM channels, other analog RF channels such legacy NTSC video channels, and legacy IP data, such as DOCSIS IP data. Here the legacy QAM channels may be demodulated into their underlying QAM constellation symbols. The other RF video channels may be handled by digitization and optional compression, as desired. This QAM symbol data, digitized RF channel data and the legacy IP data, can be encapsulated into various digital optical data packets, and transmitted over the optical fiber. At the DOFN optical fiber node, the data packets can be parsed, and the QAM channels regenerated or remodulated by using the QAM constellation symbols to drive various optical fiber node QAM RF transmitters, and the digitized analog RF channels optionally decompressed and fed into an electrical system comprising a digital to analog converter to regenerate the analog RF channels. The three types of RF waveforms can then be combined and injected into the neighborhood CATV cable system as before. Again, upgrading the head end will be discussed in subsequent figures FIG. 4D contrasts the difference in downstream data transmission between a prior art HFC system that operates using a 1310 nm optical fiber infrared signal analog according to typical CATV waveforms (e.g. many QAM waveforms), and the invention's improved digital transmission methods. In contrast to prior art, because the invention can transmit all CATV data in digital form using various data packets, the higher effective data rate and superior addressing capability of IP data packets allows more different types of data to be sent on the same wavelength. The invention preserves backward compatibility by providing various converters to convert back and forth between legacy waveforms and IP data packets.

FIG. 4C shows still more detailed view of how applicant's art may be used to upgrade a legacy analog optical fiber based HFC CATV cable system that is was transmitting a mixture of consisting of a plurality of legacy video QAM channels, other analog RF channels such legacy NTSC video channels, and legacy IP data, such as DOCSIS IP data. Here, a number of the various components are further identified using the nomenclature used for FIG. 7, and it may be useful at this time to compare FIG. 4C to FIG. 7, since the two figures are highly related.

Here, as before, if a legacy head end is being used, the legacy video QAM channels (106) may be demodulated into their underlying QAM constellation symbols using a demodulator device in converter unit (here 399b). The other RF video channels (104) may be handled by digitization and optional compression, as desired, using appropriate analog to digital converter circuitry in converter unit (399). OFDM RF channels may also be handled by suitable demodulators or digitizers, as desired (not shown). This QAM symbol data, digitized RF channel data and the legacy IP data, can be encapsulated into various digital optical data packets, and transmitted over the optical fiber (222). At the DOFN optical fiber node (here shown as 300b and also as 304) the data packets can be parsed (560), and the QAM channels regenerated or remodulated by using the QAM constellation symbols to drive various optical fiber node QAM RF modulator/transmitters (603). The digitized analog RF channels (which can optionally be decompressed) are reconstituted by feeding them into an electrical system comprising a digital to analog converter (600) to regenerate the analog RF channels. The IP data signals are selected and converted in to the appropriate CATV waveforms by the DOFN's CMTS/CMRTS unit. The three types of RF waveforms can then be combined (606) and injected into the neighborhood CATV cable system (226) as before.

Figure 4D:
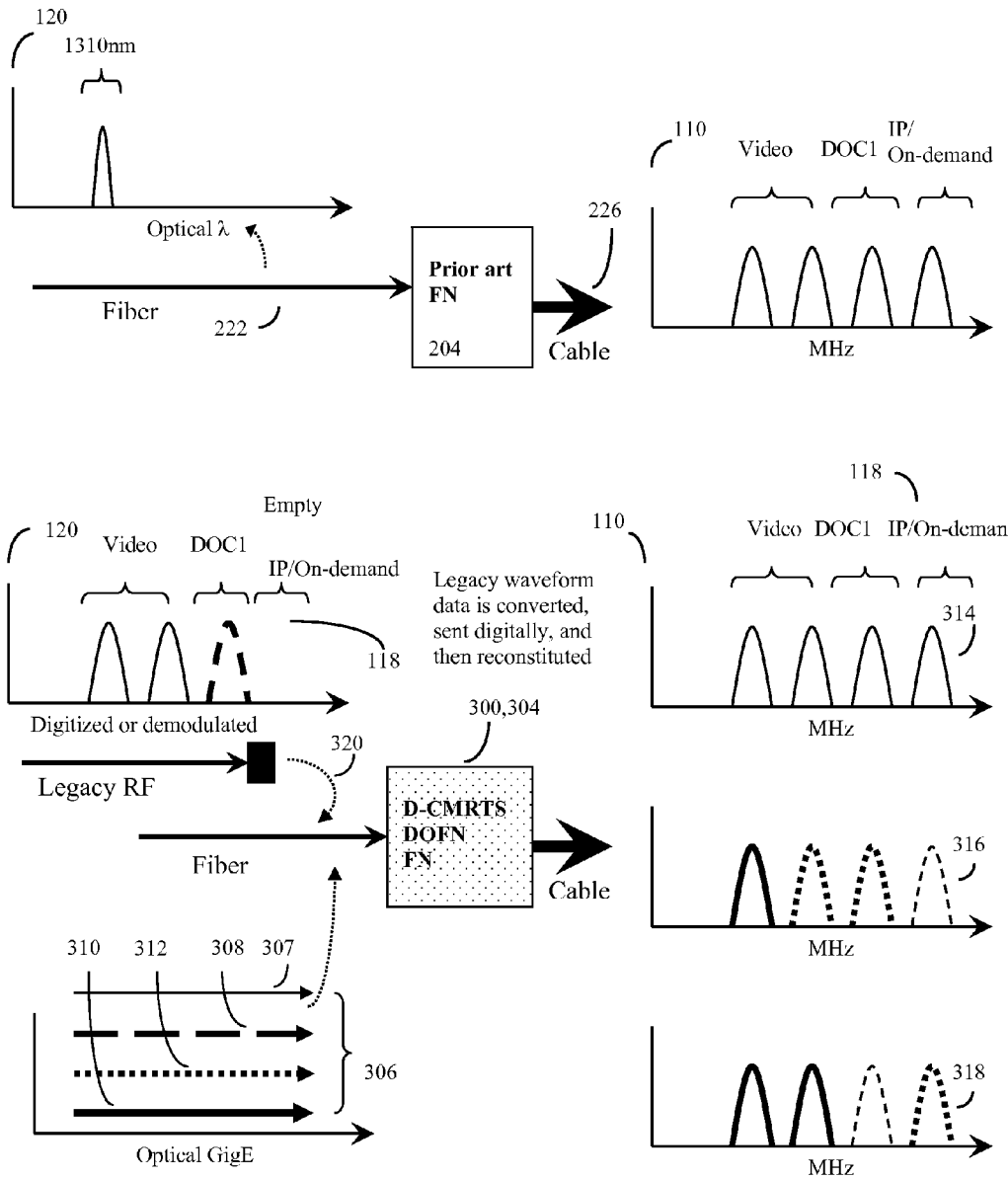

FIG. 4D contrasts the difference in downstream data transmission between a prior art HFC system that operates using an optical fiber carrying an analog CATV modulated 1310 nm wavelength signal, and the invention's improved digital methods using digital (Ethernet) modulated signals or other optical fiber optimized digital signal formats.

In the prior art system, the conversion process between the optical fiber (222) and the CATV cable (226) that occurs with a typical prior art fiber node (204) is shown, and contrasted with the invention's improved D-CMRTS fiber node (300, 304). Here, for simplicity, only the downstream portion of the process is illustrated.

In the prior art conversion process (top), the optical fiber (222) carries both the standardized video signals, and the analog QAM signal (that contains digital information) for both digital television and DOCSIS use (that can carry on demand video or IP data).

The prior art "dumb" fiber node (204) simply converts the optical fiber's optical FDM or QAM analog signals into RF FDM or QAM signals and passes these signals to the CATV cable (226). Thus if, for example, there are four different CATV cables connecting to this different fiber node, all will get the same customized IP/On-demand signal, and this in turn may be rather inefficiently transmitted to potentially thousands of non-target households that did not request the customized signal.

By contrast, by using the invention's improved "smart" D-CMRTS/DOFN fiber nodes (300, 304), any legacy standardized signal (e.g. the standardized video channels) and (for backwards compatibility) either a full set or subset of the DOCSIS QAM channels are first digitized and transmitted by the optical fiber in a digital format. This digital format makes it easy to add additional (non-legacy) data (e.g. video on the demand, DOCSIS superset services) and transmit this additional data on the same optical fiber wavelengths used to transmit any legacy CATV data.

If legacy data is transmitted over the optical fiber, it may optionally carry a digitally encoded version of the legacy CATV spectrum, which can be reconstituted (320) into analog format at the D-CMRTS unit into RF QAM waveforms and other waveforms that may optionally be injected into the CATV cable (120) for fallback or legacy operation.

To emphasize the fact that the optical fiber is often carrying data by non-CATV-compatible or QAM signal carrying methods, the signal carried by the D-CMRTS fiber is shown as a series of lines (306) to symbolize the fact, that alternative digital (e.g. GigE) methods of signal transmission are being used. Here each line (306) represents a different type of data stream to different node addresses or different node channels or CATV waveforms, some of which will ultimately will be converted to a QAM signal and sent to a specific neighborhood.

At the invention's improved D-CMRTS/DOFN fiber node (300, 304), in more advanced embodiments, the fiber node's CMRTS unit may additionally determine (or at least select) which set of customized data carried by the various optical fiber digital packets (307, 308, 310, 312) is intended for that particular D-CMRTS and neighborhood, and retrieve this information from the fiber. This information will then be QAM modulated and converted to the appropriate RF frequency, put onto a suitable empty IP/On-demand QAM CATV cable channel (314), (316), (318), and then sent by CATV cable to the neighborhood that requested that particular data. At the neighborhood, the particular cable modem from the house that requested that data can tune into this QAM channel and extract the data, while the other cable modems also attached to that cable will ignore the QAM channel and/or ignore the data.

As can be seen, the digital data packets (306) carrying different types of data can be selected and put onto the CATV cable in various mix and match combinations (316), (318) as desired. Here for example, one RF QAM channel on (316) came from optical fiber data packet type (310), two RF QAM channels came from optical fiber data packet type (312), and one RF QAM channel came optical fiber data packet type (308). By contrast, for (318), two RF QAM channels came from optical fiber data packet type (310), one RF QAM channel came from optical fiber data packet type (308), and one RF QAM channel came from optical fiber data type (312). By contrast, (314) illustrates the CATV channel coming from a neighborhood that is operating in legacy mode, where all channels came from optical fiber data packets from digitally sampled or demodulated (320) legacy RF signals (120) that were simply transported, in digital format, as is and then reconstituted (320) back to the original waveforms at the D-CMRTS fiber node (300,304), or alternatively by a simpler optical digital to RF analog converter type optical fiber node.

As will be discussed shortly, this method allows for much finer granularity, and a correspondingly higher rate of transmission of customized data.

Figure 10:
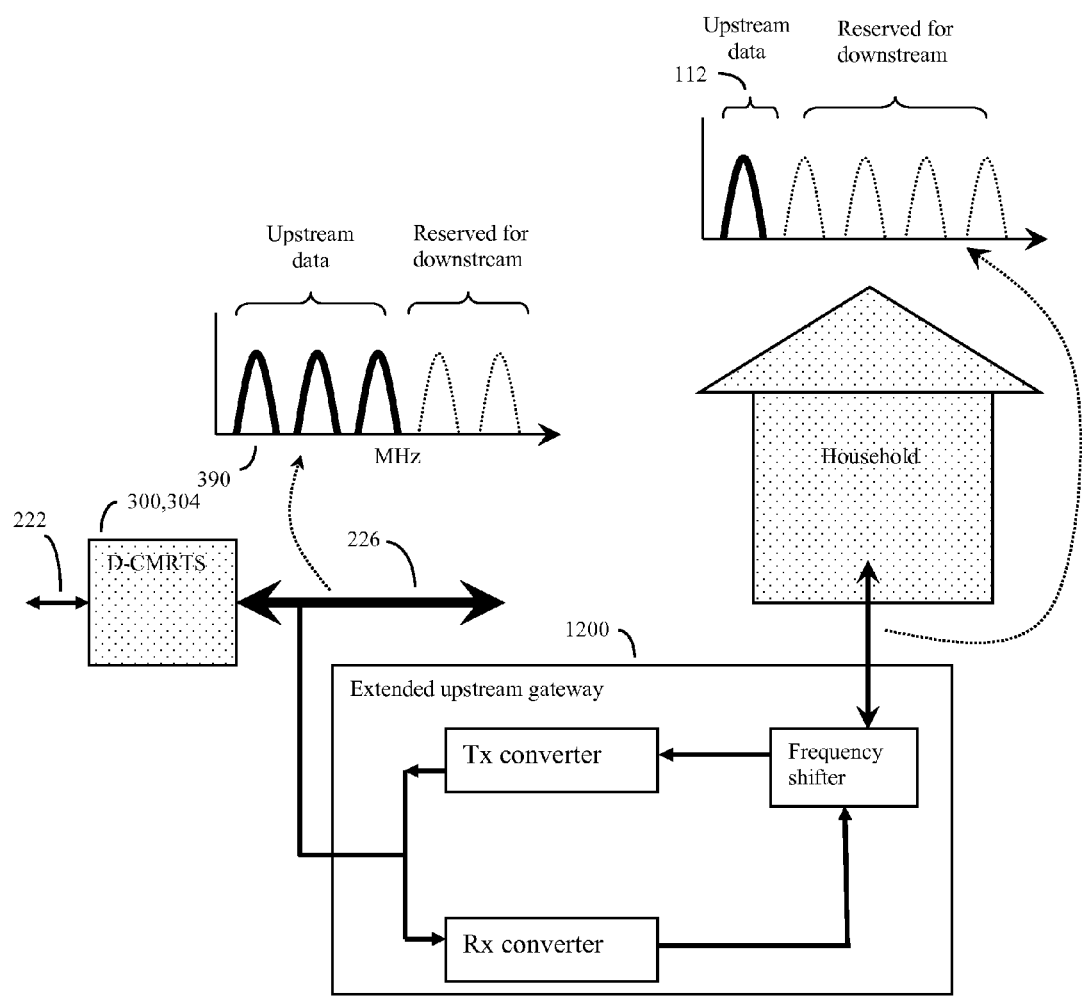
FIG. 10 shows a residential gateway (1100) that can also convert between a CATV cable system with an extended frequency allocated for upstream data (e.g. 5-547 MHz or alternative upstream range of frequencies), and residential equipment designed for the standard 5-42 MHz range of upstream frequencies.

As previously discussed, in more advanced embodiments, the upstream data transmission bottleneck at the CATV cable may be also addressed by an upstream CATV bandwidth reallocation scheme (See FIG. 10, (390)). Here, the amount of CATV RF spectrum allocated to upstream data transmission may, for example, be increased—e.g. from the original 5-42 MHz range up to, for example, 5-547 MHz or other higher upper value.

Figure 5:
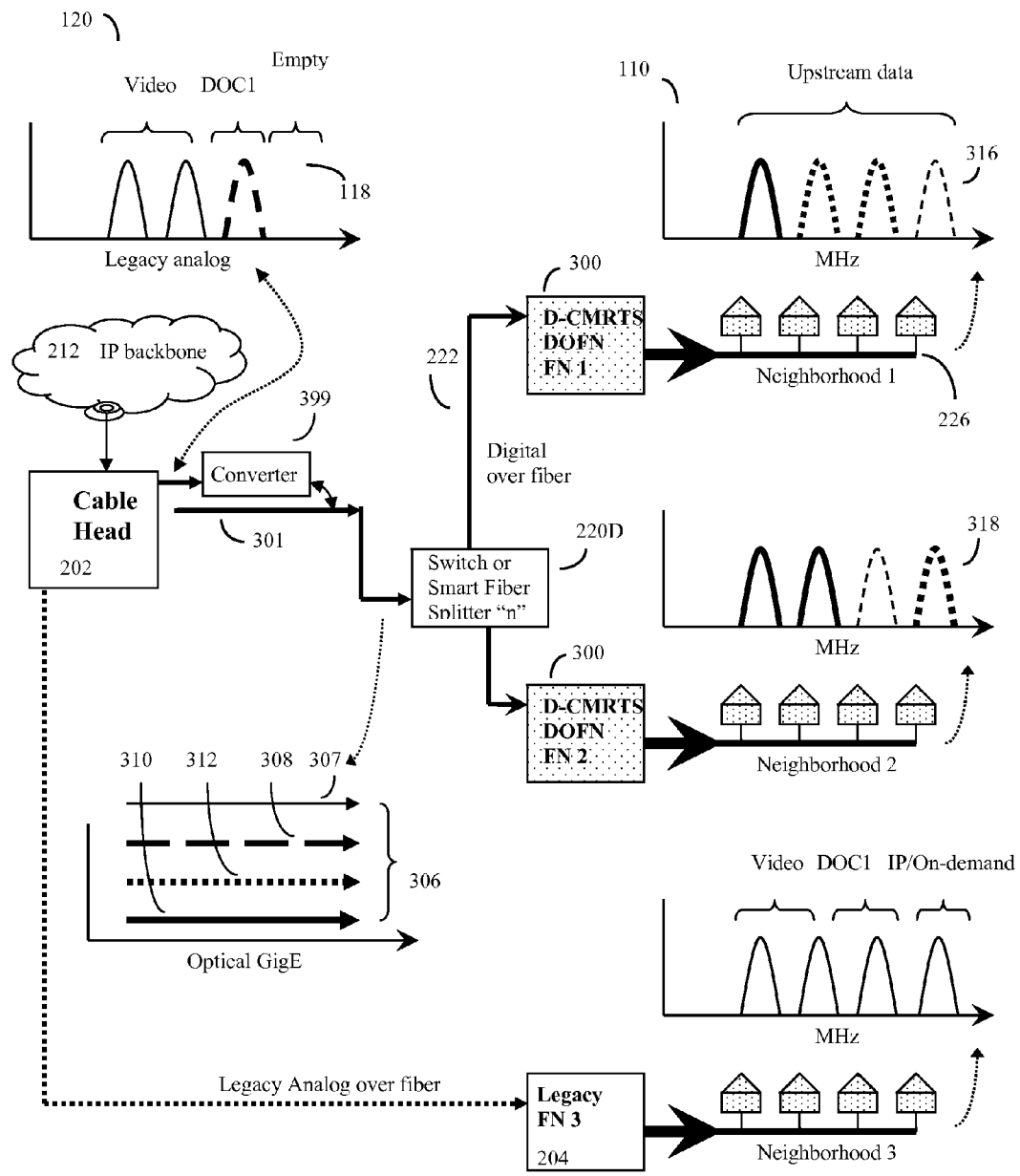
FIG. 5 shows an overview of the invention in operation in downstream mode, showing how the improved "smart" D-CMRTS, also called DOFN, fiber nodes can transport a higher effective amount of customized data downstream for users.

FIG. 5 shows an overview of one embodiment of the invention in operation in downstream mode. Here, in this embodiment, the improved "smart" D-CMRTS/DOFN fiber nodes (300,304) can transport a higher effective amount of customized user data. Here these improved "smart" D-CMRTS/DOFN fiber nodes (300,304), may in some embodiments, work in conjunction with an optional improved D-CMTS shelf and improved D-CMTS line cards at the cable head (see FIG. 7, 500).

In this embodiment, any legacy CATV RF waveforms, such as QAM waveforms (120), produced at the legacy head end (202) may be digitized by a converter unit (399) and then injected into the optical fiber (301). This converter unit (399) may function by, for example, being configured to accept at least one of downstream RF waveforms and downstream QAM channels from the legacy head end, sample and digitize the downstream RF waveforms (e.g. using simple high speed analog to digital conversion) and/or demodulate the downstream QAM channels into QAM symbols, producing downstream digital QAM symbols. In this embodiment, the converter (399) is then digitally encoding the digitized legacy data into a suitable optical fiber digital transport format, such as GigE data packets, and then injecting these data packets into optical fiber (301) along with other data.

In the prior art system example previously shown in FIG. 3, an optical fiber (218) from the prior art CMTS unit (214) at the cable head was split at by a fiber splitter (220) into three sub-optical fibers (all carrying the same data) (222), and these sub-optical fibers were then routed to three different neighborhoods. Because all optical fibers coming from the fiber splitter will carry the same data, all data, including customized data, is inefficiently sent to all three neighborhoods, even though only one house from one neighborhood may have actually requested the customized data.

As a result, the limited carrying capacity (bandwidth) of the prior art CATV cable system rapidly becomes saturated.

By contrast, by using a legacy head end (202) supplemented by an improved head end D-CMTS shelf (500) with improved D-CMTS line cards, and the inventor's digital transmission methods, larger amounts of downstream data can be sent even while using the same number of prior art optical fiber wavelengths. Again, the key concept is to use more efficiently modulated optical fiber digital data transport protocols, such as higher data capacity GigE modulation protocols (304). However even more improvements, particularly on the head end, are possible.

On the way to the various neighborhoods, or at the various neighborhoods, the optical fiber cable and/or CATV cable data signals may optionally pass through a digital switch (220D). Here the inventor's all digital transmission methods provide advantages over the previously proposed DWDM methods.

Under DWDM methods, data to different optical fiber nodes, or multiple optical fiber node devices, might be transmitted at different wavelengths, requiring that the switch (220) be a smart fiber splitter that might, for example, incorporate rather expensive optical devices, such as software controllable Brag filters, that would operate to separate out the various optical fiber wavelengths and divert them to different neighborhoods as needed.

By contrast, by using digital transport methods, digital switch (220D) can be a relatively inexpensive multiple port switch that operates to direct the various digital data packets to their respective destinations according to digital data packet headers, and the like.

To do this, typically the various DOFN or D-CMRTS units will have a processor, memory, and at least one address (e.g. the specific node address, and or one or more alternate addresses such as the address of a group of nodes, useful for when broadcasting the same signal to multiple nodes is desired). The DOFN or D-CMRTS units will typically be configured to process downstream digital data that is directed to their respective addresses.

Here, also, the IP data packets (e.g. digital samples of downstream RF waveforms, downstream digital QAM symbols, or downstream digital IP data) transmitted over the optical fiber will often have a specific (e.g. individual node or group of nodes) digital optical fiber node address.

In some embodiments, digital switch (220D) may be a multiple port switch disposed either at the head end or else somewhere between the head end and the various digital optical fiber nodes (D-CMRTS units). This switch (220D) can thus be configured to read the specific digital optical fiber node or D-CMRTS addresses; and direct any of the various digital samples of downstream RF waveforms, downstream digital QAM symbols, or downstream digital IP data to the specific digital optical fiber node or nodes corresponding to their specific digital optical fiber node address, be it individual node address, or specific group of nodes address.

Here, use of all digital methods also helps cost reduce the various D-CMRTS/DOFN costs. Whereas under the prior DWDM scheme, the various D-CMRTS units themselves may have extracted data from multiple optical fiber wavelengths through use of more expensive wavelength splitters (such as software controllable Brag filters), use of digital data packets makes use of such wavelength splitters optional. Under the present all digital scheme, the various D-CMRTS units can essentially pick and choose what GigE formatted data they may need from the overall digital data packet stream (306, 307, 308, 310, 312) extract this data, reconstitute, remodulate, or QAM modulate the various data types, and then output CATV RF signals (again often QAM channels) that can be a composite of the data originally carried on the different digital data streams (307, 308, 310, 312).

This "mix and match" process is symbolized by the various dark, dashed, and dotted parabolas shown in (316) and (318), which symbolize the CATV RF modulated data that is being output in neighborhood 1 and neighborhood 2 by D-CMRTS Fiber Node 1 and DCMRTS Fiber Node 2.

Here for example, as before, the downstream CATV data (226), (316) on neighborhood 1 is shown as a mix of dark parabolas (data originally obtained from fiber digital data packets (310), a mix of dashed parabolas (data originally obtained from fiber digital data packets 308), and dark dotted parabolas (data originally obtained from fiber digital data packets 312). Note that the mix of data for neighborhood 2 (318) is different from neighborhood 1. Whereas neighborhood 1 only took a small amount of data (dark parabola) from fiber digital data packets (310), and a larger amount of data (two dark dotted parabola) from fiber digital data packets (312), here the D-CMRTS/DOFN unit (300, 304) for neighborhood 2 has selected more data (two dark parabolas) from fiber digital data packets (310), and less data from (one dark dotted parabola) from fiber digital data packets (310).

Note also that the D-CMRTS/DOFN unit has freedom to decide what frequencies will be used to transmit this data over the CATV cables. Here the D-CMRTS/DOFN units determine what data to place on the neighborhood CATV cables based upon commands sent upstream by the various household devices attached to the CATV cable, and/or commands sent from the cable head (either upgraded legacy cable head, or the present improved virtual cable head). As previously discussed, in more advanced embodiments the D-CMRTS/DOFJ optical fiber nodes will be software controlled.

In more advanced embodiments, due to this software controllable, neighborhood specific (or at least neighborhood region specific) ability to combine and repackage huge amounts of GigE formatted data carried over a large number of optical fiber channels, the downstream capability of the system can now be substantially higher than prior art HFC systems.

If, during a conversion process to the improved virtual head end of the present invention, it was desired to that some backward compatibility be preserved, if desired, this can be done. Here the legacy head end can be preserved for a time, and the fiber digital data packets (307) can still be used to digitally transmit the legacy CATV RF signals, such as QAM signals. This can be done by having converter (399) intercept the legacy signals, digitize them by relatively simple Analog-RF to Digital Optical units, or by demodulating the QAM waveforms, extracting the QAM symbols, and then transmitting the QAM symbols in a digital format.

These digitized legacy signals can continue to be sent to "dumb" or "legacy" optical fiber nodes (204), and the digital optical data reconstituted (e.g. by optical-digital to analog-RF units, or by feeding the digital QAM symbols into local QAM modulators). Both operations can be done with minimal onboard intelligence at the optical fiber node, hence the "dumb" label. This "dumb" optical fiber In FIG. 5, which still shows a legacy cable head in use, neighborhoods 1 and 2 are served by the invention's improved "smart" D-CMRTS/DOFN fiber nodes (300,304). By contrast, neighborhood 3 is only served by a "dumb" legacy fiber node (204). This legacy fiber node may operate by simply converting analog optical fiber waveforms into their corresponding RF waveforms.

Figure 6:
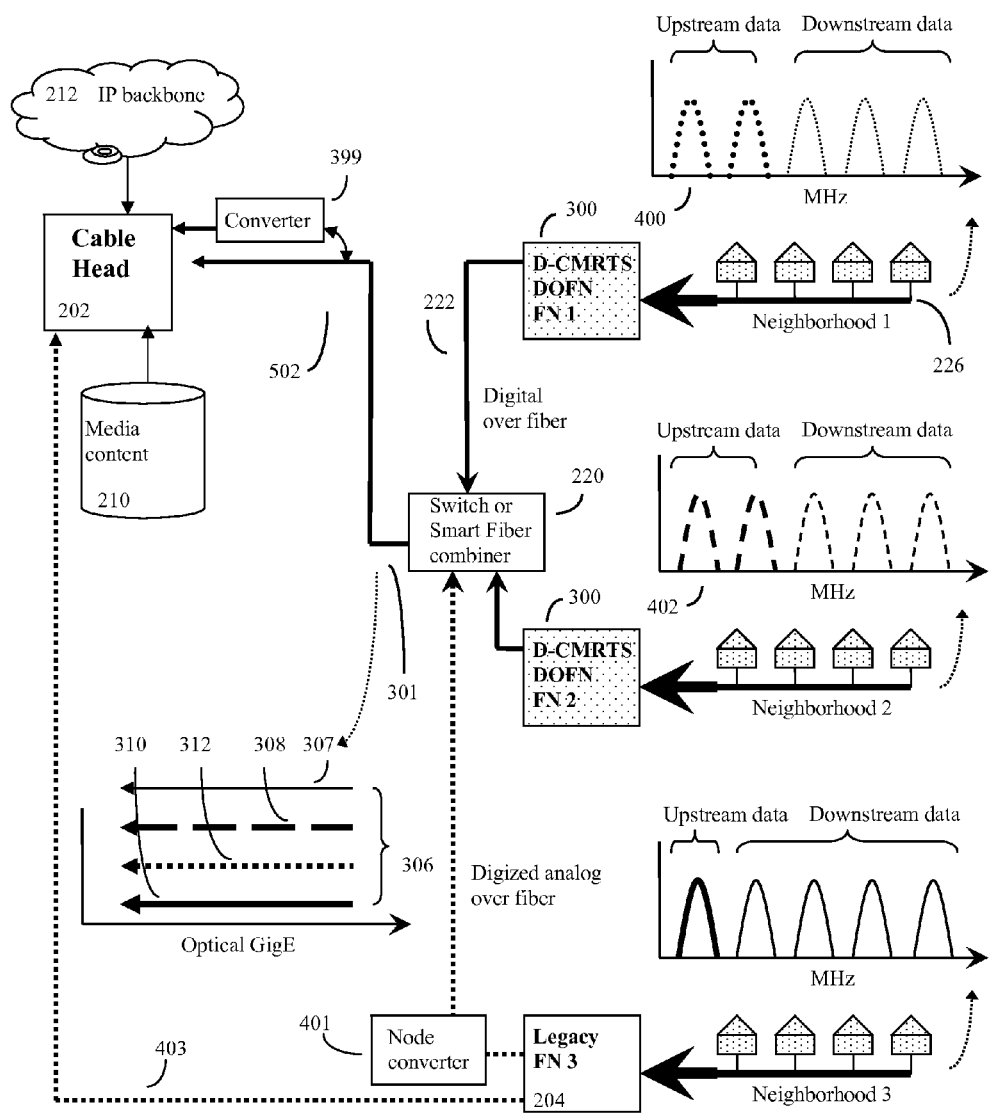
FIG. 6 shows how the invention may also reparation the CATV upstream/downstream frequency split from the standard (US) 5-42 MHz upstream frequency range, into an alternate and often broader upstream frequency range. This helps the system transmit a far greater amount of upstream data from local neighborhoods to the cable head.

FIG. 6 shows one embodiment of the invention operating to send data upstream. As previously discussed, at the CATV cable, considerably more upstream data can be sent due to the previously discussed (but optional) methods of allocating more CATV bandwidth for upstream data (e.g. using spectrum reallocation). Because spectrum reallocation is easier to draw, this larger amount of upstream data being transmitted along the CATV cable is symbolized here by the two dark dotted or dashed parabolas labeled "upstream data" for neighborhoods 1 and 2, showing the higher amounts of upstream spectrum. By contrast, the smaller amount of upstream data that can be transmitted using prior art methods is symbolized by the one dark parabola labeled "upstream data" for neighborhood 3. Here for example, perhaps neighborhood 3 is using the standard US CATV upstream partition that allocates 5-42 MHz for upstream data, while neighborhoods 1 and 2 are using an alternate scheme such as allocating 5-85 MHz for CATV upstream data. Here for example, RF handler (606), which can have the functions of combining, splitting, or duplexing the various RF signals can be switched into an alternate mode that deviates from the present 5-42 MHz upstream and 54-870 MHz downstream standards, and instead allocates the 5-85 MHz region for upstream, and for example the 92-870 MHz region for downstream.

As previously discussed, if the higher amount of upstream data was simply transmitted back along the optical fiber system using the same inefficient (for optical fiber) CATV signal modulation scheme (again usually QAM modulation), then the optical fiber itself would rapidly become a rate-limiting bottleneck. To avoid this problem, according to the invention, the D-CMRTS/DOFN nodes extract this upstream data, and repackage it into more efficiently (for optical fiber) modulated GigE formats. Additionally or alternatively, according to the invention, digital switches (220D) or smart fiber combiners (220) may themselves take the upstream data sent by the optical fibers (222) connecting various neighborhoods, and extract the upstream data and repackage the upstream data in a more efficiently modulated (for optical fiber) GigE format.

Although much of the upstream content consists of relatively standard QAM waveforms, at least some legacy CATV systems can also provide a variety of unusual upstream RF waveforms, such as various QPSK channels from various older set top boxes, OFDM waveforms, such as used for DOCSIS 3.1, and the like. However it is burdensome to try to parse each and every possible upstream waveform for content. To avoid this burden, here again more general methods that simply digitize whatever waveform is seen can be useful.

Thus to be able to digitize, and optically transport upstream, a possibly wide variety of possible RF CATV waveforms, while at the same time trying to conserve optical fiber bandwidth where feasible, in some embodiments, the digital optical fiber node (D-CMRTS unit) may additionally have at least one of:

1: An RF digital converter device configured to accept upstream RF waveforms transmitted over the CATV cable, and digitize these upstream RF waveforms using, for example, a high speed analog to digital converter, and produce digitally encoded upstream RF channel data.

2: Since many upstream RF signals will be QAM waveforms, for optical fiber bandwidth efficiency purpose, it is often desirable to also have an RF demodulator device configured to accept upstream RF QAM channels transmitted over the CATV cable, and demodulate the RF QAM channels and produce the upstream digital QAM symbols that originally were used to construct the various upstream QAM waveforms. The same can also be done for OFDM waveforms as desired.

3: Additionally, for high performance, it is also often desirable to have a QAM to IP conversion device configured to accept upstream digital IP data packets transmitted by the upstream QAM RF channels over the CATV cable, and extract the upstream digital IP data packets, thus producing upstream digital IP packets. The same can also be done for OFDM waveforms as desired.

Once this digital data has been produced, the digital optical fiber node or D-CMRTS/DOFN unit will also often have a digital data to optical converter device configured to combine any of these digitally encoded upstream RF channel data, upstream digital QAM symbols, and upstream digital IP packets and transmit this data, symbols, and packets digitally upstream over the optical fiber.

More specifically, note that the D-CMRTS/DOFN units themselves may, in some embodiments, use relatively simple digitization methods, such as RF-analog to optical-digital converters, or QAM demodulators, to extract upstream CATV RF signals, digitize them, and transmit them in a fiber digital format such as GigE back to the head end (either legacy or improved). Here again, by simply giving the data packets an appropriate label or header, it is relatively simple to aggregate data from many D-CMRTS units, and send them all back upstream on the same optical fiber channel (as desired), again both increasing upstream data handing capability and also saving costs over alternative methods.

Thus in FIG. 6, the large amount of upstream data from neighborhood 1 (400, dark dotted parabolas) and the large amount of upstream data from neighborhood 2 (402, dark dashed parabolas), could in alternative schemes have originally been sent upstream along optical fiber (222) by D-CMRTS Fiber Node 1 and D-CMRTS Fiber Node 2 (300,304) at various different optical fiber wavelengths to avoid interference.

However, since, according to the invention the D-CMRTS/DOFN units may have either repackaged and remodulated this upstream data into a more efficient more optical fiber transmission GigE format, this data from different neighborhoods may instead be sent back using the same optical fiber wavelength (if this option is desired, which it often may be because it is cheaper).

Note that although this disclosure has focused on the all digital optical fiber transmission aspects of the invention, and more specifically on improved virtual head ends that are rendered possible by this all digital format, this focus should not be intended to exclude the fact that analog optical fiber transmissions may also co-exist along optical fiber (222).

Consider the case for neighborhood 3. In some schemes the D-CMTRS units or a prior art dumb fiber node (204) may simply and relatively passively, have transduced the upstream CATV RF waveforms from RF to optical signals such as infrared optical signals, and then retransmitted the upstream data otherwise modulated "as is".

Although this option is not excluded, in a preferred embodiment, the dumb optical fiber node (204) may either be replaced by a dumb digital converter optical fiber node that does little more than digitize the upstream CATV RF signal (e.g. using a module such as 601 or 605), and transmit this digital data upstream on optical fiber (222) according to standard optical fiber digital formats. As yet another embodiment, the prior art dumb optical fiber node (204) may be retained, but a digital node converter unit (401) may be put in place to convert optical fiber signals back and forth between a digital optical format and a legacy analog format for the legacy dumb optical fiber node (204). Here, this node converter unit (401) may, in some embodiments, essentially do the same type of data repackaging and remodulation functions of previous switch (220) previously discussed in parent provisional applications 61/385,125 and 61/511,395, the contents of which are incorporated herein by reference. Alternatively the legacy optical fiber node (204) can remain connected to the head end by another legacy optical fiber (403) path, and the head end (202), which retains its legacy capabilities, will be able to adequately serve remaining legacy optical fiber nodes (204) during the upgrade process.

In the present disclosure, switch (220) is instead operating as a multi port digital data switch (220D), which may operate at either one wavelength or a plurality of wavelengths as desired, and the data extraction, digitization or reconstitution functions, and analog format to digital data packet repacking functions may instead be moved to other devices such as converters (399) and (401).

For example, in this scheme, the upstream data from neighborhood 1 (dark dotted parabolas) and the upstream data from neighborhood 2 (dark dashed parabolas) has been digitized and repackaged by the D-CMRTS/DOFN units (200) into various digital data packets.

Without such digital conversion, the two upstream data sources may have been originally sent by the various D-CMRTS/DOFN units on different optical wavelengths. But because the data has now been repackaged at the D-CMRTS/DOFN units, now the data from both neighborhoods can be carried upstream on optical fiber digital data streams (308) and (312) at the same wavelength along optical fiber (301).

FIG. 7 shows a more detailed view of how the D-CMRTS fiber nodes (300,304), converters (399) and improved digital cable modem termination systems (D-CMTS) (500) at a legacy cable head (202), supplemented with improved D-CMTS line cards, may operate.

For simplicity, again primarily the downstream portion of the system is shown. Generally the D-CMRTS/DOFN units will have an onboard digital data switch (560) (operating either with optical fiber digital data packets, the electrical version of these optical fiber digital data packets) used to direct various optical fiber data packets to and from their correct destination devices (e.g. 600, 601, 603, 604, 605, 607) inside the D-CMRTS/DOFN.

Although a capability of operating at multiple optical wavelengths is not required, in an alternative embodiment where operating with a plurality of optical fiber wavelengths is desired, then the switch (560) may optionally also include optical fiber wavelength splitters, such as one or more Brag filters or other device, to separate out the various wavelengths. These optical fiber wavelength splitters may optionally be a "smart" or tunable filter that may select different wavelengths under microprocessor and software control. The different wavelengths selected by this splitter may then be sent to various subsystems, such as CMRTS units (604), which can extract the digital data, repackage it, and generate CATV QAM signals and/or other RF signals for the CATV cable.

For backward compatibility, the D-CMRTS/DOFN fiber nodes (300), (304) may also have one or more simple optical-digital to analog RF (O-D/A-RF) (600) converters to convert any digitized legacy downstream optical fiber data, which may contain analog to digital sampled versions of various CATV NTSC, FM, QPSK, or even QAM waveforms back from digital data packets to their respective analog RF waveforms again. Depending on the embodiment, (O-D/A-RF) converters may work directly on downstream optical data, or alternatively work on electrical equivalents of the downstream optical data signals.

The D-CMRTS/DOFN fiber nodes may additionally contain the reverse upstream versions of these units (601). These upstream units will take selected upstream RF signals from the CATV cable, such as set top box QPSK channels or even DOCSIS upstream channels as needed, do an analog to digital conversion, fit into data packets, and optionally either transduce into upstream optical data packets, or allow a later stage device such as switch (560) to transduce into upstream optical data packets to send back to the head end.

Also for backward compatibility, the D-CMRTS/DOFN fiber nodes (300), (304) may also have one or more QAM remodulator devices (603) to take demodulated QAM symbols from the downstream optical data packets, and convert these back into RF QAM waveforms carrying the same data payload, and then send downstream on the CATV system via RF combiner/splitter/duplex (606). Again depending on the embodiment, these QAM remodulator devices may work directly on optical data, or alternatively work on electrical equivalents of the optical data signals.

These QAM remodulator devices may additionally contain the reverse upstream RF QAM demodulator versions of these units (605). These upstream QAM demodulator units may take selected upstream QAM RF signals from the CATV cable, such as various legacy DOCSIS upstream QAM channels as needed, demodulate the RF QAM waveforms to extract the underlying QAM symbols that generated the waveforms, fit these demodulated upstream QAM symbols into data packets, and optionally either transduce these QAM symbols into upstream QAM symbol optical data packets, or allow a later stage device such as switch (560) to transduce into upstream QAM symbol optical data packets to send back to the head end.

The D-CMRTS units may additionally contain one or more optical data packets (e.g. optical IP data packets) to RF QAM waveform converters (607). These IP to QAM converters are useful for, example, converting legacy broadcast QAM channels from a legacy head end that have been demodulated at the legacy head end and packaged into optical data packets for more compact (e.g. lower bandwidth needed) transport. The IP to QAM converters can also work directly with data coming from the invention's improved virtual head end (1120) as well. Using either approach, it is possible to transmit more data over the optical fiber than would be possible than if the entire legacy head end analog QAM channel waveforms had instead been transposed to equivalent optical QAM waveforms. In some embodiments (not shown), the D-CMRTS units may also contain the reverse version of these units that takes upstream QAM RF data, demodulates it, repackages the upstream QAM symbols into IP data packets for optical upstream transmission.

The D-CMRTS/DOFN fiber node (304) may also contain one or more CMRTS units (604) that may select at least some of the GigE formatted data (310), (310), (307) from the optical fiber (222) QAM modulate this data, and send it to the CATV cable. (226) according to the scheme previously discussed in FIG. 4D. The CMRTS (604) portion of the D-CMRTS unit (304) may in some embodiments generally function as previously discussed in copending application Ser. No. 12/692,582, the contents of which are incorporated herein by reference.

Although again, a key advantage of the system is that at least in the initial upgrade stages, it can be made almost totally transparent (i.e. capable of running with) legacy HFC software, it should be appreciated that to provide additional functionality, particularly when used with the invention's improved virtual head end, further software upgrades may be desirable. Here, such an upgraded mix and match system will impose a considerable configuration and management problem on the D-CMTS units at the cable head (202). As previously this complexity may be handled by a computerized network management system and software termed the "virtual shelf".

In one embodiment of the improved "virtual shelf" system, suitable for working with upgraded legacy head ends, the D-CMTS shelf and improved D-CMTS line cards may optionally be configured with both packet processors (610), and MAC (612) and PHY (614) devices or functionality to transmit standard CATV analog, QAM, NTSC, QPSK, and DOCSIS analog signals, where the signals may be digitized by converter (399) and transported over the optical fiber as a series of legacy optical IP data packets (307).

Although according to the present invention, the virtual shelf software is now incorporated as part of the virtual CCAP control software (1102), used to control edge router (1104), much of the underlying logic is similar to that used for the upgraded legacy head end discussed in FIG. 7.

Returning to how the virtual shelf software can be used to control upgraded legacy virtual shelf systems, the same CMTS shelf and line cards may also be configured with packet processors (616), MAC (618) and PHY (620) functionality to some or all of this data as GigE formatted data as various digital optical IP data streams (e.g. 308, 310, 312) on one or optical fiber wavelengths.

As a result, the MAC (618) and PHY (620) for (308, 310, 312) can be different from the MAC (612) and PHY (614) used for the optical fiber IP data packets for the legacy signals (307).

The exact mix of signals transmitted and received by the improved line card will vary depending upon what sort of fiber nodes are connected downstream (southern end) to the line card.

For example, if all of the fiber nodes were "dumb" prior art fiber nodes (204), then the D-CMTS line card may only transmit legacy digitized optical IP data packets (307), and after passing through converter (399) the functionality of that particular D-CMTS line card could be backward compatible with prior art CATV DOCSIS equipment and fiber nodes.

That is, the optical fiber legacy IP data stream (307) could transmit the full set of DOCSIS channels, simply by brute force analog to digital, digital optical transmission, and digital to analog conversion; and/or brute force QAM demodulation into QAM symbols, digital optical transmission, and QAM symbol remodulation back into QAM waveform methods.

By contrast, if all of the fiber nodes were "smart" improved D-CMRTS/DOFN fiber nodes (300,304), then the improved head end D-CMTS and CMRTS line card might elect to maximize all or nearly all data to the various households by skipping legacy mode, just sending all data via the non legacy optical IP data packets (308, 310, 312) one or more wavelengths in an optical digital transport protocol such as GigE format, and leave it to the D-CMRTS units (300), (304) to then handle the reformatting and conversion to CATV RF modulation schemes such as QAM modulation.

This scheme would thus allow the highest amount of customized data to be sent to the houses on that particular stretch of cable.

Again in the legacy head end context, in a mixed mode HFC system using a mix of "dumb" fiber nodes (204) and "smart" CMRTS fiber nodes (300,304) (as previously shown in FIG. 5), the improved D-CMTS and D-CMTS line cards could ideally elect to operate in both legacy and GigE modes, thus transmitting and receiving standard video channels (114) and DOCSIS (116) information to and from neighborhood 3 (served by the "dumb" fiber node), using the digital converter (399), optical node converter (401), and the legacy optical fiber digital IP packet data stream (307) to continue giving adequate service to neighborhood 3.

As previously discussed, in order to manage this complexity, the functionality of the improved head end D-CMTS and D-CMTS line cards, as well as usually the functionality of the D-CMRTS fiber nodes (300,304), may be extended by use of additional "virtual shelf" network management computers, controllers, and software, here assumed to be now part of virtual CCAP controller (1102).

In one embodiment, a unified network management system (exemplified by, for example, the ConfD management system provided by Tail-f incorporated) is added to the improved D-CMTS and line card (now virtual CCAP controller 1102) to unify the network and D-CMTS hardware and virtualization layer, provide operating system services, manage middleware, and configure the system to use the proper networking protocols. In this embodiment, all or at least much network configuration data is stored on a database in the D-CMTS manager, and the configuration of the network is controlled by a process in which the management software (ConfD) communicates over IPC (sockets) with apps that control the function of various packet processors, MAC, and PHY devices on the improved D-CMTS and D-CMRTS/DOFN units. According to the invention's virtual head end concepts, the main difference may be that the head end commands will be generally directed to the operation of the edge router (1104), while the commands for the DOFN commands will be relayed (often through edge router 1104) to the various remote DOFN in the field.

Here the computer or processor and associated software memory (622) are shown directly controlling the operation of an improved D-CMTS unit by way of various other controllers (624), (626) located in the improved D-CMTS backbone and line cards (500). The communications between this "virtual shelf manager" (622) and the local controller processors (624), (626) are shown as dashed lines (628). The virtual shelf manager may also control the operation of a level 2/3 switch (629) and/or other devices that connect the improved D-CMTS unit to the media content (210), IP backbone "cloud" (212), and other services provided by the cable head (202). The operation of the virtual CCAP controller software can generally be the digital version of this teaching.

The virtual CCAP software/virtual shelf manager may often also manage the configuration of the various "smart" D-CMRTS/DOFN fiber nodes (300,304), often by communicating with controllers and applications software embedded with the D-CMRTS/DOFN fiber nodes (not shown). Given the typically long distances between the D-CMRTS/DOFN fiber nodes (300,304) and the virtual shelf manager (622) and improved D-CMRT (500) (which will often be located at the cable head, miles or more away from the various nodes (300,304)), the D-CMRTS/DOFN fiber node (300,304) to virtual shelf manager (622) communication will often be done by various signals and signal protocols communicated by the optical fiber or fibers. In one preferred embodiment, socket based inter-process communication (IPC) protocols are used.

This enables the configuration of the D-CMTS shelf, and indeed the overall network, to be rapidly reconfigured to meet the ever changing network model generated by the invention. Often it will be convenient to store this network configuration, as well as the properties of the various network devices, in a configuration database (630) and configuration database memory device (not shown). Again the operation of the virtual CCAP software may be similar.

Figure 8:
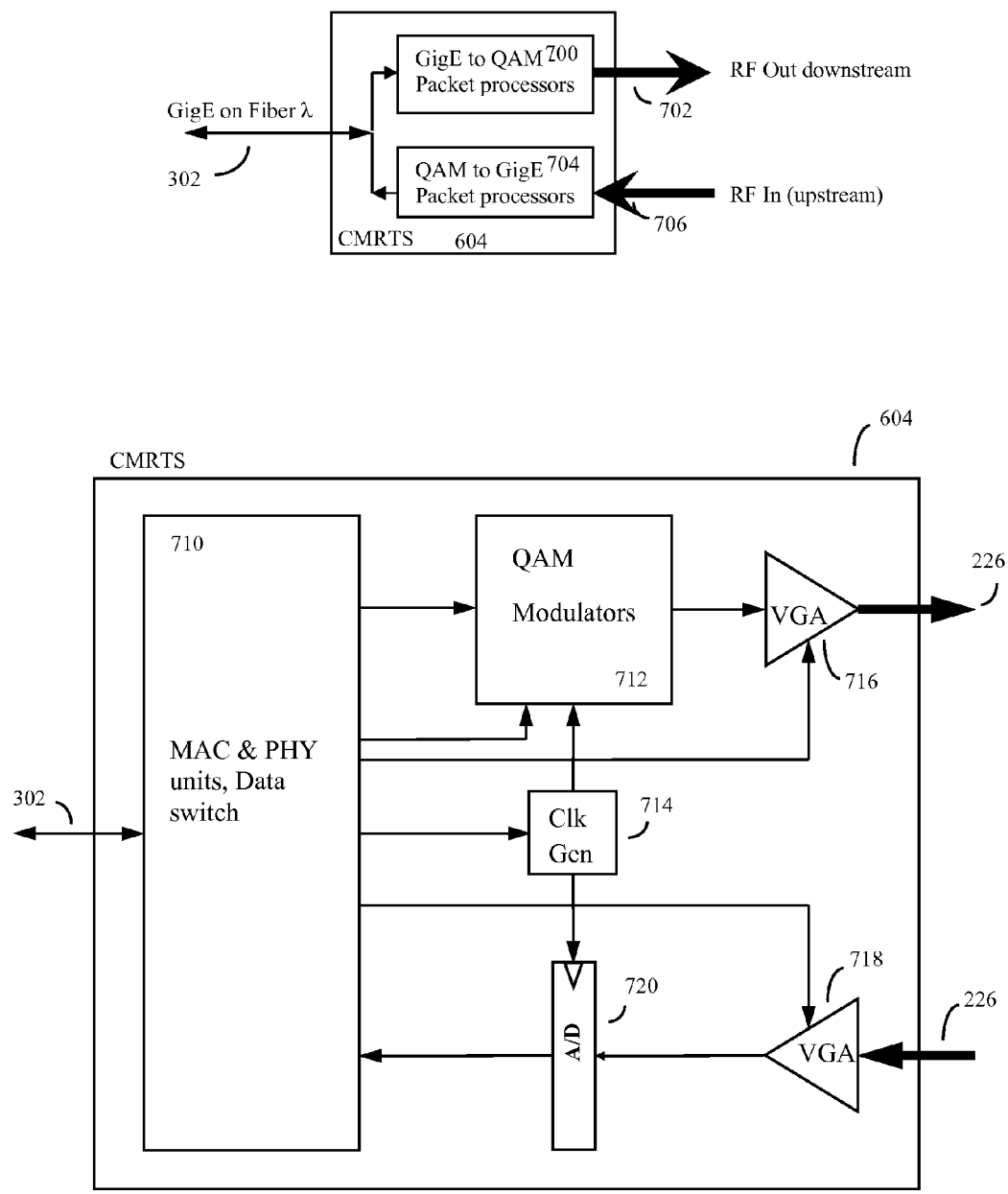
FIG. 8 shows additional details of how the CMRTS portion of the D-CMRTS or DOFN fiber node may operate. The CMRTS portion provides much of the higher functionality of the system.

FIG. 8 shows more details of the Cable Modem Remote Termination System CMRTS (604) portion of the D-CMRTS/DOFN fiber node. At a higher or at least alternate level of abstraction, at least the CMRTS portion of the D-CMRTS/DOFN fiber node, and often the entire circuitry in the DOFN device may typically comprise at least a first set of QAM-RF packet processors (700) with MAC and PHY units that select the desired optical IP downstream data from the GigE formatted data, and convert the downstream optical IP packet data to a plurality of radiofrequency (RF) QAM waveforms (channels) and output this data downstream (702) to the local CATV cable.

This CMRTS unit (604) may also optionally comprise a second set of RF-upstream packet processors (704) that will read the upstream RF signals (data) sent by cable modems connected to the local CATV cable (706). Note that these packet processors (704) may contain MAC and PHY units that are capable of recognizing the upstream data. Thus if the upstream data is sent using an unusually wide upstream bandwidth according to scheme (390), the MAC and PHY units will recognize it. The units will then convert this upstream data to appropriate optical IP Ethernet data packets, or other digital optical data communications protocols suitable for communicating this cable modem data back upstream to the improved D-CMTS (500) at the cable head.

The operation the DOFN, as well as both packet processors (700), (704) as well as other devices such as O-D/A-RF or RF-A/D-O converters (600), (601), QAM remodulators and demodulators (603), (605), CMRTS unit (604) and the like may be remotely controlled by the virtual shelf manager (622) by way of suitable controllers (often microprocessors), and local applications software (Apps) that intercept data from the optical fiber (222) and receive and send commands, often by way of a specialized communications protocol such as the previously discussed sockets protocol. Again the operation of the virtual CCAP control software may be similar.

At a deeper level that exposes more details of the PHY units in both the QAM-RF packet processor (700) and the optional RF-upstream packet processor (704), The DOFN's CMRTS unit (604) will normally comprise MAC and PHY units, and a data switch (710), at least one controller (often a microprocessor and associated software, not shown), various QAM modulators (712) to take the GigE data and convert, QAM modulate, and frequency shift the data as needed to fit the limited CATV RF bandwidth. To do this, DOFN's CMRTS unit may employ a controllable clock generator (714) to control the frequency and timing of the QAM channels, as well as variable gain amplifier (VGA) units (716), (718) to help the PHY portions of the units manage the analog processes in converting signals back and forth between the CMRTS/DOFN unit (300,304) and the cable RF signals.

Various network timing protocols may be used to synchronize the various head end units, DOFN and other HFC network components. In some embodiments, it may be useful to employ the IEEE-1588™ standard to synchronize the various network real time clocks, however other protocols, such as the Network Time Protocol, RFC 1305 (NTP), Satellite based Global Positioning System (GPS), TTP, and SERCOS (IEC 61491) may also be used.

As before, the MAC and PHY units and the data switch (710) switches, and the switches that control the QAM modulators (712) and analog to digital (A/D) units (720) may be remotely controlled by the virtual shelf manager (622) by local (embedded) controllers (often microprocessors) and associated applications software by commands to and from the Virtual Shelf software. As before, often these commands may be sent over the same optical fiber pathways normally used to transmit other data, and again may use socket based inter-process communication (IPC) protocols. Again the operation of the virtual CCAP control software may be similar.

As before, for backward compatibility, the return process for processing upstream data can optionally implement the RF-A/D-O converters (601) and/or QAM demodulators (605) digitize and send the upstream signals back with essentially no modification other than digitization, data packet conversion, and optical conversion process.

Generally, the upstream data will be detected by whatever equipment is best suited to interpret the invention's various upstream data modulation methods—e.g. suitable equipment to intercept and decode the wider bandwidth upstream data and the like.

In this scheme, for simplicity, it is assumed that these methods will be implemented by high speed DSP or software controlled receiver that can amplify the various signals, digitize them, and then decode according to the appropriate algorithms, but of course other methods may also be used. Other hardware, such as ASICs, FPGA, DSP, and the like may also be used, as per U.S. patent application Ser. No. 13/555,170, the contents of which are incorporated herein by reference.

In one embodiment, variable gain amplifier (VGA) units (718) will convert the incoming upstream RF signal from the local neighborhood CATV cable into a signal which is then digitized by the A/D converter and clock generator, analyzed and repackaged by the MAC and PHY units (710) into a GigE or other optical fiber optimized signal, and then sent upstream along the optical fiber through various optical fiber splitter/combiner units (710). This process may be controlled by commands from the Virtual Shelf software.

Figure 9:
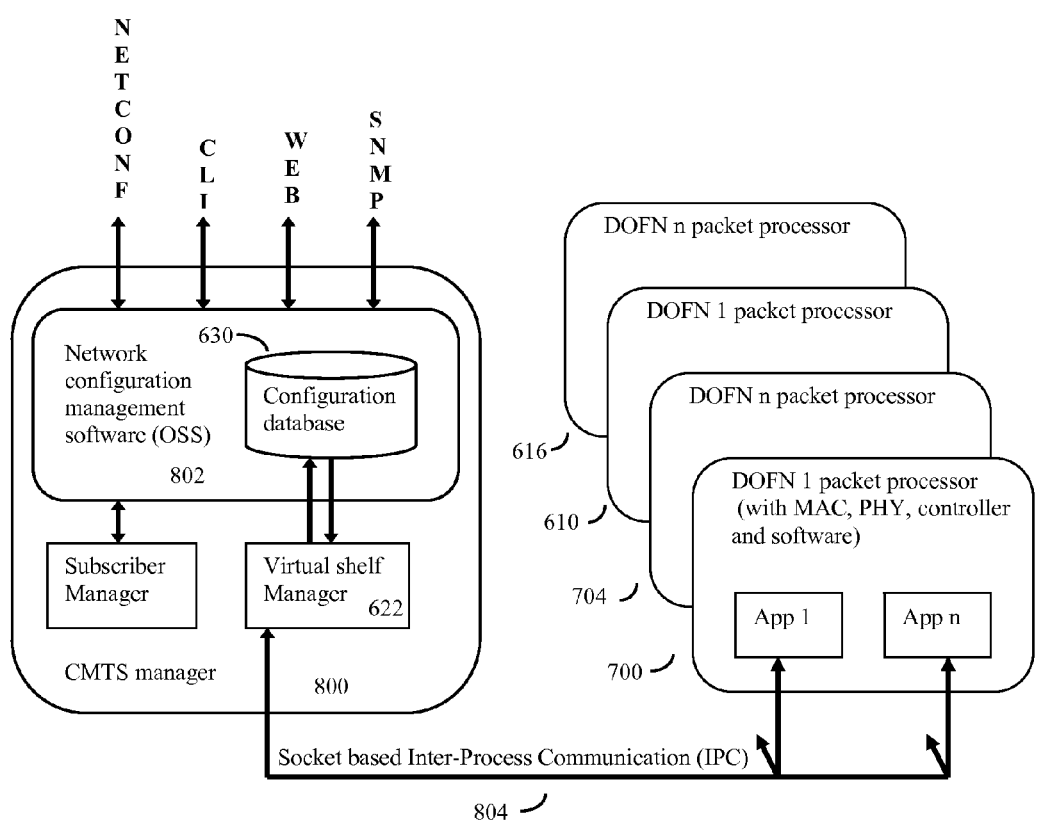
FIG. 9 shows more details of how the virtual shelf manager and the configuration database may control the functionality of most or all of the various D-CMRTS of DOFN fiber nodes, and optionally other active nodes and switches in the HFC network system. This virtual shelf manager and configuration database may exist, at least in software, in two possible forms. One form may be used to manage a legacy head end (202), while, as will be discussed, another form may be used to manage a virtual CCAP/virtual head end, usually in the form of virtual CCAP controller software.

FIG. 9 shows more details of how the virtual shelf manager (622) and the configuration database (630) (previously shown in FIG. 7) may control the functionality of most or all of the plurality of D-CMRTS/DOFN fiber nodes (300,304), improved D-CMTS (500) D-CMTS line cards (502), and optionally other active nodes and switches in the HFC network system. Again the operation of the virtual CCAP software may be similar.

In this example, the virtual shelf manager software (622) is shown running as a module of a broader D-CMTS manager software package (800); however it also may be run as a standalone package. The D-CMTS manager software (800), which will often be run on one or more computer processors which may be located at the cable head (such as at controller (1102) when the improved virtual head end 1120 is used) or other convenient location, will often be based on network configuration management software (802). Such network configuration software (802) (also called the Operational Support Systems (OSS) software) may be, for example, software based upon the ConfD network management software produced by Tail-f Systems Corporation, Stockholm Sweden (International location) and Round Hill Virginia (US location).

In this embodiment, use of software such as ConfD is useful because this type of network management software also provides a number of convenient and commonly used interfaces to allow users to interact with the network and control then network configuration. These interfaces may include NETCONF management agents, SNMP agents, Command Line Interfaces (CLI), Internet (Web) interfaces, and other agents/interfaces as desired.

The virtual CMTS shelf software might previously have been used to control the status of the various D-CMTS line cards (500) (and now used to control virtual head end 1120) and the D-CMRTS/DOFN fiber nodes (300,304) will often interact with a network configuration database (630) run under the control of this network configuration software (802). The virtual D-CMTS shelf software will in turn send commands out to most or all of the various remote D-CMRTS/DOFN fiber nodes, as well as control virtual head end operations analogous to the operation of the D-CMTS (500) at the cable head, and other devices as desired. As previously discussed, one preferred way for this control to be achieved is by way of socket based inter-process communication (IPC) protocols and packets (804), which may be sent over the same optical fiber lines used to send the other data. In this situation, for example, controllers running various types of application software (Apps) in the plurality of remote packet processors (700), (704) in the remote D-CMRTS fiber nodes (300,304) can listen for appropriate commands from the virtual CCAP control software/virtual shelf manager (622), and adjust the operation of the D-CMRTS packet (700), (704) processors accordingly. These D-CMRTS fiber nodes can also transmit their status back to the virtual shelf manager using the same protocols.

The device configuration database (630) of the virtual CCAP software/virtual shelf manager system will often have multiple data fields, including fields that contain the identification code and/or addresses of the various D-CMRTS units in the network (D-CMRTS identifier fields). The database will also usually have information on the status of the various cable modems connected to the various D-CMRTS units, including the cable modem identification data (cable modem identification data fields) and the privileges of the various users that are associated these various cable modems. For example, one user may have privileges to access a broad array of services high bandwidth upload and download data, while another user may have limited access to a different set of services and more limited upload and download data privileges. Other functions that may be implemented include event logging, Authentication, Authorization and Accounting (AAA) support, an extended version of a DOCSIS Management Information BASE (MIBs) functions, etc.

Other fields that normally will be in the database will include information as to user identification fields (user privilege fields), available extended DOCSIS channels, available IP addresses, instructions for how to remotely configure the various D-CMRTS software controllable switches, and instructions for how to remotely configure the various D-CMRTS/DOFN software controllable RF packet processors.

The virtual CCAP software, such as the virtual shelf manager and configuration database, as well as other components of the system, will usually be run on a computer system (e.g. controller 1102) with at least one microprocessor, as well as access to an edge router (1104) that replaces the standard hardware and software, such as MAC and PHY units, that will enable the virtual shelf manager to send and receive data packets (often through the IPC protocol) to the various remote D-CMRTS/DOFN units on the network.

The OSS software (802) can inform the virtual CCAP software/virtual shelf manager software about the privileges, certificates, and encryption keys assigned to the various users. The OSS can also set policies or allocation limits regarding the frequency and bandwidth that will be assigned to the various channels. The OSS can also respond to queries from the virtual shelf manager when new modems are detected. The OSS can further take statistical data collected by the virtual shelf manager, such as packets transmitted and received, volume of data, and use this information for billing and network management purposes.

Further information on OSS functions, and more examples of functions that may be implemented in the OSS software for the invention, may be found in Misra, "OSS for Telecom Networks: An Introduction to Network Management", Springer (2004).

For example how this system would operate, consider the case where a new cable modem is first connected to the system. The cable modem may send an upstream signal (226) to the D-CMRTS (604). The RF-up packet processor (704) in the DCMRTS (604) will in turn collect the information relating to the cable modem identification number, and other relevant parameters, repackage the data in a digital format, and send it back upstream to the virtual shelf manager system on the fiber GigE link (302) or, in the improved version, to the virtual CCAP controller and software (1102).

As did the virtual shelf manager system (622) previously, the virtual CCAP controller and software (1102) will look up the cable modem identification data in the device configuration database (630), and determine the privileges of the user associated with the cable modem identification data, and depending upon the value of the user privilege field, available extended DOCSIS channels, and available IP addresses, send data packets (often via edge router 1104) to the D-CMRTS (700) unit, often by way of the IPC protocol (804) that controls that particular cable modem. The virtual shelf manager may also control the function of any household gateway devices.

These data packets will interact with applications (e.g. App 1, App n) and configure the software controllable switch(es) on the D-CMRTS unit (700), to configure the software controllable switches on the QAM-RF packet processor (700) and the cable modem available IP addresses or TDD-FDD gateway addresses so as transmit downstream data to the cable modem on a first available DOCSIS channel. The data packets will also configure the software controllable RF packet processor (704) to receive upstream data from the cable modem on a second available DOCSIS upstream channel and IP address and retransmit the upstream data as a third upstream digital optical fiber signal (302).

Often the virtual CCAP control software (1102) virtual shelf manager (622) will handle IP addresses for the cable modems and optional gateway devices through the proxy Dynamic Host Configuration Protocol (DHCP) service, or other method.

Alternative types of residential gateways capable of allowing household CATV equipment that is designed for the standard DOCSIS CATV protocols that call for the 5-42 MHz range of upstream frequencies to work with CATV cables an extended range of upstream frequencies are also possible. This gateway equipment will be designed to "fool" the household CATV equipment into thinking that it is connected to a standard CATV cable that is capable of carrying standard 5-42 MHz upstream data, but that this standard CATV cable is relatively uncongested—that is that a comparatively large portion of the 5-42 MHz spectrum is free for use. In fact, the gateway equipment may then either shift the frequency of the household 5-42 MHz upstream data (e.g. QAM channels) to an alternate frequency (e.g. convert a 20 MHz upstream QAM channel to, for example, a 100 MHz QAM channel) for transmission over the CATV cable, or alternatively convert the upstream QAM channel(s) into spread spectrum signals. In either event, the converted upstream signals will then be sent upstream on the CATV cable to the D-CMRTS optical fiber node, or other fiber node as appropriate. This data may then be converted to optical fiber data and sent on to the cable head as appropriate.

Adaptive cancellation methods, useful for such adjustable upstream/downstream frequency ranges were taught in copending application Ser. No. 13/400,415 "METHODS OF ADAPTIVE CANCELLING AND SECONDARY COMMUNICATIONS CHANNELS FOR EXTENDED CAPABILITY HFC CABLE SYSTEMS", the contents of which are incorporated herein by reference.

FIG. 10 shows an alternate type of residential gateway (1100) that can convert between a CATV cable system with an extended frequency allocated for upstream data (e.g. 5-547 MHz or alternative upstream range of frequencies), and residential equipment designed for the standard 5-42 MHz range of upstream frequencies.

Here CATV cable 226 is carrying extended range frequency upstream data (390), which may have far more upstream MHz bandwidth than the standard limited CATV 5-42 MHz upstream bandwidth. However the problem is that within the household, the CATV equipment—e.g. set top boxes, cable modems, may be legacy CATV equipment that only is capable of sending upstream data on the standard 5-42 MHz bandwidth. In this example, the gateway (1100) serving the house may be an extended FDD upstream gateway that contains the equipment necessary to frequency shift the household CATV equipment upstream signals to alternate frequencies for retransmission on the CATV cable (226). Thus, for example, the upstream data capability of a neighborhood could be extended about 10× by reallocating and transmitting the normal 5-42 MHz upstream data in a broader 5-547 MHz range, and tricking every household into thinking that it had free access to a 5-42 MHz upstream range of frequencies that was only 1/10 as congested as it was before.

As previously discussed, alternate types of gateways are also possible. Such alternative methods were discussed in application Ser. No. 13/555,170, which was a CIP of application Ser. No. 13/035,993 "METHOD OF CATV CABLE SAME-FREQUENCY TIME DIVISION DUPLEX DATA TRANSMISSION", now U.S. Pat. No. 8,365,237, the contents of these applications are incorporated herein by reference.

Other alternative embodiments of the invention are also possible. In these alternative embodiments, the CMRTS or D-CMRTS/DOFN units can have multiple outputs, such as multiple CATV cable outputs, or even a mix of CATV or Coax cable outputs and, other output types such as data outputs (e.g. GigE or other data output), telephony outputs, and the like.

The present invention may also be used for alternative HFC configurations, such as copending application Ser. No. 13/346,709 "HFC CABLE SYSTEM WITH WIDEBAND COMMUNICATIONS PATHWAY AND COAX DOMAIN NODES", and Ser. No. 12/907,970 "HFC CABLE SYSTEM WITH SHADOW FIBER AND COAX FIBER TERMINALS", the contents of which are incorporated herein by reference.

In one alternative HFC configuration, discussed in more detail herein, the DOFN concept may be further extended in a manner that allows for greatly simplified, yet highly powerful, systems and methods for HFC system management. In particular, in addition to all digital over fiber data transmission, with good legacy RF capability on the cable portion of the HFC system, in some embodiments of the invention, the HFC head end can be simplified to the point where it can now become a "virtual head end", with greatly reduced power requirements and space requirements.

In the following discussion, the "Gainspeed EtherNodes" may be viewed as being a set, subset, or superset of the previously described DOFN devices and methods.

Much of the following discussion will focus on edge routers. Edge routers are defined by techopedia as: "An edge router is a specialized router residing at the edge or boundary of a network. This router ensures the connectivity of its network with external networks, a wide area network or the Internet." Because they straddle the boundary between different networks, Edge routers often operate using the Border Gateway Protocol (BGP) protocols as a standardized exterior gateway protocol to exchange routing and reachability information between the different autonomous systems. Thus one important invention insight is that, once the HFC CATV system has been converted to all digital operation using the methods described previously in this disclosure, with suitable control methods, the rather cumbersome HFC CATV system prior art head end (202) (Cable head) can now be replaced with more efficient edge router technology.

In this disclosure a specific type of edge router, namely the Juniper MX Series 3D Universal Edge Routers, will be used as a specific example of the type of edge router devices that may be useful to implement the invention. However it should be understood that this specific example is not intended to be limiting, and other types of edge routers may also be used.

As described by Juniper Networks, the MX series of 3D Universal Edge Routers are described in various documents including NETWORK SCALING WITH BGP LABELED UNICAST Design and Configuration Guide, 8020013-001-EN January 2010, and "Universal Edge Service Innovations Propelling Service Provider Growth Universal Edge Revolutionized with Application Service Capabilities, Network and Service Virtualization, and Programmable Platform, the contents of both of which are incorporated herein by reference.

FIG. 11 shows an overview of the virtual converged cable access platform (e.g. virtual CCAP, virtual cable head). Here the MX device (1104) may be an edge router such as the Juniper Networks MX series of 3D Universal Edge Routers, and the Gainspeed EtherNodes (1106) may be devices such as the digital optical fiber nodes (DOFN) devices (300,304) previously described herein.

Because, as will be discussed, much of the control aspects of the invention's CATV head end can be controlled by the controller (1102) software, at least some of which can be stored on remote servers, and because much of the CATV data content can also be stored on remote servers, in some embodiments, the invention's virtual head end can be viewed as providing the CATV cable network with a "cloud based head end".

Here a controller device (1102) (e.g. Gainspeed Controller, also termed a "controller", (1102) and a virtual CCAP controller) can interface with some or all legacy or next generation cable operator servers/systems such as SNMP, IPDR, PCCM, NETCONF, CLI and so on. This controller can then control the end-to-end process of getting the various cable modem (CM) and Customer Premises Equipment (CPE devices) online to the system. This can implement the functions such as Dynamic Host Configuration Protocol (DHCP) relay, edge router interfaces (e.g. the Juniper Networks MX edge router programmatic interface) and so on.

The edge router (1104) (Juniper Networks MX device) can handle some or all Level 3 and 3+ control and data plane functions. This can include IP/MPLS control plane (e.g. LDP, PGP, ISIS, OSPF functions and so on). The edge router can also handle Level 3 processing (such as IP/MPLS forwarding, Subscriber QoS, Packet Filters, VLAN manipulation, and so on). The digital optical fiber nodes (DOFN, also called the Gainspeed EtherNodes) can handle all Cable radio frequency (RF) and DOCSIS functions. This can include modulation, MAC/PHY, SF, QoS, Encryption, Scheduling, and so on.

FIG. 11 shows an example of a radically redesigned, and at the same time greatly size and resource reduced, "virtual head end" (1120) formed from the combination of a virtual CCAP controller (1102), and an edge router (1104) that, when combined with the inventions DOFN nodes, can be used to greatly simplify the power utilization, space, and cost requirements of legacy head ends (202).

In FIG. 11, HFC data (video, audio, internet data, and the like) is shown as being delivered from various operator servers (1100). These operator servers in effect provide the previously described media content data (210) and IP backbone data (212). In this figure, is further convenient to consider any converter operation (399) to also be done at the operator server level (1100).

Thus these operator servers (1100), such as the cable operator servers send and receive data, often by an optical fiber connection (222), to and from the virtual head end (1120), also sometimes referred to as a "hub". As previously discussed, this virtual head end section in turn will often contain one or more Virtual CCAP controllers (1102) (called a "Gainspeed controller in this example), and one or more edge routers (1104). These edge routers may in some embodiments incorporate the functionality exemplified by the Juniper Networks "MX" edge router.

Here the Gainspeed Controller (1102) instantiates the Virtual CCAP. In particular, it interfaces with some or all existing cable operator server/systems, such as SNMP, IPDR, PCMM, NETCONF, CLI, and other systems. The unit also orchestrates the end-to-end process of getting the cable modem (CM) and Customer Premises Equipment (CPE) devices online. In some embodiments, this can also implement DHCP relay, as well as company proprietary functions such as the JNPR (Juniper) MX Programmatic interfaces, and so on.

Put alternatively, Virtual CCAP controller (1102) handles much of the logic of the previously discussed CMTS manager (800), and may for example, implement the logic for the subscriber manager, virtual shelf manager (622), network configuration management software (802), and configuration database (630) previously discussed in FIG. 9 and elsewhere. In essence the Virtual CCAP is the "brains" of the virtual head end, and is implemented mostly in software, while the edge router is the "brawn" (data packet switching capability) of the virtual head end, and does the massive amount of data packet transfer needed to support the HFC CATV system.

The software for the Virtual CCAP controller/Gainspeed controller (1102) can reside anywhere. Although to minimize latency, some of the more time sensitive portions of the software may reside on the physical controller hardware (1102) itself (which will generally comprise at least one computer processor, and more typically large numbers of computer processors, some of which may be specially configured for the task), at least the less time sensitive portions of the Virtual CCAP controller software can reside elsewhere, and may even be located on remote servers, also called "the cloud", or at least be controlled remotely.

Note also that the process of transforming a legacy HFC system with a legacy head end and legacy optical fiber nodes can be almost completely transparent to the end users in the various households, and the cable modems (208) and other consumer premises equipment (CPE) do not need to be changed during the transition. Here for example, in a first step, legacy optical fiber nodes (204) can be swapped with DOFN (300,304), and these DOFN operated using legacy head ends/cable heads (202) and converters (399), and the household service and legacy cable modems will continue to operate. Then, when convenient, the legacy head end (202) and converter (399) can be swapped out for the invention's virtual head end (1120). The various legacy household cable modems (208) and other legacy equipment (e.g. televisions and the like) can continue to operate. Thus the cable operator can gracefully upgrade the capabilities of the HFC system without breaking a lot of subscriber equipment. Eventually, of course, to provide improved service, the legacy cable modems and other household equipment may also be upgraded, but this can be done gradually, and without distress to the large number of cable subscribers.

The Juniper MX or other type edge router (1104) can be used to handle some or all Level 3 (L3+) control and data plane functions, such as those previously described in FIG. 7 (629), (624), (616), (610) and the like. This can include IP/MPLS control plane functions such as LDP, BGP, ISIS, OSPF, and so on. This can also include Level 3 packet processing, such as IP/MPLS forwarding, Subscriber QoS, Packet filters, VLAN manipulation, and so on.

Thus to reiterate, the combination of the Gainspeed controller (1102) and edge router (1104) can be used to create a "virtual head end" that, in combination with the invention's DOFN, can convert a legacy cable system to all-digital operation, as well as replace the high power and high space requirements of legacy head ends with a lower power lower space requiring "virtual head end". This "virtual head end" can replace legacy cable head (head ends) such as legacy cable head (202) shown in FIG. 5, or more specifically the combination of the Cable head (202) and the converter (399) shown in FIGS. 5 and 6.

With respect to the "operator servers" (1100), in some embodiments, these operator servers can act to replace the media content servers or storage, such as media content (210) as shown in FIG. 6. Because, according to the invention, even legacy signals, such as legacy QAM channels are transmitted in all digital formats, in some embodiments, it may be convenient to pre-digitize or pre-sample various channels intended to be reconstituted into legacy RF waveforms at the DOFN, and store this media in a pre-digitized legacy format. This can help reduce the amount of subsequent processing that the Gainspeed controller (1102) and edge router (1104) will need to do in order to transmit digitized legacy signals to the various DOFN/Gainspeed EtherNodes (1106)

The Gainspeed Ethernode(s) (1106) can handle some or all RF and DOCSIS functions. This can include modulation, MAC/PHY, SF QoS, Encryption, Scheduling, and so on.

In this embodiment, the CATV cable network can be viewed as having almost a "cloud based head end" or "virtual head end". Here a controller device (e.g. Gainspeed Controller) can interface with some or all legacy or next generation cable operator servers/systems such as SNMP, IPDR, PCCM, NETCONF, CLI and so on. This controller can then control the end-to-end process of getting the various cable modem (CM) and Customer Premises Equipment (CPE devices) online to the system. This can implement the functions such as DHCP relay, edge router interfaces (e.g. the Juniper Networks MX edge router programmatic interface) and so on.

The controller device, alternatively called the Virtual CCAP controller, will generally consist of at least one processor, and virtual CCAP controller software. This virtual CCAP software can assume some or all of the functionality previously discussed in FIG. 9. In some embodiments. the virtual CCAP software can be configured to run on the virtual CCAP controller's at least one processor, and to issue commands to said edge router. Some commands may instruct the edge router to interface with legacy operator servers or systems using various protocols, such as the simple network management protocol (SNMP), internet protocol detail record (IPDR), packet cable multimedia (PCMM), Network Configuration Protocol (NETCONF), command line interface (CLI) protocol, or other protocols. Other commands may instruct the edge router to manage the process of bringing cable modem and customer premises equipment online to the HFC cable network, and to further implement dynamic host configuration (DHCP) relay and edge router program interface protocols. Examples of some of these edge router commands, and edge router responses back to the controller, can be seen in more detail in FIGS. 12-15.

The edge router (Juniper Networks MX device) can handle some or all Level 3 and 3+ control and data plane functions. This can include IP/MPLS control plane (e.g. LDP, PGP, ISIS, OSPF functions and so on). The edge router can also handle Level 3 processing) such as IP/MPLS forwarding, Subscriber QoS, Packet Filters, VLAN manipulation, and so on). The digital optical fiber nodes (DOFN, also called the Gainspeed EtherNodes) can handle all Cable radio frequency (RF) and DOCSIS functions. This can include modulation, MAC/PHY, SF, QoS, Encryption, Scheduling, and so on.

In some respects, the functionality of the Gainspeed controllers, as well as other elements of the system can best be exemplified by FIGS. 12-15.

The hub section (virtual head end 1120) will in turn often communicate by optical fibers to one or more Gainspeed EtherNodes. The Gainspeed EtherNodes in some embodiments may have a structure and function to the previously described Digital Optical Fiber Nodes (DOFN). In particular, these Gainspeed EtherNodes will often connect to both optical fibers, as well as to the CATV coax cable. Thus the Gainspeed EtherNodes will often have both optical input and output (from the optical fibers) as well as RF input and output to the CATV Coax cable.

Figure 11A:
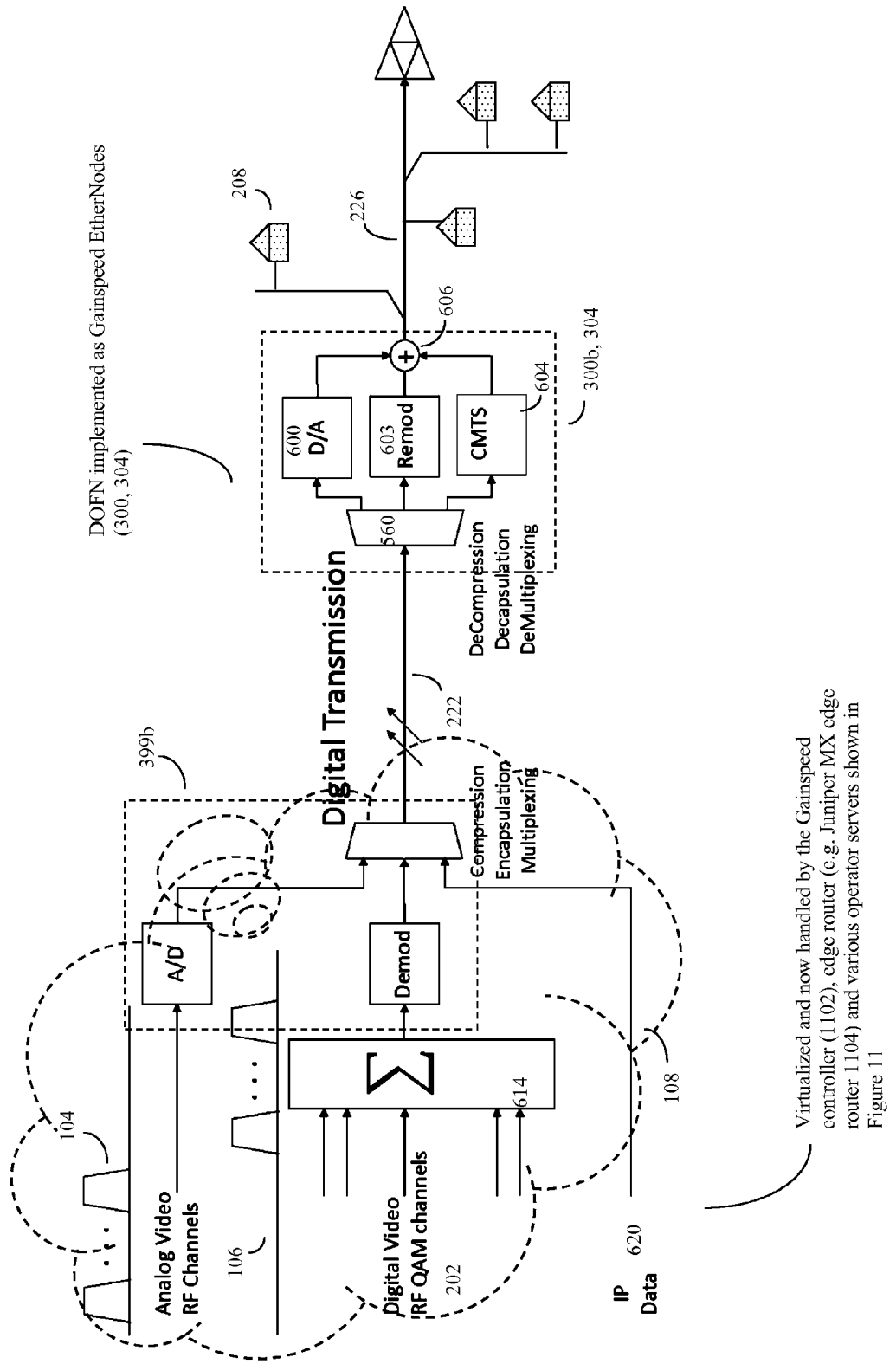
FIG. 11A is based on FIG. 4C previously described herein, and shows how the various functions of the cable head end are now handled by the present invention's virtual converged cable access platform (show in FIG. 11, and also in the following figures). Here the previously discussed Digital Optical Fiber Nodes (now referred to as the Gainspeed EtherNodes) continue to handle the interface between the cable RF signals, and the optical fiber data.

FIG. 11A shows some of the similarities between the previously discussed DOFN and the Gainspeed EtherNodes (1106). FIG. 11A is based on previously discussed FIG. 4C, and shows how the various functions of the cable head end can be handled by the present invention's virtual converged cable access platform (show in FIG. 11, and also in the following figures), while the previously discussed Digital Optical Fiber Nodes (now referred to in the alternative as the Gainspeed EtherNodes) continue to handle the interface between the cable RF signals, and the optical fiber data.

Note, however that there can be some exceptions to the rule that the Gainspeed EtherNode will generally have an optical input and output. In some cases, for example when it is physically difficult to route optical fiber to a particular node, the Gainspeed EtherNode may instead transmit data that might normally have gone over the optical fiber over the coax cable at very high frequencies, such as the 1 Gigahertz plus (1 GHz+) frequencies. Here the methods of copending and parent application Ser. No. 13/964,394 "HFC CABLE SYSTEM WITH ALTERNATIVE WIDEBAND COMMUNICATIONS PATHWAYS AND COAX DOMAIN AMPLIFIER-REPEATERS" may be used. The complete contents of U.S. patent application Ser. No. 13/964,394 are incorporated herein by reference.

The CATV coax cable in turn, at the cable plant, will then connect to various households. Each household may have various devices such as cable modems (CM) and Customer process equipment (CPE).

In some embodiments, all signals transmitted over the optical fiber will be digital signals. The Gainspeed EtherNodes/DOFN may be configured to transform or convert at least some of these digital signals to legacy RF CATV signals as desired. Thus in some embodiments, the present invention can deliver and receive backward compatible RF signals to legacy household cable modems, television, CPE and other devices.

One important aspect of the invention is that it maps DOCSIS functionality into edge router functionality. The mapping is across the different elements, devices, or modules of the system. Put alternatively, one important aspect of the invention is that it virtualizes DOCSIS across the edge router.

As shown in FIGS. 12-15, the invention can orchestrate the end to end process of getting various cable modem and customer process equipment (CPE) devices online, including legacy CATV cable modems and CPE. Indeed, one important aspect of the invention that it enables the cable operator to set up a service that goes to households, and can utilize existing CATV coax cable and existing cable modems and CPE devices to maintain backward compatibility where desired.

In some embodiments, the invention can implement the various levels of functionality needed to get legacy cable modems online, and (for example) to allow household computers to connect to the internet. Additionally, the invention can also be configured to provide various customer levels of service. That is, it can be configured so that customers that pay for a first level of service can obtain a first level of bandwidth (i.e. data carrying capability), customers that pay for a second level of service can obtain a second level of bandwidth, and so on.

In other embodiments, the invention may also allow the cable operator to deliver various different types and levels of service according to various customer specific service contracts According to the invention, the Gainspeed EtherNodes/DOFN can be configured to implement or provide CMTS (Cable Modem Termination System) and Layer 2 access. Because these Gainspeed EtherNodes/DOFN are right of the edge of the CATV coax cable plant, this layer is called the "outside plant", to distinguish from the various coaxial cable devices in the "inside cable plant".

Thus according to the invention, the Gainspeed EtherNodes/DOFN in the "outside plant" are managing all of the cable modem access over the coax. These Gainspeed EtherNodes/DOFN essentially forward traffic from the network and from the edge router to the various coax cable households and neighborhoods in the coax plant, and vice versa (e.g. from the cable plant all the way to the edge router).

The invention's systems and methods can also be configured to handle coordination. Depending upon service levels, the system can be configured to allow one customer cable modem to receive and transmit more data than a different customer's cable modem. The invention can also be configured to prioritize traffic, reshape traffic, and also do full content inspection as desired.

Depending upon the configuration setting, some of the above processes may be done at the Gainspeed EtherNode/DOFN, and some may get done at the edge router (1104) as assisted by controller (1102). Here system resources can play an important role in determining what parts of the system handle what processes. Often, for example, the operator may find it preferable to assign the task of packet reshaping to the edge router, because typically edge routers will have more onboard intelligence and more system resources to accomplish this task.

Another system device, here called the Gainspeed controller or virtual CCAP controller (1102), can be used to control and coordinate the system. The Gainspeed controller (1102) is operationally defined by FIGS. 12-15. The Gainspeed controller can be used, for example, to instruct the edge router (1104) to look for a certain type or class of traffic, and provide the proper priority or shaping for that class of traffic.

Depending upon the system configuration, the edge router (1104) may or may not be expected to manage the various cable modems. In some embodiments, the Gainspeed controller can be used to provide some or all parameters needed to appropriately configure the functionality of the edge router (1104), and deliver the desired level of service.

Figure 12:
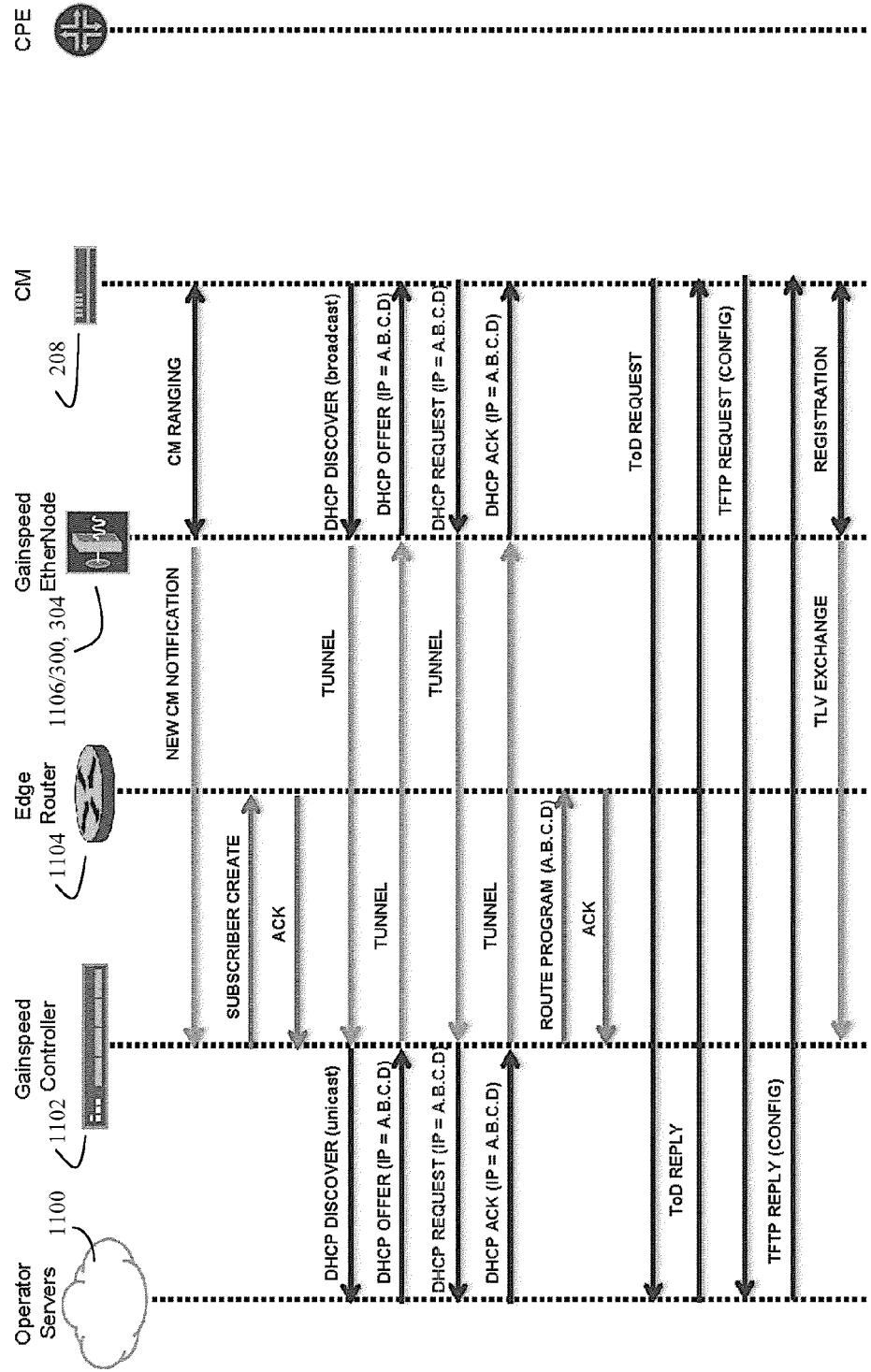
FIG. 12 shows a detail showing the system's high-level operational workflow.

FIG. 12 shows a diagram of some of the more important communication protocols that go between the different entities or elements of the system. For example, FIG. 12 shows:

1) The bidirectional communication between the cable and the Gainspeed EtherNode;

2) The bidirectional communication between the Gainspeed EtherNode and the edge router;

3) The bidirectional communication between the edge router and the Gainspeed controller;

4) The bidirectional communication and between the Gainspeed controller and the cable operator servers or back office.

Figure 13:
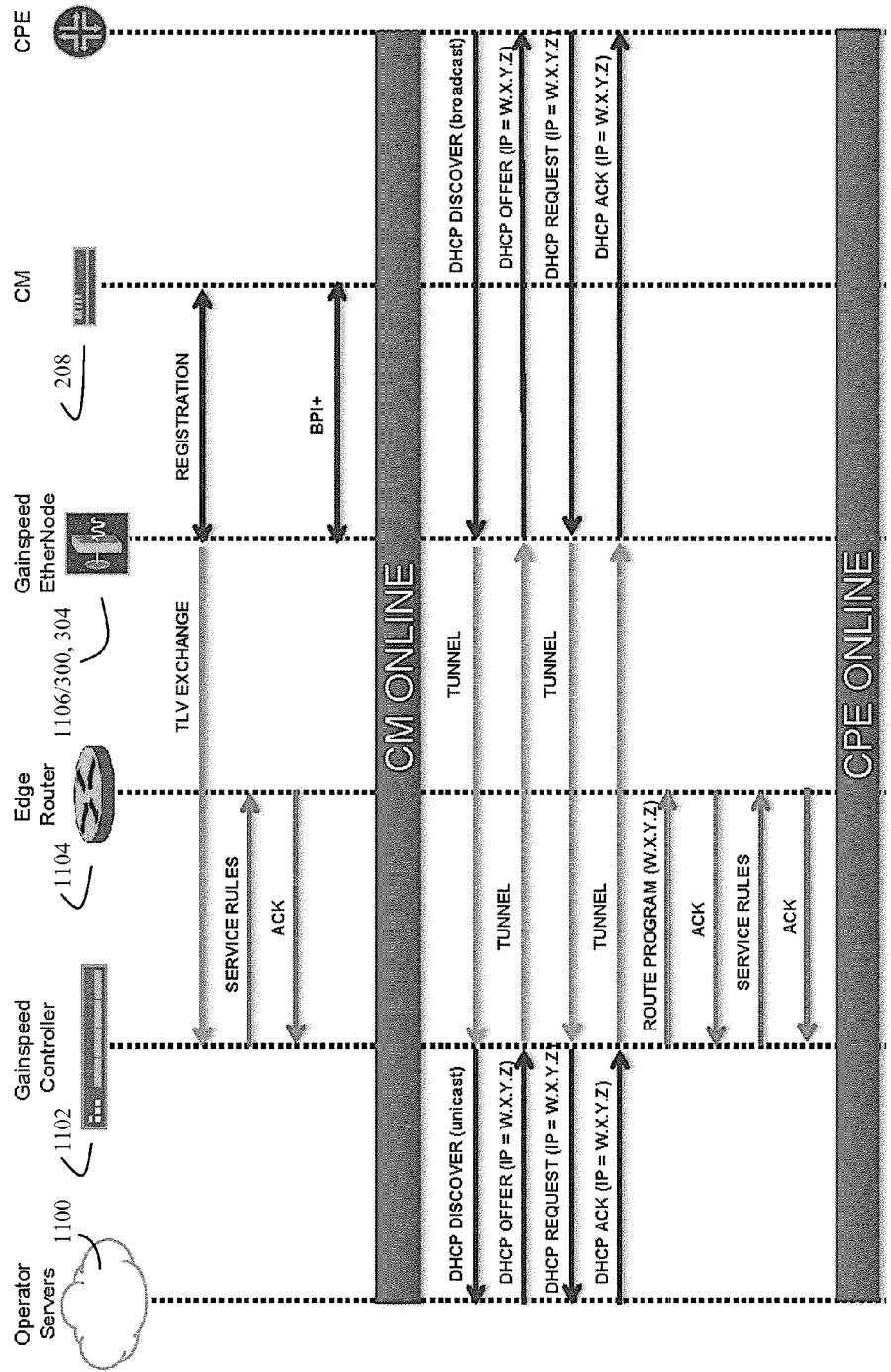
FIG. 13 shows additional details of the system's high-level operational workflow.
Figure 14:
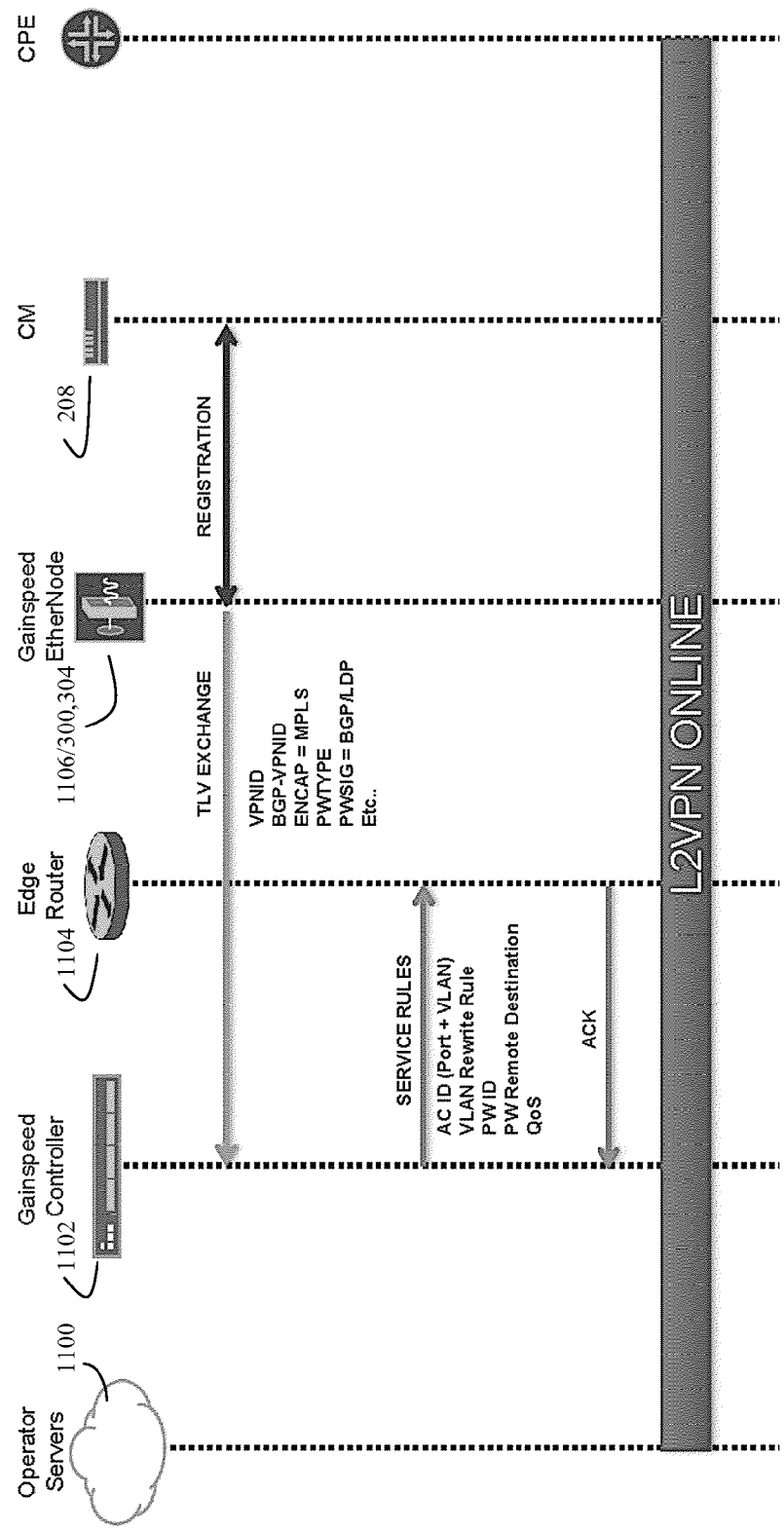
FIG. 14 shows some details of the system's Business Services over DOCSIS (BSoD) workflow
Figure 15:
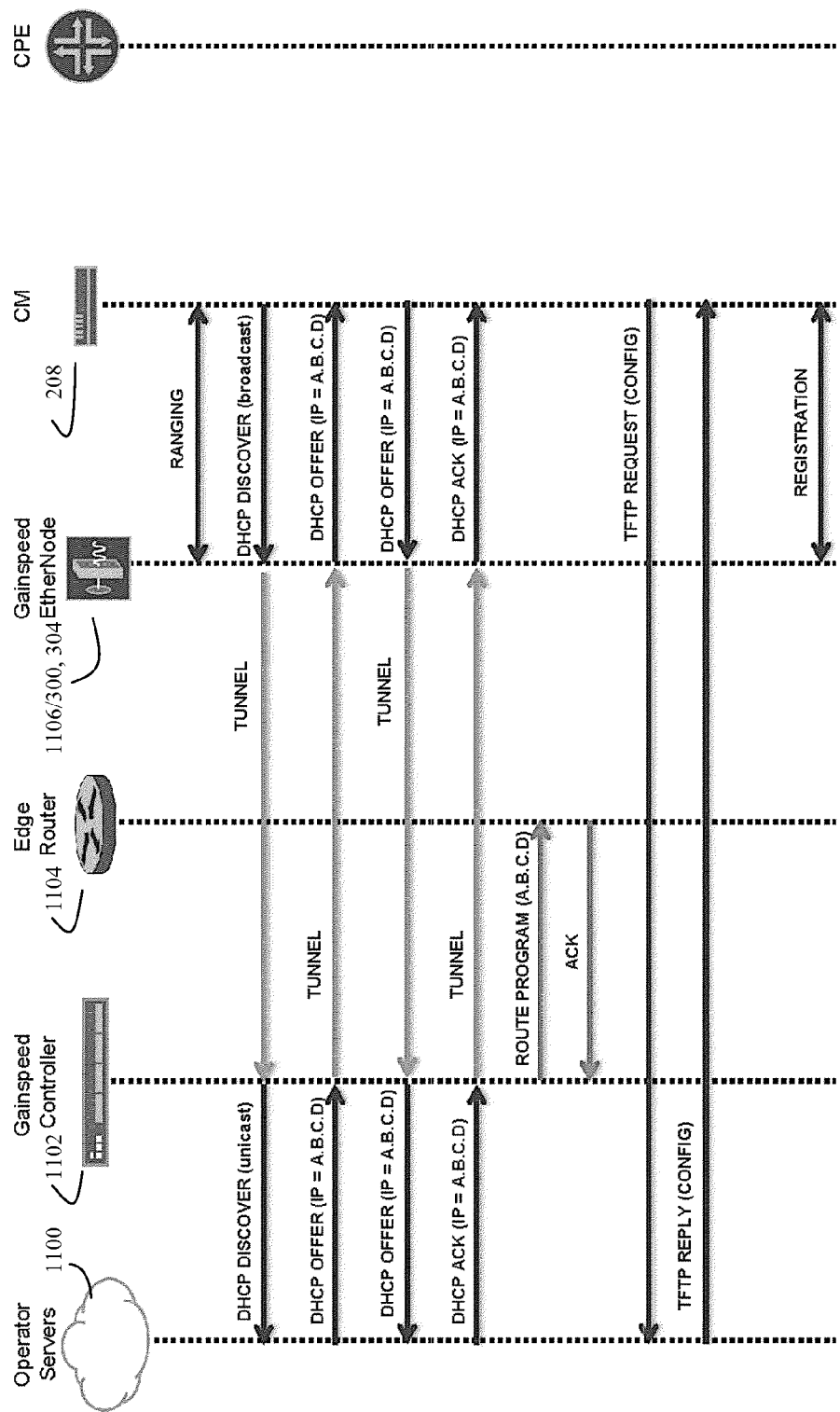
FIG. 15 shows an example of the various protocol operations according to the invention's virtual converged cable access platform.

FIGS. 13-15 provide a further discussion of the protocols and interfaces between the operator servers, the Gainspeed controller(s) (1102), edge router(s) (1104), Gainspeed EtherNode(s)/DOFN (1106/300,304), and the household cable modem (CM) (208) and CPE devices. Note again that these figures do double duty because in addition to showing a more detailed description of the various system communication protocols, the figures also serve to give an operational definition of the functions of the Gainspeed controller and other devices. Here, an operational definition of the functions performed by the operator servers (e.g. cable operator servers), the edge router (e.g. Juniper Networks MX edge router), the Gainspeed EtherNode, and the household cable modem and CPE devices is thus provided.

Note that the invention may be implemented in a stepwise manner, with more and more functionality implemented as the cable operator desires.

For example, at the most basic demonstration level, the system can be implemented to perform basic IPv4 forwarding, and not implement Quality of Service (QoS) functionality. At the basic level, the system can also implement Point to point (P2P) Ethernet private line (EPL) service for cable modems, but without functions such as VLAN ID re-write, and with no CoS re-marking of data packets. At the basic level, the system can also implement Border Gateway Protocol (BGP) or Label Distribution Protocol (LDP) signaling on the MX or other edge router (1104).

At a higher level of functionality, the system may also implement service attribute enforcement on the MX or other edge router (1104). This can include Quality of Service (QoS) policy (e.g. network facing, SF mapped), packet filters (e.g. standard, DOCSIS subscriber management) type filters. The system can also implement dynamic service attribute adjustments, and also provide the convenience of session tear-down when the cable modem(s) go offline. The system can also implement some basis statistics export. This might include QoS policy, packet filters, Ethernet interface packet/byte counters, and the like.

At a still higher level of functionality, the system may also implement more advanced functions, such as IPv6 support, packet cable, and multicast support. The system can also implement Routing Information Protocol (RIP) routes, dynamic service flow signaling, and more advanced statistical reporting.

Thus to reiterate, in some embodiments, the system can be implemented in an incremental or step-wise manner, starting with basic IPv4 forwarding and P2P Level 2 VPN networking, and upgraded to implement additional functions such as providing various quality of service (QoS) policies (e.g. network facing, SF mapped), various dynamic service attribute adjustments, ability to cope when the cable modems go off line with session tear-down capability, and basic statistics export (e.g. QoS policy, packet filters, Ethernet interface packet/byte counters, and the like. At a still higher step up, the system may additionally do other functions such as IPv6, packet cable, and multicast support. The system may additionally implement RIP routs, dynamic service flow signaling, implement a fuller set of reporting statistics, and strive for high availability.

FIG. 15 shows a further discussion of system architecture and functions. In particular it discusses the protocol operations in the invention's virtual converged cable access platform.

The Motorola CCAP 101 white paper, shown in the appendix of priority document U.S. provisional 61/870,226, and incorporated herein by reference, discusses repartitioning DOCSIS to various different elements of the network. These are separate entities, such as a node, an edge router, back office, and control node(s).

Among other aspects, in some embodiments, the present invention can virtualize many of the functions described in the Motorola CCAP 101 white paper.

Thus in one embodiment, the invention may be either a system or a method of operating an HFC cable network using a virtual converged cable access platform (1120) configured to relay data between at least one cable modem (208) and at least one operator server (1100). This virtual converged cable access platform will generally comprise at least one virtual CCAP controller (1102), at least one edge router (1104), and plurality of digital optical fiber nodes (DOFN) (1106 and 300,304), connected to at least one set of neighborhood CATV cables (226) with at least one CATV connected cable modem (208). The invention will generally operate by using the DOFN (1106/300,304) to detect the one or more cable modem(s) (208), and transmit notification that a given cable modem has been detected back through the optical fiber (222) and the edge router (1104) to the virtual CCAP controller (1102). The invention will in turn use the virtual CCAP controller (1102) and the edge router (1104) to discover and acknowledge the cable modem (see FIGS. 12 and 13 for more detail).

The invention will also use the virtual CCAP controller (1102) and edge router (1104) to discover at least one operator server (1100), and further use the DOFN (1106/300,304) to relay data between the cable modem(s) (208) over the RF portion of the CATV cable (226) and optical fiber (222) to the one or more operator servers (1100) by way of the edge router (1104) as controlled by the virtual CCAP controller (1102).

The invention will further use the virtual CCAP controller (1102) to transmit cable service rules to the edge router (1104), and receive acknowledgement of these service rules from the edge router (see FIG. 13 for more detail). The amount and type of data subsequently relayed between the cable modem(s) (208) and the one or more operator servers (1100) is or will be controlled by these service rules.

Often these service rules can be at virtual local area network (VLAN) rewrite rules, password identification, password remote destination, or various CATV network Quality of Service rules. Here for example, depending on what level of service the user of cable modem (208) has contracted for, different operator servers (1100), different content, and different speeds may be made available.

As previously discussed, often the virtual CCAP controller (1102) can be configured to interface with legacy operator servers or systems using one or more protocols, such as the simple network management protocol (SNMP), internet protocol detail record (IPDR), packet cable multi-media (PCMM) protocol, Network Configuration Protocol (NETCONF), command line interface (CLI) protocol, or other protocol.

The virtual CCAP controller (1102) can also be configured to manage the process of bringing cable modem and customer premises equipment online to said HFC cable network. To help facilitate this process, and/or for other functions as well, the virtual CCAP controller (1102) can also be configured to implement and use dynamic host configuration (DHCP) relay and various edge router program interface protocols as well.

As previously discussed, the virtual CCAP controller (1102) will generally comprise at least one processor (often a plurality of processors, which may be a mix of general purpose microprocessors and customized high performance processors with instruction sets optimized for these purposes), memory, suitable interfaces, and virtual CCAP software configured to run on the controller's least one processor, direct the controller processor(s) to issue commands to the edge router (1104).

Some of these commands can be commands to direct the edge router to interface with legacy operator servers or systems. Here it may be useful to use various protocols, such as the previously discussed simple network management protocol (SNMP), internet protocol detail record (IPDR), packet cable multi-media (PCMM), Network Configuration Protocol (NETCONF), command line interface (CLI) protocol or other protocol. The controller's software commands will generally also work with the edge router (1104) to manage the process of bringing the cable modem (208) and other customer premises equipment online to the HFC cable network, as well as to further implement dynamic host configuration (DHCP) relay and other edge router program interface protocols.

The edge router (1104) will often be configured (often with commands from controller 1102) to handle all level 3+ network layer protocols, including packet forwarding, and routing through intermediate routers. The edge router (1104) will often also be further configured to implement router control plane addressing. Here various protocols such as the label distribution protocol (LDP), border gateway protocol (BGP), Intermediate System to Intermediate System (ISIS) protocol, and open shortest path first (OSPF) protocol may be used. In particular, the controller (1102) will often configure the edge router (1104) to implement various level 3 packet processing functions, such as multiprotocol label switching IP forwarding, subscriber quality of service (QoS), packet filters, and virtual local area network (VLAN) manipulation.

The invention's virtual head end generally relies upon capable DOFN (300,304/1106). As previously discussed, these DOFN will generally be configured to manage a plurality of Cable Radiofrequency and DOCSIS functions, such as RF modulation, implementation of suitable CATV cable and optical fiber MAC/PHY functionally, data encryption, and various data scheduling functions. These DOFN will often be connected to the CATV RF cable at one end, and to the optical fiber (222) which eventually (often by various intermediate switches and sections that are not shown) connect to the edge router (1104).

Thus often the invention will implement its various systems and methods by using the virtual CCAP controller(s) (1102) and edge router(s) (1104) to create a virtual head end (1120) that in turn connects to and controls the rest of the HFC cable network (i.e. least one optical fiber cable to at least one digital optical fiber node (DOFN) that is connected to at least one set of neighborhood CATV cables). The invention can operate to transmit, for example, various legacy CATV downstream QAM channels, as desired, by transmitting at least one downstream QAM channel over the optical fiber as a plurality of QAM constellation symbols. This can be done digitally by encapsulating these QAM constellation symbols into a plurality of Ethernet frames or other digital transmission format frames, and digitally transmitting this plurality of Ethernet frames or other digital transmission format frames over the optical fiber (222). Note that QAM symbol encapsulation or other digital transmission format can be either done in real time by one or more operator servers (1100) or converters (399), or alternatively this QAM symbol encapsulation or other digital transmission format can be done in non-real time, and simply saved on the operator servers (1100) for use as needed for later transmission.

Once the digital transmission is handled by edge router (1104), as commanded by controller (1102), and is transmitted over the optical fiber (222) to the DOFN (1106/300, 304) (often as Ethernet frames or other digital transmission format), the DOFN can then receive this plurality of Ethernet frames or other digital transmission format claims. The DOFN can then extract the downstream QAM constellation symbols, and use the downstream video QAM constellation symbols to modulate at least one DOFN QAM modulator (607), (712), thus producing downstream QAM RF signals. The DOFN can then transmit these DOFN generated downstream QAM modulated RF signals further downstream over said at least one set of neighborhood CATV cables (226).

As previously discussed, many different types of QAM channels may be transmitted by this type of process, including video QAM channels, video Edge-QAM channels, or IP-QAM channels. See FIG. 7 for some specific examples.

In other embodiments, and also as discussed in FIG. 7 and elsewhere, these methods may also be used to transmit other types of downstream data, such as National Television System Committee (NTSC) or Orthogonal Frequency Division Multiplexing (OFDM) RF channels. This can be done using operator servers (1100) and or converters (399) to further digitally process the data prior to the data then being processed by the controller (1102) and edge router (1104), and being transmitted over the optical fiber (222).

Here again, the process will generally comprise, either in real time, or on a non-real time basis (e.g. using a converter 399, or storing the data in an operator server 1100 after digital sampling), digitally sampling the NTSC or OFDM RF channels, thus producing a plurality of digitized waveform data, and again encapsulating this digitized waveform data into a plurality of digitized waveform data containing Ethernet frames or other digital transmission frames. This can then, with the aid of controller (1102) and edge router (1104) digitally transmitted the data downstream over the optical fiber (222). Once at the DOFN (1106/300,304), the DOFN can be used to receive the digitized waveform data containing Ethernet frames or other digital transmission frames, extract this plurality of digitized waveform data, and use this plurality of digitized waveform data to drive at least one digital to analog converter, thus producing downstream NTSC or OFDM RF channels (see FIG. 7 and elsewhere for details). These DOFN generated NTSC or OFDM RF signals are then transmitted further downstream, in RF form, over the neighborhood CATV cables (206) to the subscriber's equipment.

Similarly, when the downstream data comprises Orthogonal Frequency Division Multiplexing (OFDM) RF channels, the system can operate by either in real time or non-real time demodulating the OFDM RF channels, producing a plurality of OFDM symbols, and encapsulating this plurality of OFDM symbols into a plurality of OFDM symbol carrying Ethernet frames or other digital transmission frames. As before, the edge router (1104), as commanded by the controller (1102), can digitally transmit this information over the optical fiber (222) to the DOFN (1106/300,304), where again the DOFN can extract the information, us it to drive at least one OFDM RF modulator, and transmit the resulting OFDM RF signals further downstream over the neighborhood CATV cables (226).

Going upstream, the process essentially can be run in reverse. For example, the invention's systems and methods may also be used to, over the optical fiber, digitally transmit upstream RF QAM channel data originating from at least one CATV cable (226) connected cable modem (208) or other neighborhood CATV cable connected devices. Here the DOFN (1106/300,304) will receive this upstream RF QAM channel data, will demodulate least one upstream RF QAM channel into a plurality of upstream QAM constellation symbols. This is shown in more detail in FIG. 7 (605). The DOFN will then encapsulate this plurality of upstream QAM constellation symbols into a plurality of Ethernet frames or other digital transmission format frames, and use the optical fiber (222) to digitally transmit said plurality of Ethernet frames or other digital transmission format frames upstream to said virtual head end. There the edge router (1104) and Gainspeed controller (1102) can then interpret the upstream information or further route this upstream information as appropriate. This process is shown in more detail in FIGS. 12-13 and 15.

Similarly, the invention's methods may also be used to digitally transmit upstream RF OFDM channel data (again typically originating from the cable modem (208) or other cable connected devices) over the optical fiber (222) as well. Here again, the DOFN can receive upstream RF OFDM channel data, and demodulate this into a plurality of upstream OFDM symbols. These OFDM symbols can then also be encapsulating into a plurality of Ethernet frames or other digital transmission format frames, and transmitted upstream, over optical fiber (222), to the virtual head end (1120) where the same type of interpretation and routing process can occur.

In the same manner, the invention's methods may also be used to digitally transmit upstream RF channel data. Here the DOFN, upon receiving the upstream RF channel data, can digitally sample the RF channel data (see FIG. 7 (601)), producing a plurality of digitized waveform data. This can also be encapsulated into a plurality of Ethernet frames or other digital transmission frames, and also transmitted upstream, over optical fiber (222) to the virtual head end (1120) where again this data may be interpreted and routed as appropriate.

Note that often upstream data may consist, at least in part; of various types of instructions for the HFC head end (for example, see FIGS. 12-15). Here to interpret these instructions, the virtual head end, usually using the controller (1102) and controller software (e.g. virtual CCAP controller software) can, while still operating in the digital domain, interpret these various instructions and act on them without the need to reconstitute the original RF waveforms originally used to transmit RF upstream data over the cable (226), other types of upstream data, such as DOCSIS IP data, and the like, can also be handled by the controller (1102) and edge router (1104) and directed to the desired destination, again keeping entirely to the digital domain during this process. Thus the virtual head end (1120) can operate entirely in the digital domain, as desired.

The invention may be used either to upgrade a legacy Hybrid Fiber Cable (legacy HFC) system (i.e. a system previously configured to transmit data downstream over said optical fiber using analog optical QAM waveforms), or to produce a brand new (non-legacy) HFC system, as desired.

In the case where it is desired to upgrade a legacy HFC system, then this legacy system will usually comprise a legacy head end (202) configured to produce downstream RF QAM waveforms, as well as a legacy fiber optic transmitter system configured to transduce said RF QAM waveforms into downstream analog optical QAM waveforms such as (120), and send these analog optical QAM waveforms downstream over the optical fiber (222) to at least one legacy optical fiber node such as (204). This legacy optical fiber node (204) will generally be configured to receive these downstream analog optical QAM waveforms (120) and transduce said analog optical QAM waveforms into RF QAM waveforms (110), and transmit these RF QAM waveforms downstream over at least one set of neighborhood CATV cables (226).

In this case, this legacy HFC system may be upgraded by replacing the legacy head end (202) with a virtual head end (1120), and also replacing the legacy optical fiber nodes (204) with various DOFN (1106/300,304). Backward compatibility with legacy cable modems (208) and other equipment can be maintained by, for example, further configuring the virtual head end (1120) and at least one operator server (1100) to transmit at least one downstream RF QAM channel over the optical fiber (222) as a plurality of QAM constellation symbols encapsulated into a plurality of Ethernet frames or other digital transmission format frames using a digital optical transmission method.

Of course there is no requirement that the HFC system be a legacy system. The invention's methods may also be used to create an entirely new HFC system by simply using the invention's virtual head end (1120) and DOFN (1106/300, 304) from the beginning of the HFC cable construction process, without the need to swap out legacy equipment.

The invention claimed is:

1. A virtual converged cable access platform (CCAP) configured to relay data between at least one cable modem and one or more operator servers for a hybrid fiber cable (HFC) network, said virtual CCAP comprising:
at least one virtual CCAP controller, at least one edge router, and a plurality of digital optical fiber nodes (DOFN), the DOFNs connected to at least one set of neighborhood CATV cables that are connected with at a set of CATV connected cable modems, wherein:
one of said DOFNs detects at least one cable modem in said set of CATV connected cable modems and transmits notification of said cable modem detection via said edge router to said virtual CCAP controller,
said virtual CCAP controller and said edge router (i) discover and acknowledge said cable modem, and (ii) discover at least one of said operator servers,
said virtual CCAP controller transmits cable service rules to said edge router for controlling an amount and a type of data relayed between said cable modem and said discovered operator server,
said DOFN relays data between said detected cable modem and said discovered operator server by way of said edge router and said virtual CCAP controller.

2. The virtual CCAP of claim 1, wherein said virtual CCAP controller is configured to interface with legacy operator servers or systems using at least one of simple network management protocol (SNMP), internet protocol detail record (IPDR), packet cable multimedia (PCMM), Network Configuration Protocol (NETCONF), or command line interface (CLI) protocol.

3. The virtual CCAP of claim 2, wherein said virtual CCAP controller is further configured to manage the process of bringing cable modems and customer premises equipment online to said HFC cable network, and wherein said virtual CCAP controller further implements dynamic host configuration (DHCP) relay and edge router program interface protocols.

4. The virtual CCAP of claim 2, wherein said virtual CCAP controller comprises at least one processor, memory, and virtual CCAP software configured to run on said at least one processor, and to issue commands to said edge router to either:
interface with legacy operator servers or systems using at least one of simple network management protocol (SNMP), internet protocol detail record (IPDR), packet cable multimedia (PCMM), Network Configuration Protocol (NETCONF), or command line interface (CLI) protocol; or
manage the process of bringing cable modem and customer premises equipment online to said HFC cable network, and to further implement dynamic host configuration (DHCP) relay and edge router program interface protocols.

5. The virtual CCAP of claim 1, wherein said edge router is further configured to handle all level 3+ network layer protocols, including packet forwarding, and routing through intermediate routers.

6. The virtual CCAP of claim 1, wherein said edge router is further configured to implement router control plane addressing including at least one of label distribution protocol (LDP), border gateway protocol (BGP), Intermediate System to Intermediate System (ISIS) protocol, open shortest path first (OSPF) protocol,
wherein said edge router is further configured to implement at least some level 3 packet processing functions including multiprotocol label switching IP forwarding, subscriber quality of service, packet filters, and virtual local area network (VLAN) manipulation.

7. The virtual CCAP of claim 1, wherein said DOFN is configured to manage a plurality of Cable Radiofrequency and DOCSIS functions, said functions comprising RF modulation, MAC/PHY, Encryption, and Scheduling.

8. The virtual CCAP of claim 1, wherein said at least one edge router is connected to said at least one DOFN by at least one optical fiber.

9. The virtual CCAP of claim 1, wherein said virtual CCAP controller and said edge router acknowledges said cable modem.

10. The virtual CCAP of claim 1, wherein said virtual CCAP controller receives acknowledgement of said service rules from said edge router.

11. A method for operating a hybrid fiber cable (HFC) network using a virtual converged cable access platform (CCAP) configured to relay data between at least one cable modem and one or more operator servers, said virtual CCAP comprising at least one virtual CCAP controller, at least one edge router, and a plurality of digital fiber nodes (DOFNs) that are connected to at least one set of neighborhood CATV cables with at least one CATV connected cable modem,
wherein said HFC cable network further comprises a virtual head end comprising the virtual CCAP controller and the at least one edge router, wherein said relayed data comprises downstream QAM channels,
said method comprising:
receiving, at the DOFN, a plurality of Ethernet frames or other digital transmission format frames over the optical fiber, said plurality of frames encapsulating downstream QAM constellation symbols of at least one downstream QAM channel;
extracting said downstream QAM constellation symbols, and using said downstream QAM constellation symbols to modulate at least one DOFN QAM modulator, thus generating downstream QAM RF signals; and
transmitting said generated downstream QAM modulated RF signals further downstream to the at least one CATV connected cable modem over said at least one set of neighborhood CATV cables.

12. The method of claim 11, wherein said QAM channels comprise either video QAM channels, video Edge-QAM channels, or IP-QAM channels.

13. The method of claim 11, wherein said downstream data further comprises National Television System Committee (NTSC) or Orthogonal Frequency Division Multiplexing (OFDM) RF channels,
wherein said received plurality of frames further comprise encapsulated digitized waveform data that are produced by digitally sampling said NTSC or OFDM RF channels, the method further comprising:
extracting said digitized waveform data and using said plurality of digitized waveform data to drive at least one digital to analog converter, thus producing downstream NTSC or OFDM RF channels; and
transmitting said DOFN generated NTSC or OFDM RF signals further downstream over said at least one set of neighborhood CATV cables.

14. The method of claim 11, wherein said downstream data further comprises Orthogonal Frequency Division Multiplexing (OFDM) RF channels,
wherein said received frames further comprise encapsulated OFDM symbols that are produced by demodulating said OFDM RF channels, the method further comprising:
extracting said plurality of OFDM symbols, and using said plurality of OFDM symbols to drive at least one OFDM RF modulator, thus producing downstream OFDM RF channels; and
transmitting said DOFN produced OFDM RF signals further downstream over said at least one set of neighborhood CATV cables.

15. The method of claim 11 further comprising digitally transmitting upstream RF QAM channel data originating from at least one cable modem or other neighborhood CATV cable connected devices, over said optical fiber, by:
receiving said upstream RF QAM channel data and demodulating said at least one upstream RF QAM channel into a plurality of upstream QAM constellation symbols;
encapsulating said plurality of upstream QAM constellation symbols into a plurality of Ethernet frames or other digital transmission format frames; and
digitally transmitting said plurality of Ethernet frames or other digital transmission format frames upstream to said virtual head end over said optical fiber.

16. The method of claim 11 further comprising digitally transmitting upstream RF OFDM channel data originating from at least one cable modem or other neighborhood CATV cable connected devices over said optical fiber by:
receiving said upstream RF OFDM channel data and demodulating said at least one upstream RF OFDM channel into a plurality of upstream OFDM symbols;
encapsulating said plurality of upstream OFDM symbols into a plurality of Ethernet frames or other digital transmission format frames; and
digitally transmitting said plurality of Ethernet frames or other digital transmission format frames upstream to said virtual head end over said optical fiber.

17. The method of claim 11 further comprising digitally transmitting upstream RF channel data over said optical fiber by:
receiving said upstream RF channel data and digitally sampling said RF channel data to produce a plurality of digitized waveform data;
encapsulating said digitized waveform data into a plurality of Ethernet frames or other digital transmission frames; and
digitally transmitting said plurality of Ethernet frames or other digital transmission frames upstream to said virtual head end over said optical fiber.

18. The method of claim 11 further comprising detecting said cable modem and transmitting notification of said cable modem detection via said edge router to said virtual CCAP controller, wherein said virtual CCAP controller and edge router to discover at least one operator server, wherein said DOFN relays data between said cable modem and said discovered operator server by way of said edge router and said virtual CCAP controller.

* * * * *